US010726392B2

(12) United States Patent
Kobayashi

(10) Patent No.: US 10,726,392 B2
(45) Date of Patent: Jul. 28, 2020

(54) EMAIL FILE-AND-REFER SYSTEM

(71) Applicant: Loran Inc., Urayasu-shi, Chiba (JP)

(72) Inventor: Hiroshige Kobayashi, Urayasu (JP)

(73) Assignee: Loran Inc., Urayasu-shi, Chiba (JP)

( * ) Notice: Subject to any disclaimer, the term of this patent is extended or adjusted under 35 U.S.C. 154(b) by 0 days.

(21) Appl. No.: 16/099,594

(22) PCT Filed: May 9, 2017

(86) PCT No.: PCT/JP2017/017473
§ 371 (c)(1),
(2) Date: Nov. 7, 2018

(87) PCT Pub. No.: WO2017/195757
PCT Pub. Date: Nov. 16, 2017

(65) Prior Publication Data

US 2019/0147405 A1 May 16, 2019

(30) Foreign Application Priority Data

May 12, 2016 (JP) ................................ 2016-096013

(51) Int. Cl.
*G06Q 10/10* (2012.01)
*G06F 13/00* (2006.01)
*H04L 12/58* (2006.01)

(52) U.S. Cl.
CPC ........... *G06Q 10/107* (2013.01); *G06F 13/00* (2013.01); *H04L 51/12* (2013.01); *H04L 51/22* (2013.01)

(58) Field of Classification Search
CPC ......... H04L 51/12; H04L 51/22; G06F 13/00; G06Q 10/107
See application file for complete search history.

(56) References Cited

U.S. PATENT DOCUMENTS

2001/0030666 A1 10/2001 Okada
2003/0163530 A1* 8/2003 Ribak .................. G06Q 10/107 709/206
2011/0314384 A1* 12/2011 Lindgren ............. G06Q 10/107 715/739

FOREIGN PATENT DOCUMENTS

JP 4-241673 A 8/1992
JP 2001-306593 A 11/2001
(Continued)

OTHER PUBLICATIONS

International Preliminary Report on Patentability of PCT/JP2017/017473 dated Nov. 22, 2018.

*Primary Examiner* — Benjamin M Thieu
(74) *Attorney, Agent, or Firm* — Muncy, Geissler, Olds & Lowe, P.C.

(57) ABSTRACT

Problem:
To provide an email file-and-refer system or program capable to easily and conveniently search a desired email from received or sent emails.
Resolution Means:
The email link process displays sorting marks to sort the received or sent emails dividing into each of the plural hierarchies where the sorting mark belongs, executes the link process to link them to the emails based on the operation of the operation unit, and executes a text information input process based on the operation of the operation unit. The email search process performs a display process dividing into each of the plurality of hierarchies, executes a designating process based on the operation of the operation unit, and executes an extract process based on the operation of the operation unit.

12 Claims, 67 Drawing Sheets

(56) References Cited

FOREIGN PATENT DOCUMENTS

| | | | |
|---|---|---|---|
| JP | 2005-020684 | A | 1/2005 |
| JP | 2007-26220 | A | 2/2007 |

* cited by examiner

| DISPLAY POSITION | FIRST HIERARCHY | | SECOND HIERARCHY | | MUTUAL LINK BAN |
|---|---|---|---|---|---|
| 1,1 | 1 | SAVE MARKS | 1 | IMPORTANT SAVE | 1 |
| 2,1 | | | 2 | CONFIRMATION REQUIRED | 1 |
| 3,1 | | | 3 | REPLY REQUIRED | 0 |
| 4,1 | | | 4 | NORMAL SAVE | 1 |
| 1,2 | 2 | EMAIL BODY CONTENTS | 1 | SCHEDULE | 0 |
| 2,2 | | | 2 | CONTACT INFORMATION | 0 |
| 3,2 | | | 3 | MEETING INVITATION | 0 |
| 4,2 | | | 4 | ACCOUNTING | 0 |
| 5,2 | | | 5 | INSTRUCTIONS | 0 |
| 1,3 | 3 | ATTACHMENT CONTENTS | 1 | DOCUMENTS | 0 |
| 2,3 | | | 2 | PHOTOS | 0 |
| 3,3 | | | 3 | VIDEOS | 0 |
| 4,3 | | | 4 | VOICE/AUDIO | 0 |
| 1,4 | | | 5 | MAPS | 0 |
| 2,4 | | | 6 | NAME LISTS | 0 |
| 3,4 | | | 7 | MANUALS | 0 |
| 4,4 | | | 8 | ITINERARIES | 0 |
| 5,4 | | | 9 | RECORDS | 0 |
| 6,4 | | | 10 | BALANCES | 0 |
| 1,5 | 4 | EMAIL ORGANIZING BOXES | 1 | COMPANY GENERAL AFFAIRS | 0 |
| 2,5 | | | 2 | COMPANY ACCOUNTANT | 0 |
| 3,5 | | | 3 | COMPANY BUSINESS | 0 |
| 4,5 | | | 4 | COMPANY TECHNOLOGIES | 0 |
| 5,5 | | | 5 | FACTORIES | 0 |
| 1,6 | | | 6 | BRANCH A | 0 |
| 2,6 | | | 7 | BRANCH B | 0 |
| 3,6 | | | 8 | BRANCH C | 0 |
| 4,6 | | | 9 | BRANCH D | 0 |
| 1,7 | | | 10 | CLIENT 1 | 0 |
| 2,7 | | | 11 | CLIENT 2 | 0 |
| 3,7 | | | 12 | CLIENT 3 | 0 |
| 4,7 | | | 13 | CLIENT 4 | 0 |
| 5,7 | | | 14 | CLIENT 5 | 0 |
| 1,8 | | | 15 | PRIVATE | 0 |
| 2,8 | | | 16 | SCHOOL | 0 |
| 3,8 | | | 17 | CLUB | 0 |
| 4,8 | | | 18 | COMMUNITY SERVICE | 0 |
| 5,8 | | | 19 | SHRINES | 0 |
| 6,8 | | | 20 | HOBBIES | 0 |
| 1,9 | | | 21 | OTHERS | 0 |

Fig. 28

| FIRST HIERARCHY | | SECOND HIERARCHY | | SELECTION INFORMATION |
|---|---|---|---|---|
| 1 | SAVE MARKS | 1 | IMPORTANT SAVE | 1 |
| | | 2 | CONFIRMATION REQUIRED | 0 |
| | | 3 | REPLY REQUIRED | 0 |
| | | 4 | NORMAL SAVE | 9 |
| 2 | EMAIL BODY CONTENTS | 1 | SCHEDULE | 0 |
| | | 2 | CONTACT INFORMATION | 0 |
| | | 3 | MEETING INVITATION | 0 |
| | | 4 | ACCOUNTING | 0 |
| | | 5 | INSTRUCTIONS | 0 |
| 3 | ATTACHMENT CONTENTS | 1 | DOCUMENTS | 1 |
| | | 2 | PHOTOS | 0 |
| | | 3 | VIDEOS | 0 |
| | | 4 | VOICE/AUDIO | 0 |
| | | 5 | MAPS | 0 |
| | | 6 | NAME LISTS | 0 |
| | | 7 | MANUALS | 1 |
| | | 8 | ITINERARIES | 0 |
| | | 9 | RECORDS | 0 |
| | | 10 | BALANCES | 0 |
| 4 | EMAIL ORGANIZING BOXES | 1 | COMPANY GENERAL AFFAIRS | 1 |
| | | 2 | COMPANY ACCOUNTANT | 0 |
| | | 3 | COMPANY BUSINESS | 0 |
| | | 4 | COMPANY BUSINESS | 0 |
| | | 5 | COMPANY TECHNOLOGIES | 0 |
| | | 6 | FACTORIES | 0 |
| | | 7 | BRANCH A | 0 |
| | | 8 | BRANCH B | 0 |
| | | 9 | BRANCH C | 0 |
| | | 10 | BRANCH D | 0 |
| | | 11 | CLIENT 1 | 0 |
| | | 12 | CLIENT 2 | 0 |
| | | 13 | CLIENT 3 | 0 |
| | | 14 | CLIENT 4 | 0 |
| | | 15 | CLIENT 5 | 0 |
| | | 16 | PRIVATE | 1 |
| | | 17 | SCHOOL | 0 |
| | | 18 | CLUB | 0 |
| | | 19 | COMMUNITY SERVICE | 0 |
| | | 20 | SHRINES | 0 |
| | | 21 | HOBBIES | 0 |
| | | 22 | OTHERS | 0 |

Fig. 29

| FIRST HIERARCHY | | SECOND HIERARCHY | | MUTUAL LINK BAN | THIRD HIERARCHY | | MUTUAL LINK BAN |
|---|---|---|---|---|---|---|---|
| 1 | EMAIL ACTIONS | 1 | REPLY REQUIRED | | | | |
| | | 2 | ACTION REQUIRED | | | | |
| | | 3 | CONFIRMATION REQUIRED | | | | |
| | | 4 | CONSIDERATION REQUIRED | | | | |
| 2 | ATTACHMENTS | 1 | PHOTOS | | 1 | LANDSCAPES | |
| | | | | | 2 | PORTRAITS | |
| | | 2 | VIDEOS | | | | |
| | | 3 | MUSIC | | 1 | CLASSIC | |
| | | | | | 2 | JAZZ | |
| | | 4 | LINKS | | | | |
| 3 | SENDERS | 1 | NAME LISTS | | | | |
| | | 2 | ADDRESS | | | | |
| | | 3 | TEL NO | | | | |
| | | 4 | EMAIL ADDRESS | | | | |
| 4 | SENDER (ORGANIZATIONS) | 1 | SCHOOL | | 1 | PRIMARY SCHOOL | |
| | | | | | 2 | JUNIOR HIGH SCHOOL | |
| | | | | | 3 | HIGH SCHOOL | |
| | | | | | 4 | COLLEGE/UNIVERSITY | |
| | | 2 | WORK | | | | |
| | | 3 | CLIENTS | | | | |
| | | 4 | NEIGHBORHOOD | | | | |
| | | 5 | CLUB | | | | |
| | | 6 | VOLUNTEER | | | | |
| 5 | SCHEDULE | 1 | INVITATIONS | | | | |
| | | 2 | DATES TIMES | | | | |
| | | 3 | PLACES | | | | |
| | | 4 | DIRECTIONS | | | | |
| | | 5 | ITINERARIES | | | | |
| 6 | CONTENTS | 1 | ACHIEVEMENTS | | | | |
| | | 2 | PLANS | | | | |
| | | 3 | PROJECTS | | | | |
| | | ... | ... | | | | |
| | | 8 | DRAWINGS | | | | |
| | | 9 | PROSE | | | | |
| | | ... | ... | | | | |
| | | 13 | WRITTEN PROPOSALS | | | | |
| | | 14 | OFFICIAL DOCUMENTS | | | | |
| 7 | CONTENT CATEGORIES | 1 | MEMORANDUMS | | | | |
| | | 2 | REPORTS | | | | |
| | | 3 | RECORDS | | | | |
| | | 4 | DOCUMENTS | | | | |
| | | 5 | MANUALS | | | | |
| 8 | MONEY | 1 | EXPENSES | | | | |
| | | 2 | ACCOUNTING | | | | |
| | | 6 | ESTIMATIONS | | | | |
| | | 7 | INVOICES | | | | |
| | | 8 | RECEIPTS | | | | |
| | | ... | ... | | | | |

Fig. 30

| EMAIL IDENTIFICATION INFORMATION | SORTING MARK IDENTIFICATION INFORMATION | PRESENCE OR ABSENCE | PRESENCE OR ABSENCE OF LINKS | COMMENT |
|---|---|---|---|---|
| R000001 | 2~1,3~8,4~17 | 1 | 0 | NARA TRAVEL PLAN ON APRIL 1 TO APRIL 3, 2016 |
| R000002 | 2~2,4~18 | 0 | 0 | BANDO, EMAIL ADDRESS CHANGE |
| R000003 | 1~3,3~6,4~20 | 1 | 0 | SUGINOMORI SHRINE PARISHIONER MEMBER NAME LIST, 2016 |
| R000004 | 1~1,1~3,2~5,3~10,4~1 | 1 | 0 | FISCAL 2016 BUDGET. END OF JANUARY DEADLINE |
| R000005 | 1~1,2~1,2~2,4~13 | 0 | 0 | YONEKURA INDUSTRY. APPOINTMENT ON JANUARY 29TH, AT 14:00, PRESIDENT YONEKURA'S MOBILE |
| R000006 | 3~9,4~19 | 1 | 0 | COMMUNITY ASSOCIATION, AMOUNT OF PURCHASED FLOWER PLANTS IN APRIL, 2016 |
| R000007 | | 0 | 0 | |
| R000008 | 3~2,4~16 | 1 | 0 | |
| R000009 | 3~3,4~21 | 1 | 0 | FOREST VOLUNTEER ASSOCIATION, DEMONSTRATION OF HANDLING A CHAIN SAW [MR. KIKUCHI] |
| | | | | |
| S000001 | 3~6,4~18 | 1 | 0 | BOAT CLUB CONTEMPORARIES NAME LIST. 2016 |
| | | | | |

Fig. 31

| EMAIL OPERATING MENU |
|---|
| SAVE |
| MOVE |
| DELETE |
| SEARCH |
| SORTING MARK MANAGEMENT |

Fig. 32A

| SORTING MARK MANAGEMENT MENU |
|---|
| ADD |
| CHANGE |
| NEW CREATE |
| SORTING MARK MANAGEMENT MENU |

Fig. 32B

| FIRST HIERARCHY | | SECOND HIERARCHY | | SELECTION INFORMATION |
|---|---|---|---|---|
| 1 | SAVE MARKS | 1 | IMPORTANT SAVE | 1 |
| | | 2 | CONFIRMATION REQUIRED | 0 |
| | | 3 | REPLY REQUIRED | 0 |
| | | 4 | NORMAL SAVE | 9 |
| 2 | EMAIL BODY CONTENTS | 1 | SCHEDULE | 0 |
| | | 2 | CONTACT INFORMATION | 0 |
| | | 3 | MEETING INVITATION | 0 |
| | | 4 | ACCOUNTING | 0 |
| | | 5 | INSTRUCTIONS | 0 |
| 3 | ATTACHMENT CONTENTS | 1 | DOCUMENTS | 1 |
| | | 2 | PHOTOS | 0 |
| | | 3 | VIDEOS | 0 |
| | | 4 | VOICE/AUDIO | 0 |
| | | 5 | MAPS | 0 |
| | | 6 | NAME LISTS | 0 |
| | | 7 | MANUALS | 1 |
| | | 8 | ITINERARIES | 0 |
| | | 9 | RECORDS | 0 |
| | | 10 | BALANCES | 0 |
| 4 | EMAIL ORGANIZING BOXES | 1 | COMPANY GENERAL AFFAIRS | 1 |
| | | 2 | COMPANY ACCOUNTANT | 0 |
| | | 3 | COMPANY BUSINESS | 0 |
| | | 4 | COMPANY BUSINESS | 0 |
| | | 5 | COMPANY TECHNOLOGIES | 0 |
| | | 6 | FACTORIES | 0 |
| | | 7 | BRANCH A | 0 |
| | | 8 | BRANCH B | 0 |
| | | 9 | BRANCH C | 0 |
| | | 10 | BRANCH D | 0 |
| | | 11 | CLIENT 1 | 0 |
| | | 12 | CLIENT 2 | 0 |
| | | 13 | CLIENT 3 | 0 |
| | | 14 | CLIENT 4 | 0 |
| | | 15 | CLIENT 5 | 0 |
| | | 16 | PRIVATE | 1 |
| | | 17 | SCHOOL | 0 |
| | | 18 | CLUB | 0 |
| | | 19 | COMMUNITY SERVICE | 0 |
| | | 20 | SHRINES | 0 |
| | | 21 | HOBBIES | 0 |
| | | 22 | OTHERS | 0 |

Fig. 33

EMAIL RECEPTION SCREEN   1000

EMAIL SEARCH   1200

| SENDER | TITLE | ※ MATERIAL ATTACHMENT MARK |
|---|---|---|
| FUJII TAISUKE | NARA TRAVEL | ※ |
| bnd.mnktk@hw.co.jp | HAPPY NEW YEAR [BANDO] | |
| ishihara@oomail.com | SUGINOMORI SHRINE, NEW YEAR PARTY | ※ |
| abcd@nmi.co.jp | FISCAL 2016 BUDGET | ※ |
| yonekura@utn.com | RE: PLEASE MAKE AN APPOINTMENT | |
| aoshima@nmty.com | RE: NOTIFICATION OF FLOWER PLANTING WORK IN COMMUNITY ASSOCIATION | ※ |
| info@bbmail.jp | NEWSLETTER, PART-TIME JOB INFORMATION | |
| CHIHIRO FUKUYAMA | (NO TITLE) | ※ |
| KIKUCHI NORIO | ABOUT CHAIN SAW | ※ |

1100

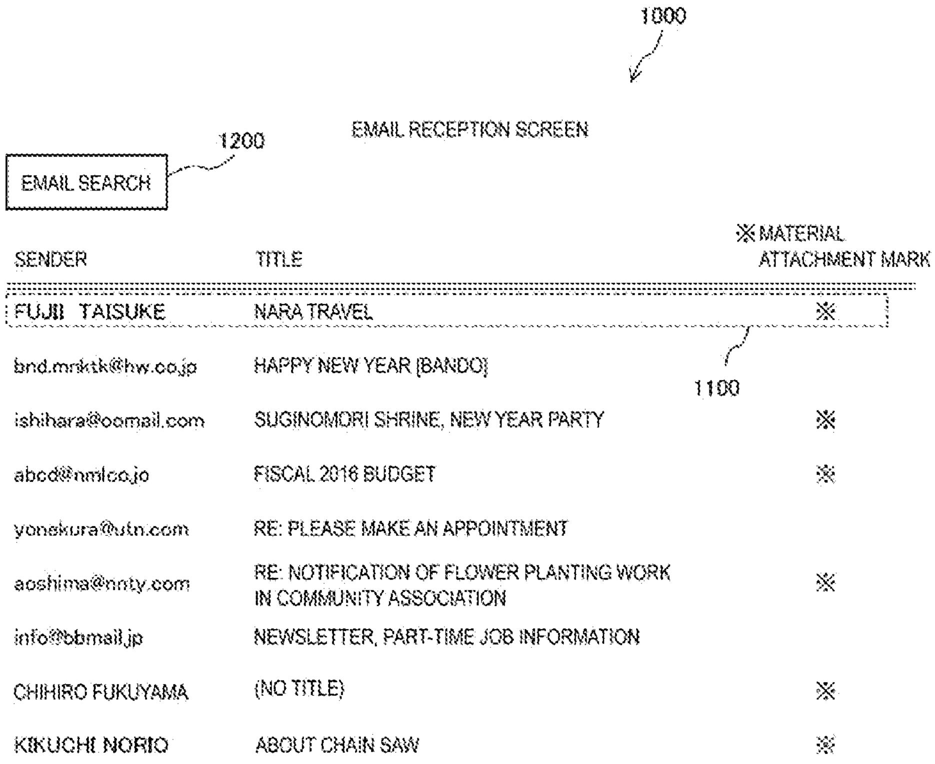

Fig. 34

| TITLE | NARA TRAVEL |
|---|---|
| SENDER | FUJII TAISUKE |
| RECEIVER | HIROSHIGE KOBAYASHI |
| MATERIAL ATTACHMENT MARK | ※ |
| EMAIL BODY | THANK YOU FOR YOUR KIND WORK THE OTHER DAY. BY THE WAY, A TIME SCHEDULE AND DESTINATION OF THE NARA TRAVEL HAVE FINALLY BEEN DECIDED. I'M SORRY OF THE LATE COMMUNICATION. YOU MUST COME! |

EMAIL SAVE DESIGNATION SCREEN (BEFORE INPUTTING SAVE DESIGNATION)

| | |
|---|---|
| SENDER | FUJII TAISUKE |
| TITLE | NARA TRAVEL |
| EMAIL BODY EXCERPT | THANK YOU FOR YOUR KIND WORK THE OTHER DAY. BY THE WAY, A TIME SCHEDULE AND DESTINATION OF THE NARA TRAVEL HAVE FINALLY BEEN DECIDED. |
| MATERIAL ATTACHMENT MARK | * |

[DELETE] [MOVE] [REPLY]

SAVE MARKS: [IMPORTANT SAVE] [CONFIRMATION REQUIRED] [REPLY REQUIRED] [NORMAL SAVE]

EMAIL BODY CONTENTS: [SCHEDULE] [CONTACT INFORMATION] [MEETING INVITATION] [ACCOUNTING] [INSTRUCTIONS]

ATTACHMENT CONTENTS: [PDOCUMENTS] [PHOTOS] [VIDEOS] [VOICE/AUDIO]
[MAPS] [NAME LISTS] [MANUALS] [ITINERARIES] [RECORDS] [BALANCES]

EMAIL ORGANIZING BOXES: [COMPANY GENERAL AFFAIRS] [COMPANY ACCOUNTANT] [COMPANY BUSINESS] [COMPANY TECHNOLOGIES] [FACTORIES]
[BRANCH A] [BRANCH B] [BRANCH C] [BRANCH D]
[CLIENT 1] [CLIENT 2] [CLIENT 3] [CLIENT 4] [CLIENT 5]
[PRIVATE] [SCHOOL] [CLUB] [COMMUNITY SERVICE] [SHRINES] [HOBBIES]
[OTHERS]

COMMENT INPUT: [_____]

[EXECUTE]    [SORTING MARK MANAGEMENT]

3000

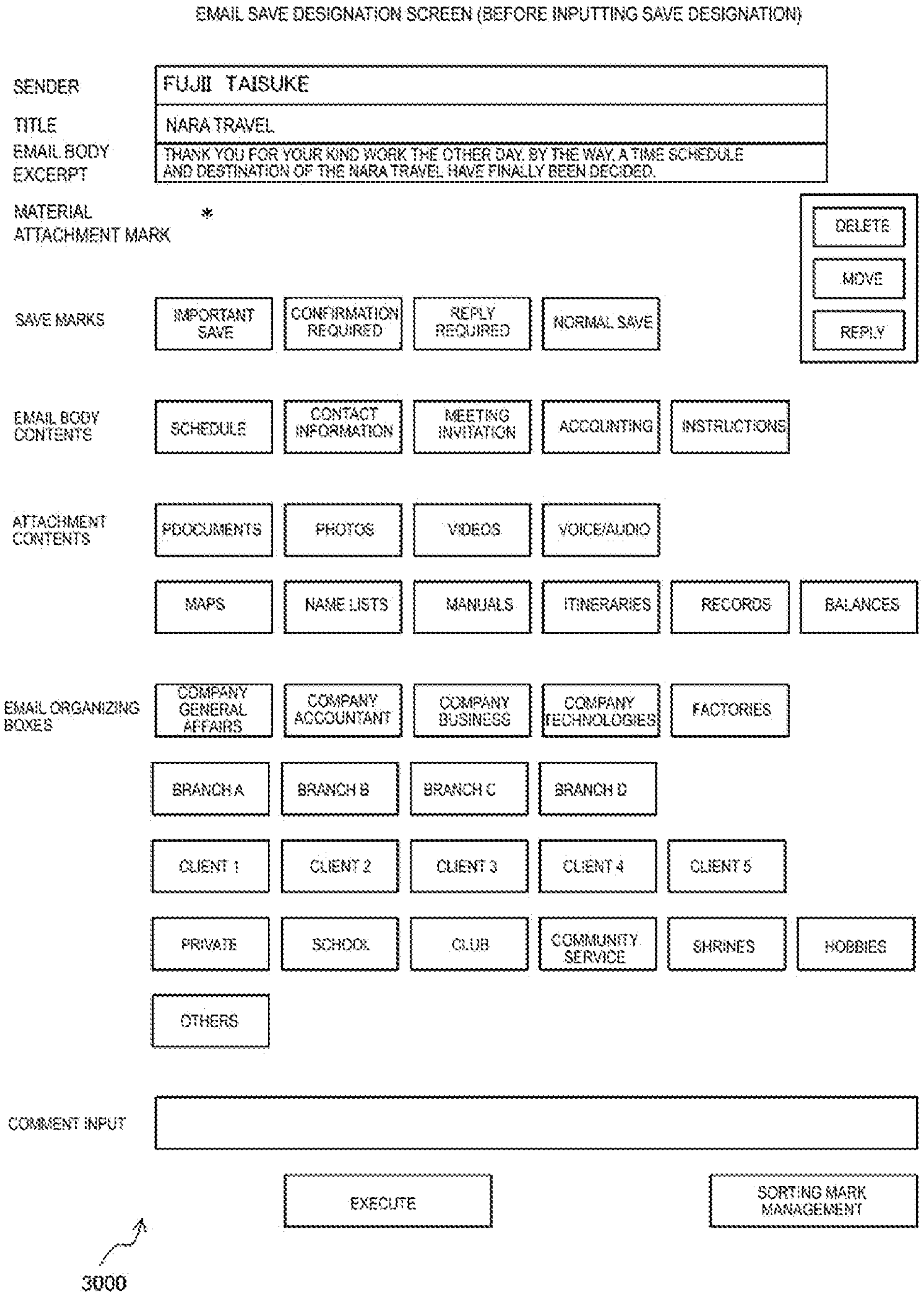

Fig. 37

EMAIL SAVE DESIGNATION SCREEN (AFTER INPUTTING SAVE DESIGNATION)

| SENDER | FUJII TAISUKE |
|---|---|
| TITLE | NARA TRAVEL |
| EMAIL BODY EXCERPT | THANK YOU FOR YOUR KIND WORK THE OTHER DAY. BY THE WAY, A TIME SCHEDULE AND DESTINATION OF THE NARA TRAVEL HAVE FINALLY BEEN DECIDED. |
| MATERIAL ATTACHMENT MARK | * |

DELETE
MOVE
REPLY

SAVE MARKS: IMPORTANT SAVE | CONFIRMATION REQUIRED | REPLY REQUIRED | NORMAL SAVE

EMAIL BODY CONTENTS: SCHEDULE | CONTACT INFORMATION | MEETING INVITATION | ACCOUNTING | INSTRUCTIONS

ATTACHMENT CONTENTS: PDOCUMENTS | PHOTOS | VIDEOS | VOICE/AUDIO
MAPS | NAME LISTS | MANUALS | ITINERARIES | RECORDS | BALANCES

EMAIL ORGANIZING BOXES: COMPANY GENERAL AFFAIRS | COMPANY ACCOUNTANT | COMPANY BUSINESS | COMPANY TECHNOLOGIES | FACTORIES
BRANCH A | BRANCH B | BRANCH C | BRANCH D
CLIENT 1 | CLIENT 2 | CLIENT 3 | CLIENT 4 | CLIENT 5
PRIVATE | SCHOOL | CLUB | COMMUNITY SERVICE | SHRINES | HOBBIES
OTHERS

COMMENT INPUT: NARA TRAVEL PLAN ON APRIL 1 TO APRIL 3, 2016

EXECUTE | SORTING MARK MANAGEMENT

3000

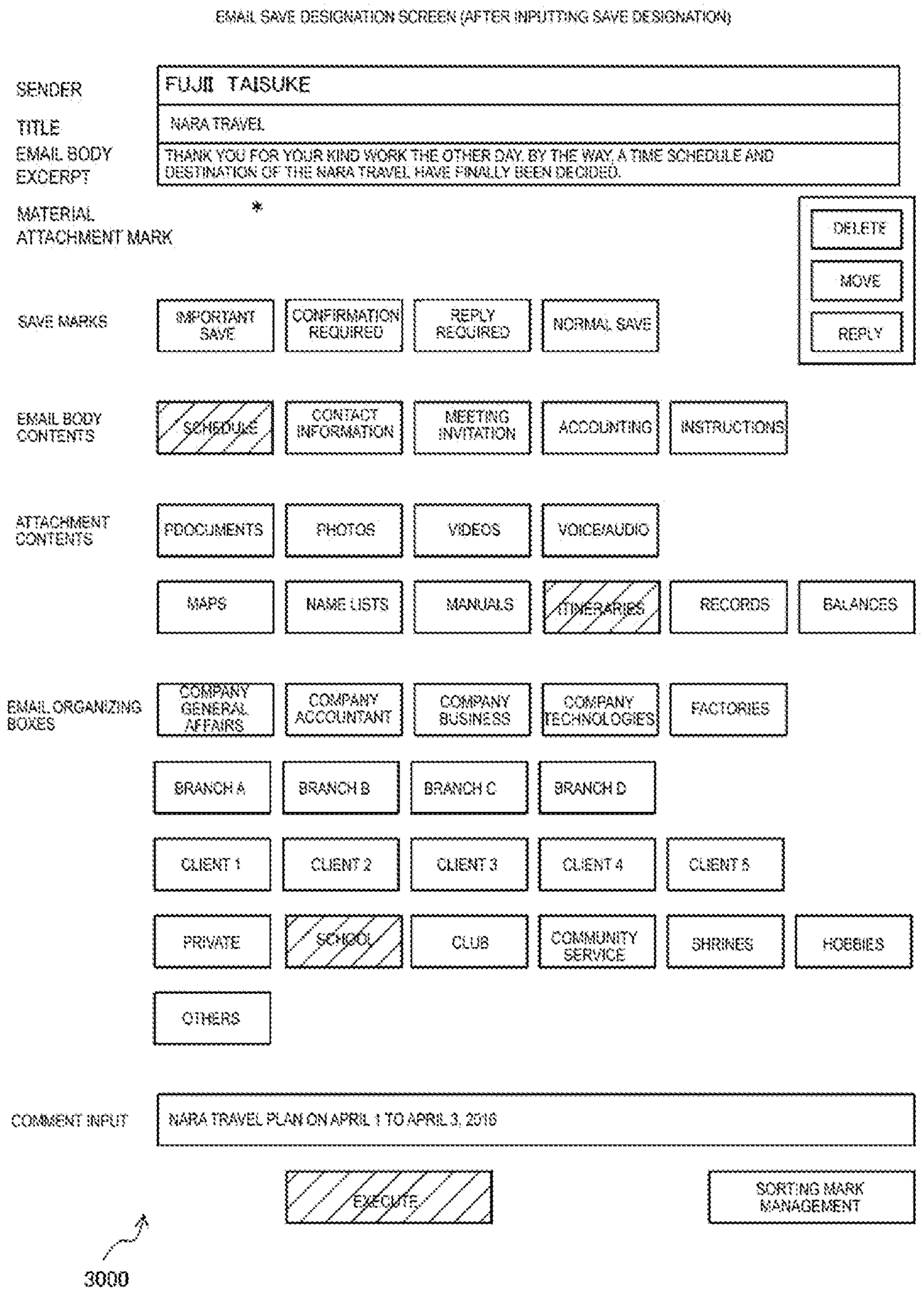

Fig. 38

EMAIL SAVE DESIGNATION SCREEN (BEFORE INPUTTING SAVE DESIGNATION)

| SENDER | bnd.mnktk@hw.co.jp |
|---|---|
| TITLE | HAPPY NEW YEAR [BANDO] |
| EMAIL BODY EXCERPT | ... BY THE WAY, I WILL CHANGE MY EMAIL ADDRESS AS BELOW FROM THE NEXT WEEK. |

MATERIAL ATTACHMENT MARK

[DELETE] [MOVE] [REPLY]

SAVE MARKS: [IMPORTANT SAVE] [CONFIRMATION REQUIRED] [REPLY REQUIRED] [NORMAL SAVE]

EMAIL BODY CONTENTS: [SCHEDULE] [CONTACT INFORMATION] [MEETING INVITATION] [ACCOUNTING] [INSTRUCTIONS]

ATTACHMENT CONTENTS: [PDOCUMENTS] [PHOTOS] [VIDEOS] [VOICE/AUDIO]
[MAPS] [NAME LISTS] [MANUALS] [ITINERARIES] [RECORDS] [BALANCES]

EMAIL ORGANIZING BOXES: [COMPANY GENERAL AFFAIRS] [COMPANY ACCOUNTANT] [COMPANY BUSINESS] [COMPANY TECHNOLOGIES] [FACTORIES]
[BRANCH A] [BRANCH B] [BRANCH C] [BRANCH D]
[CLIENT 1] [CLIENT 2] [CLIENT 3] [CLIENT 4] [CLIENT 5]
[PRIVATE] [SCHOOL] [CLUB] [COMMUNITY SERVICE] [SHRINES] [HOBBIES]
[OTHERS]

COMMENT INPUT: [                                   ]

[EXECUTE]   [SORTING MARK MANAGEMENT]

3000

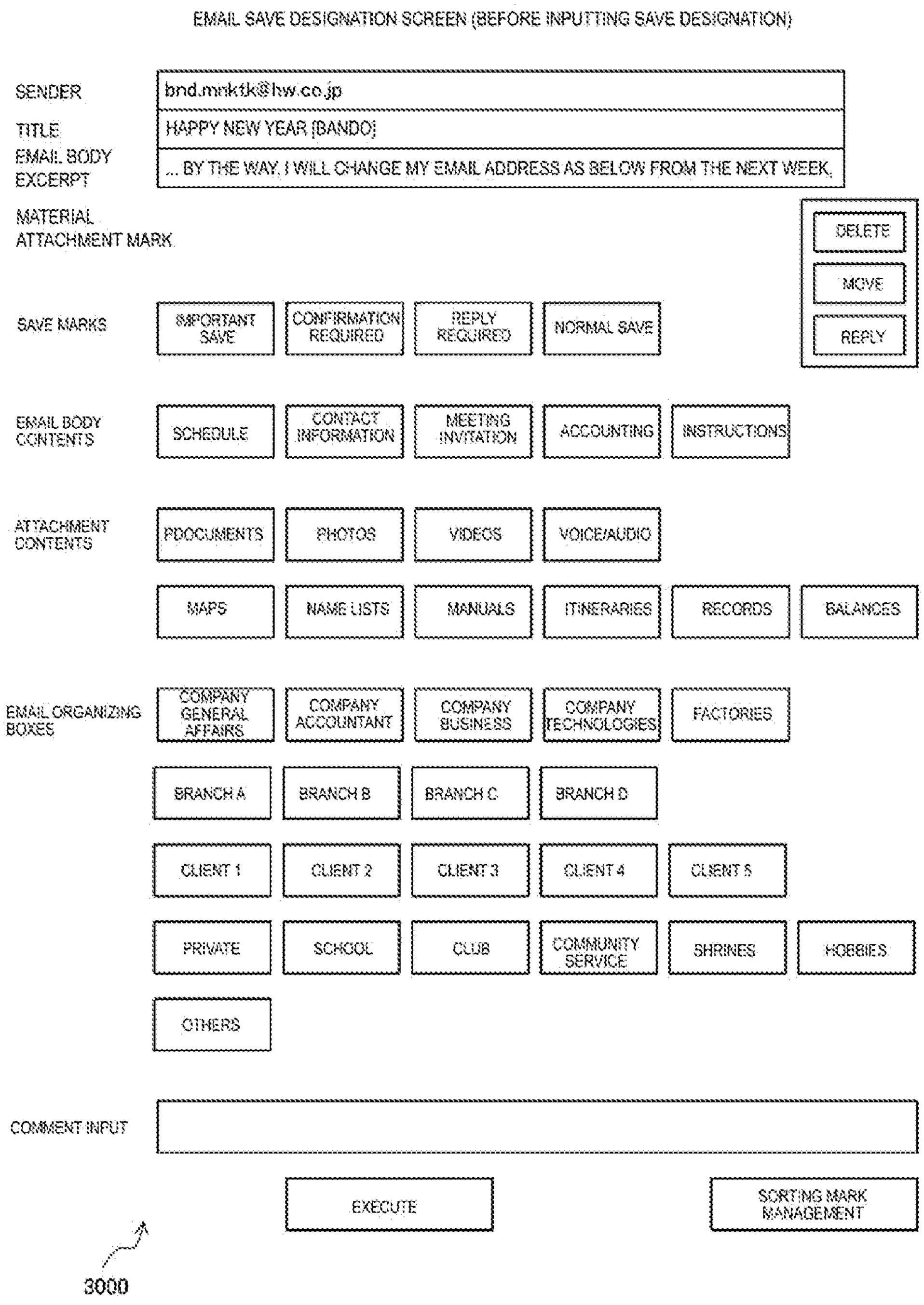

Fig. 39

EMAIL SAVE DESIGNATION SCREEN (AFTER INPUTTING SAVE DESIGNATION)

| | |
|---|---|
| SENDER | bnd.mnktk@hw.co.jp |
| TITLE | HAPPY NEW YEAR (BANDO) |
| EMAIL BODY EXCERPT | ... BY THE WAY, I WILL CHANGE MY EMAIL ADDRESS AS BELOW FROM THE NEXT WEEK. |

MATERIAL ATTACHMENT MARK

DELETE
MOVE
REPLY

SAVE MARKS: IMPORTANT SAVE | CONFIRMATION REQUIRED | REPLY REQUIRED | NORMAL SAVE

EMAIL BODY CONTENTS: SCHEDULE | ~~CONTACT INFORMATION~~ | MEETING INVITATION | ACCOUNTING | INSTRUCTIONS

ATTACHMENT CONTENTS: PDOCUMENTS | PHOTOS | VIDEOS | VOICE/AUDIO

MAPS | NAME LISTS | MANUALS | ITINERARIES | RECORDS | BALANCES

EMAIL ORGANIZING BOXES: COMPANY GENERAL AFFAIRS | COMPANY ACCOUNTANT | COMPANY BUSINESS | COMPANY TECHNOLOGIES | FACTORIES

BRANCH A | BRANCH B | BRANCH C | BRANCH D

CLIENT 1 | CLIENT 2 | CLIENT 3 | CLIENT 4 | CLIENT 5

PRIVATE | SCHOOL | ~~CLUB~~ | COMMUNITY SERVICE | SHRINES | HOBBIES

OTHERS

COMMENT INPUT: BANDO, EMAIL ADDRESS CHANGE

~~EXECUTE~~    SORTING MARK MANAGEMENT

3000

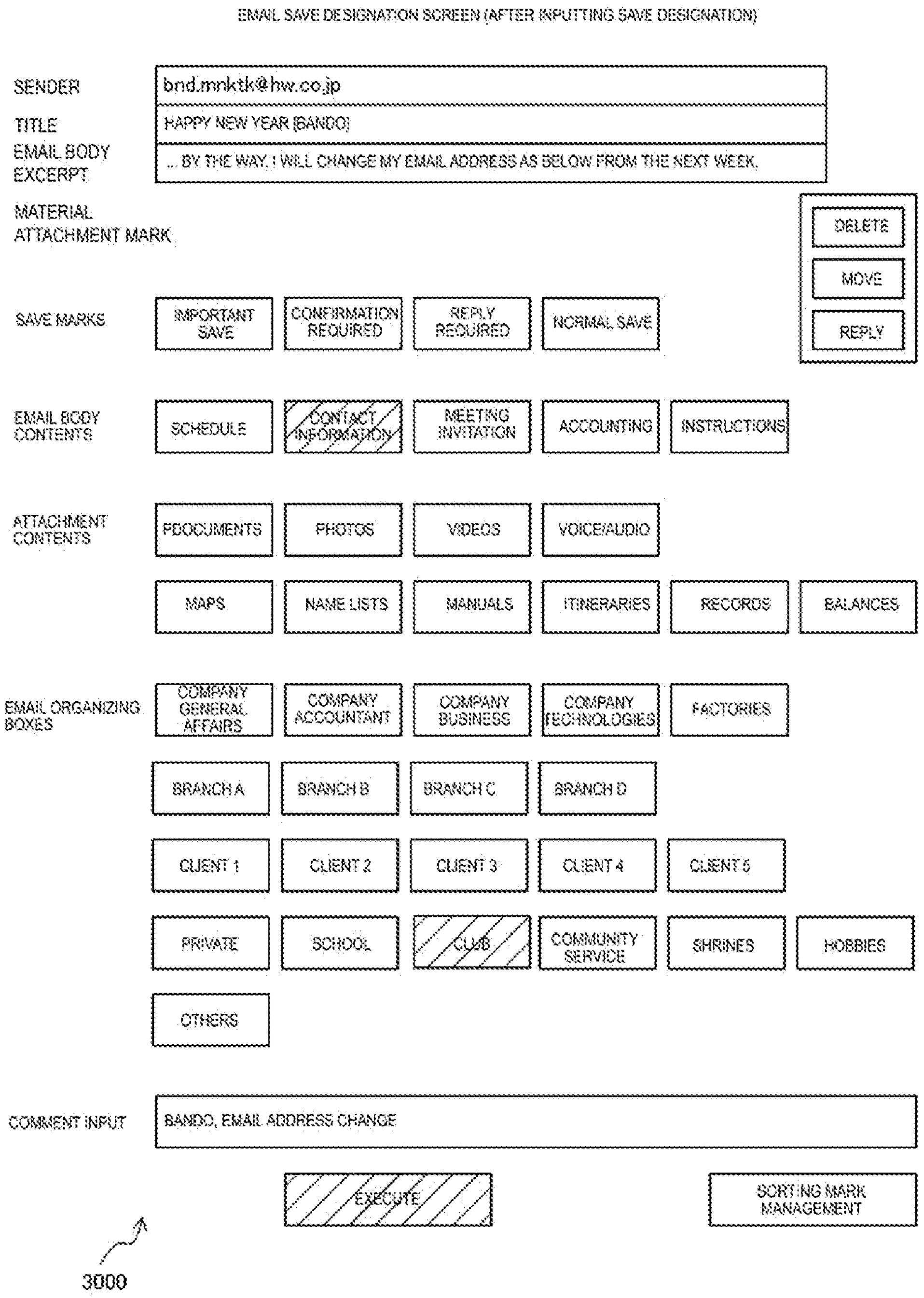

Fig. 40

EMAIL SAVE DESIGNATION SCREEN (BEFORE INPUTTING SAVE DESIGNATION)

| | |
|---|---|
| SENDER | ishihara@oomail.com |
| TITLE | SUGINOMORI SHRINE, NEW YEAR PARTY |
| EMAIL BODY EXCERPT | THE PARTICIPANTS OF NEW YEAR PARTY ARE LISTED IN THE ATTACHMENT. |
| MATERIAL ATTACHMENT MARK | * |

DELETE
MOVE
REPLY

SAVE MARKS: IMPORTANT SAVE | CONFIRMATION REQUIRED | REPLY REQUIRED | NORMAL SAVE

EMAIL BODY CONTENTS: SCHEDULE | CONTACT INFORMATION | MEETING INVITATION | ACCOUNTING | INSTRUCTIONS

ATTACHMENT CONTENTS: PDOCUMENTS | PHOTOS | VIDEOS | VOICE/AUDIO
MAPS | NAME LISTS | MANUALS | ITINERARIES | RECORDS | BALANCES

EMAIL ORGANIZING BOXES:
COMPANY GENERAL AFFAIRS | COMPANY ACCOUNTANT | COMPANY BUSINESS | COMPANY TECHNOLOGIES | FACTORIES
BRANCH A | BRANCH B | BRANCH C | BRANCH D
CLIENT 1 | CLIENT 2 | CLIENT 3 | CLIENT 4 | CLIENT 5
PRIVATE | SCHOOL | CLUB | COMMUNITY SERVICE | SHRINES | HOBBIES
OTHERS

COMMENT INPUT

EXECUTE | SORTING MARK MANAGEMENT

3000

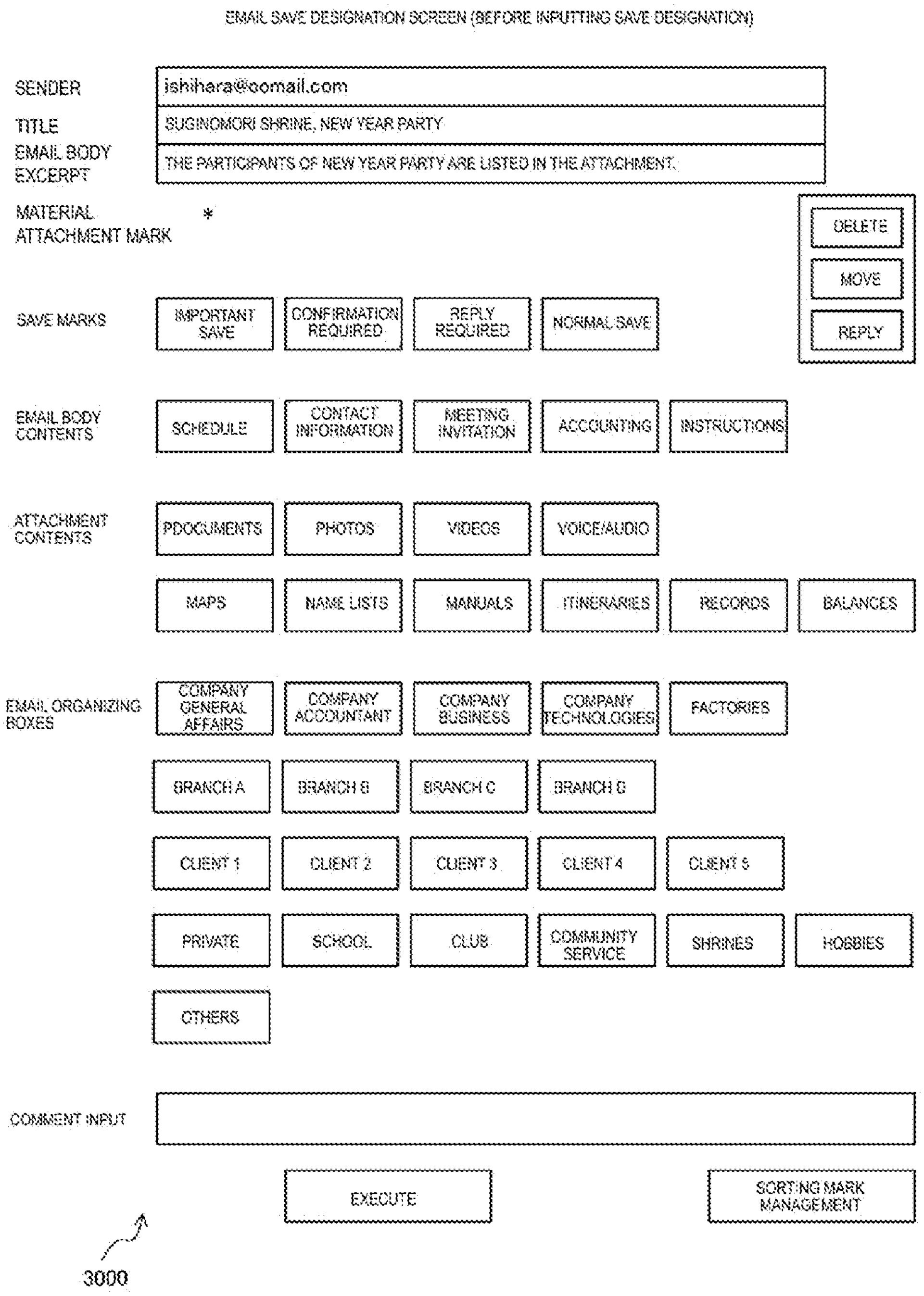

Fig. 41

EMAIL SAVE DESIGNATION SCREEN (BEFORE INPUTTING SAVE DESIGNATION)

| SENDER | abcd@nmlcojo |
|---|---|
| TITLE | FISCAL 2016 BUDGET |
| EMAIL BODY EXCERPT | I AM OSAKI IN THE GENERAL AFFAIRS DIVISION. PLEASE SEND THE FISCAL 2016 BUDGET TO THE GENERAL AFFAIRS DIVISION UNTIL THE END OF JANUARY |
| MATERIAL ATTACHMENT MARK | * |

DELETE / MOVE / REPLY

SAVE MARKS: IMPORTANT SAVE | CONFIRMATION REQUIRED | REPLY REQUIRED | NORMAL SAVE

EMAIL BODY CONTENTS: SCHEDULE | CONTACT INFORMATION | MEETING INVITATION | ACCOUNTING | INSTRUCTIONS

ATTACHMENT CONTENTS: PDOCUMENTS | PHOTOS | VIDEOS | VOICE/AUDIO
MAPS | NAME LISTS | MANUALS | ITINERARIES | RECORDS | BALANCES

EMAIL ORGANIZING BOXES:
COMPANY GENERAL AFFAIRS | COMPANY ACCOUNTANT | COMPANY BUSINESS | COMPANY TECHNOLOGIES | FACTORIES
BRANCH A | BRANCH B | BRANCH C | BRANCH D
CLIENT 1 | CLIENT 2 | CLIENT 3 | CLIENT 4 | CLIENT 5
PRIVATE | SCHOOL | CLUB | COMMUNITY SERVICE | SHRINES | HOBBIES
OTHERS

COMMENT INPUT

EXECUTE | SORTING MARK MANAGEMENT

3000

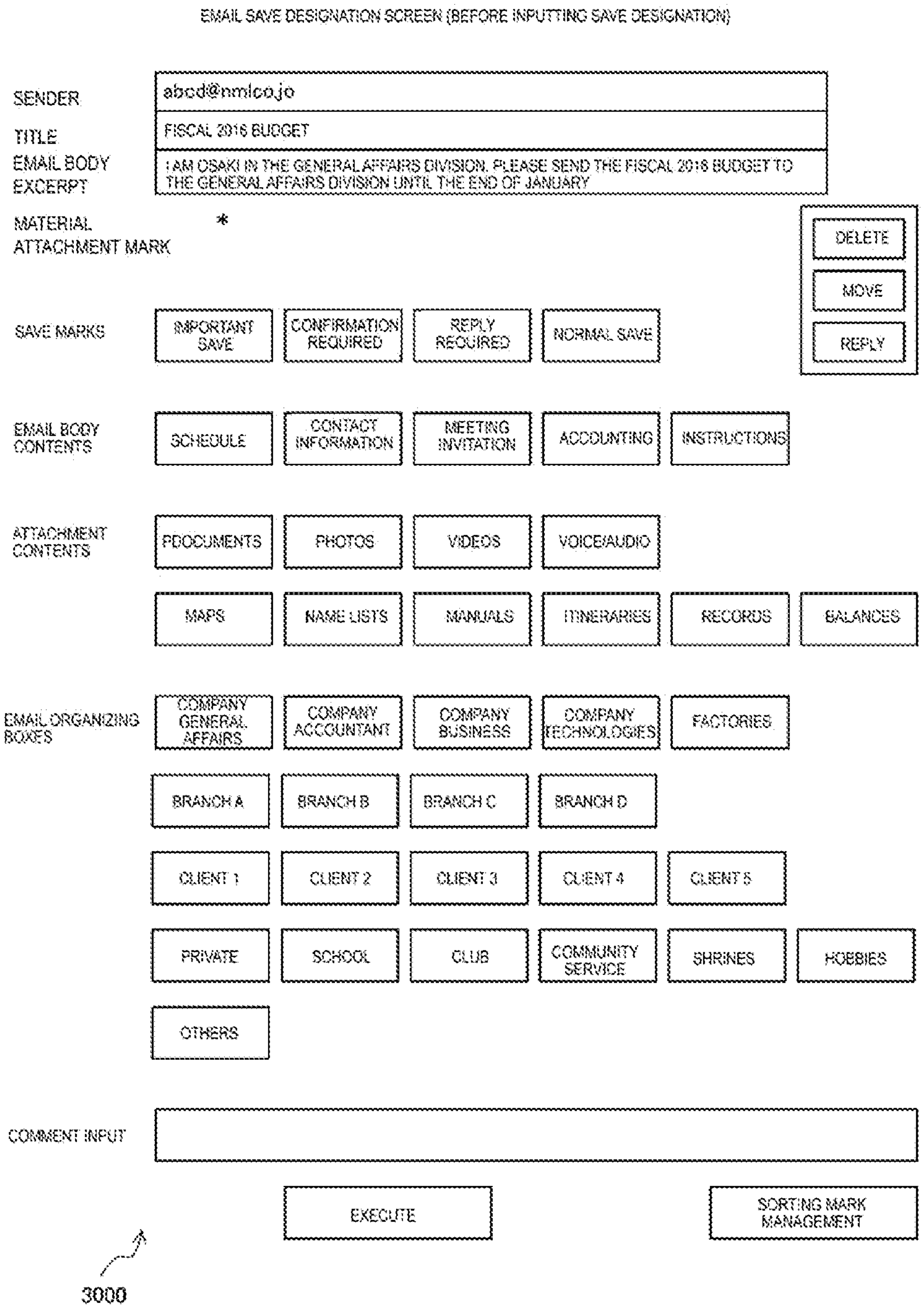

Fig. 43

EMAIL SAVE DESIGNATION SCREEN (AFTER INPUTTING SAVE DESIGNATION)

| Field | Content |
|---|---|
| SENDER | yonekura@utn.com |
| TITLE | RE: PLEASE MAKE AN APPOINTMENT |
| EMAIL BODY EXCERPT | I HAVE RECEIVED YOUR EMAIL, WOULD IT BE CONVENIENT FOR YOU ON 29 JANUARY, 14:00 AT OUR COMPANY CONFERENCE ROOM? |
| MATERIAL ATTACHMENT MARK | |

DELETE | MOVE | REPLY

SAVE MARKS: IMPORTANT SAVE | CONFIRMATION REQUIRED | REPLY REQUIRED | NORMAL SAVE

EMAIL BODY CONTENTS: SCHEDULE | CONTACT INFORMATION | MEETING INVITATION | ACCOUNTING | INSTRUCTIONS

ATTACHMENT CONTENTS: PDOCUMENTS | PHOTOS | VIDEOS | VOICE/AUDIO
MAPS | NAME LISTS | MANUALS | ITINERARIES | RECORDS | BALANCES

EMAIL ORGANIZING BOXES: COMPANY GENERAL AFFAIRS | COMPANY ACCOUNTANT | COMPANY BUSINESS | COMPANY TECHNOLOGIES | FACTORIES
BRANCH A | BRANCH B | BRANCH C | BRANCH D
CLIENT 1 | CLIENT 2 | CLIENT 3 | CLIENT 4 | CLIENT 5
PRIVATE | SCHOOL | CLUB | COMMUNITY SERVICE | SHRINES | HOBBIES
OTHERS

COMMENT INPUT: YONEKURA INDUSTRY, APPOINTMENT ON JANUARY 29TH, AT 14:00, PRESIDENT YONEKURA'S MOBILE

EXECUTE | SORTING MARK MANAGEMENT

3000

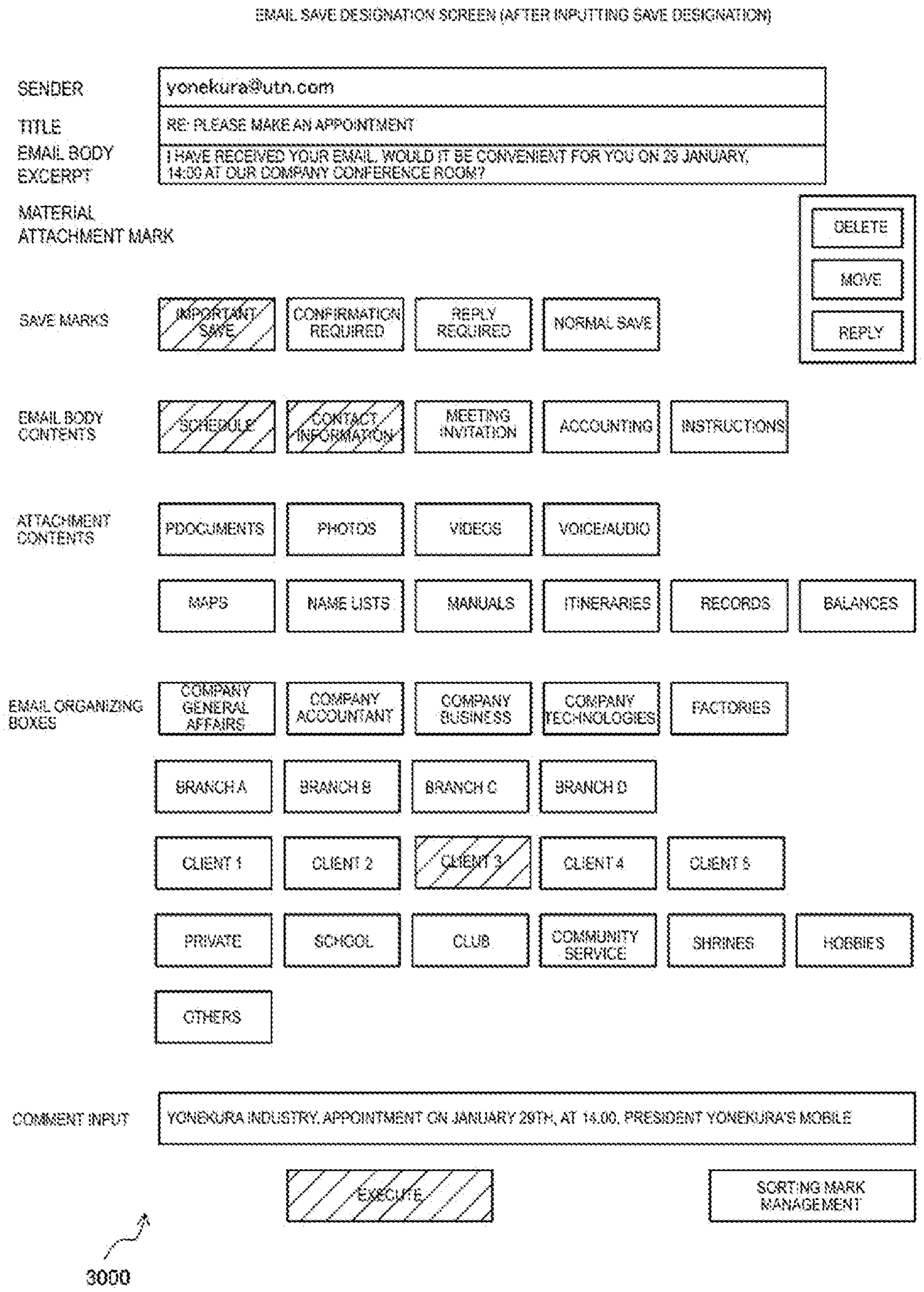

Fig. 46

EMAIL SAVE DESIGNATION SCREEN (BEFORE INPUTTING SAVE DESIGNATION)

| | |
|---|---|
| SENDER | aoshima@nnty.com |
| TITLE | RE: NOTIFICATION OF FLOWER PLANTING WORK IN COMMUNITY ASSOCIATION |
| EMAIL BODY EXCERPT | HELLO. I HAVE SUMMED UP THE NUMBER OF FLOWER PLANTS REQUIRED FOR THE SPRING PLANTING, AND PLEASE... |
| MATERIAL ATTACHMENT MARK | * |

DELETE
MOVE
REPLY

SAVE MARKS: IMPORTANT SAVE | CONFIRMATION REQUIRED | REPLY REQUIRED | NORMAL SAVE

EMAIL BODY CONTENTS: SCHEDULE | CONTACT INFORMATION | MEETING INVITATION | ACCOUNTING | INSTRUCTIONS

ATTACHMENT CONTENTS: PDOCUMENTS | PHOTOS | VIDEOS | VOICE/AUDIO
MAPS | NAME LISTS | MANUALS | ITINERARIES | RECORDS | BALANCES

EMAIL ORGANIZING BOXES: COMPANY GENERAL AFFAIRS | COMPANY ACCOUNTANT | COMPANY BUSINESS | COMPANY TECHNOLOGIES | FACTORIES
BRANCH A | BRANCH B | BRANCH C | BRANCH D
CLIENT 1 | CLIENT 2 | CLIENT 3 | CLIENT 4 | CLIENT 5
PRIVATE | SCHOOL | CLUB | COMMUNITY SERVICE | SHRINES | HOBBIES
OTHERS

COMMENT INPUT: _____

EXECUTE          SORTING MARK MANAGEMENT

3000

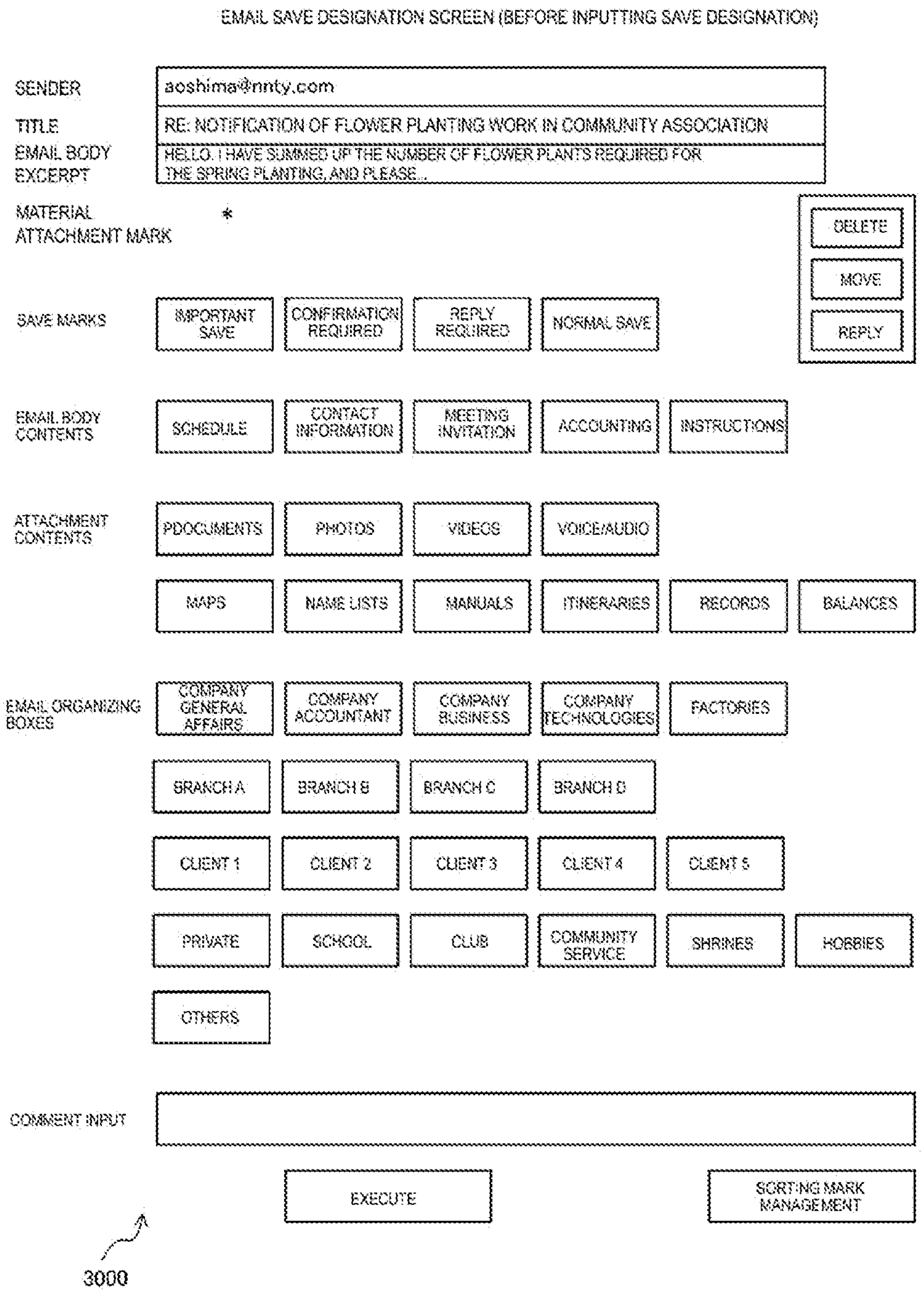

Fig. 47

EMAIL SAVE DESIGNATION SCREEN (AFTER INPUTTING SAVE DESIGNATION)

| SENDER | aoshima@nmty.com |
|---|---|
| TITLE | RE: NOTIFICATION OF FLOWER PLANTING WORK IN COMMUNITY ASSOCIATION |
| EMAIL BODY EXCERPT | HELLO. I HAVE SUMMED UP THE NUMBER OF FLOWER PLANTS REQUIRED FOR THE SPRING PLANTING, AND PLEASE |
| MATERIAL ATTACHMENT MARK | * |

DELETE | MOVE | REPLY

SAVE MARKS: IMPORTANT SAVE | CONFIRMATION REQUIRED | REPLY REQUIRED | NORMAL SAVE

EMAIL BODY CONTENTS: SCHEDULE | CONTACT INFORMATION | MEETING INVITATION | ACCOUNTING | INSTRUCTIONS

ATTACHMENT CONTENTS: PDOCUMENTS | PHOTOS | VIDEOS | VOICE/AUDIO
MAPS | NAME LISTS | MANUALS | ITINERARIES | RECORDS | BALANCES

EMAIL ORGANIZING BOXES:
COMPANY GENERAL AFFAIRS | COMPANY ACCOUNTANT | COMPANY BUSINESS | COMPANY TECHNOLOGIES | FACTORIES
BRANCH A | BRANCH B | BRANCH C | BRANCH D
CLIENT 1 | CLIENT 2 | CLIENT 3 | CLIENT 4 | CLIENT 5
PRIVATE | SCHOOL | CLUB | COMMUNITY SERVICE | SHRINES | HOBBIES
OTHERS

COMMENT INPUT: COMMUNITY ASSOCIATION, AMOUNT OF PURCHASED FLOWER PLANTS IN APRIL, 2016

EXECUTE | SORTING MARK MANAGEMENT

3000

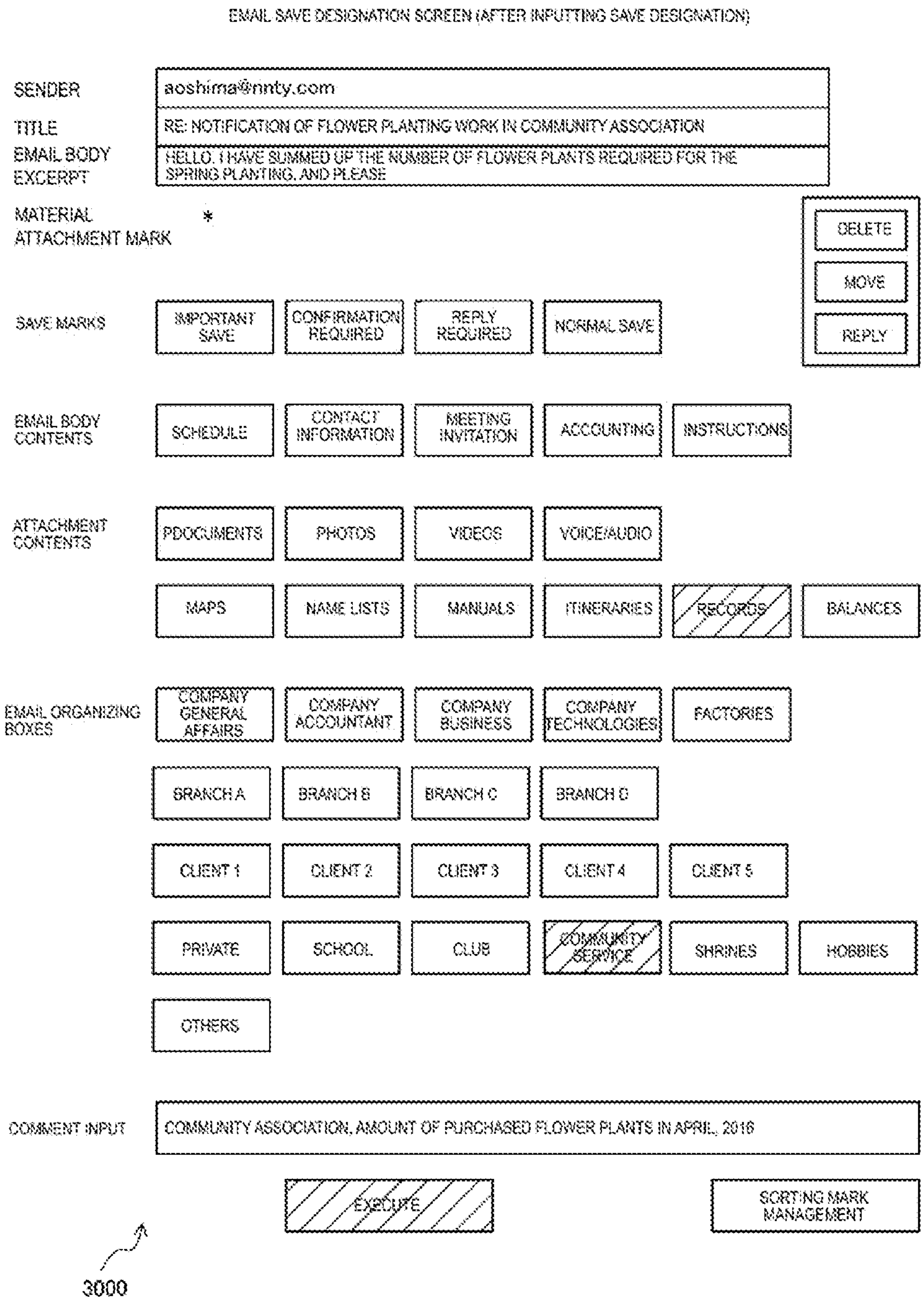

Fig. 48

EMAIL SAVE DESIGNATION SCREEN (BEFORE INPUTTING SAVE DESIGNATION)

| SENDER | info@bbmail.jp |
|---|---|
| TITLE | NEWSLETTER, PART-TIME JOB INFORMATION |
| EMAIL BODY EXCERPT | WE CAN PROVIDE YOU WITH A GREAT PART-TIME JOB FOR THE SUMMER VACATION... |

MATERIAL ATTACHMENT MARK

[DELETE] [MOVE] [REPLY]

SAVE MARKS: [IMPORTANT SAVE] [CONFIRMATION REQUIRED] [REPLY REQUIRED] [NORMAL SAVE]

EMAIL BODY CONTENTS: [SCHEDULE] [CONTACT INFORMATION] [MEETING INVITATION] [ACCOUNTING] [INSTRUCTIONS]

ATTACHMENT CONTENTS: [PDOCUMENTS] [PHOTOS] [VIDEOS] [VOICE/AUDIO]
[MAPS] [NAME LISTS] [MANUALS] [ITINERARIES] [RECORDS] [BALANCES]

EMAIL ORGANIZING BOXES: [COMPANY GENERAL AFFAIRS] [COMPANY ACCOUNTANT] [COMPANY BUSINESS] [COMPANY TECHNOLOGIES] [FACTORIES]
[BRANCH A] [BRANCH B] [BRANCH C] [BRANCH D]
[CLIENT 1] [CLIENT 2] [CLIENT 3] [CLIENT 4] [CLIENT 5]
[PRIVATE] [SCHOOL] [CLUB] [COMMUNITY SERVICE] [SHRINES] [HOBBIES]
[OTHERS]

COMMENT INPUT: [_____]

[EXECUTE]  [SORTING MARK MANAGEMENT]

3000

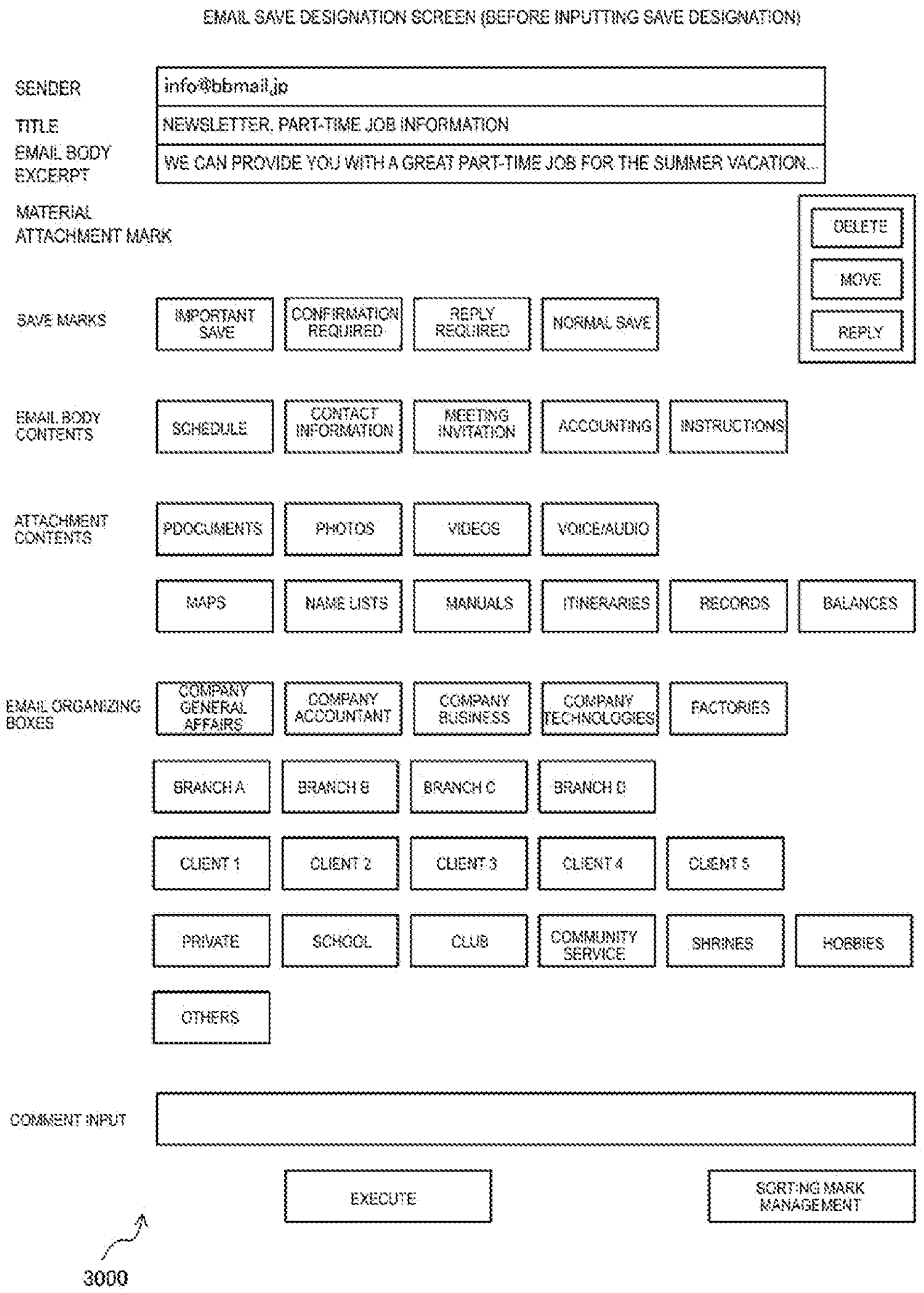

Fig. 49

EMAIL SAVE DESIGNATION SCREEN (BEFORE INPUTTING SAVE DESIGNATION)

| SENDER | CHIHIRO FUKUYAMA |
|---|---|
| TITLE | (NO TITLE) |
| EMAIL BODY EXCERPT | THANK YOU VERY MUCH FOR THE OTHER DAY. I'M PLEASED TO SEND THE PHOTOS ♡ |
| MATERIAL ATTACHMENT MARK | * |

DELETE
MOVE
REPLY

SAVE MARKS: IMPORTANT SAVE | CONFIRMATION REQUIRED | REPLY REQUIRED | NORMAL SAVE

EMAIL BODY CONTENTS: SCHEDULE | CONTACT INFORMATION | MEETING INVITATION | ACCOUNTING | INSTRUCTIONS

ATTACHMENT CONTENTS: PDOCUMENTS | PHOTOS | VIDEOS | VOICE/AUDIO
MAPS | NAME LISTS | MANUALS | ITINERARIES | RECORDS | BALANCES

EMAIL ORGANIZING BOXES:
COMPANY GENERAL AFFAIRS | COMPANY ACCOUNTANT | COMPANY BUSINESS | COMPANY TECHNOLOGIES | FACTORIES
BRANCH A | BRANCH B | BRANCH C | BRANCH D
CLIENT 1 | CLIENT 2 | CLIENT 3 | CLIENT 4 | CLIENT 5
PRIVATE | SCHOOL | CLUB | COMMUNITY SERVICE | SHRINES | HOBBIES
OTHERS

COMMENT INPUT:

EXECUTE      SORTING MARK MANAGEMENT

3000

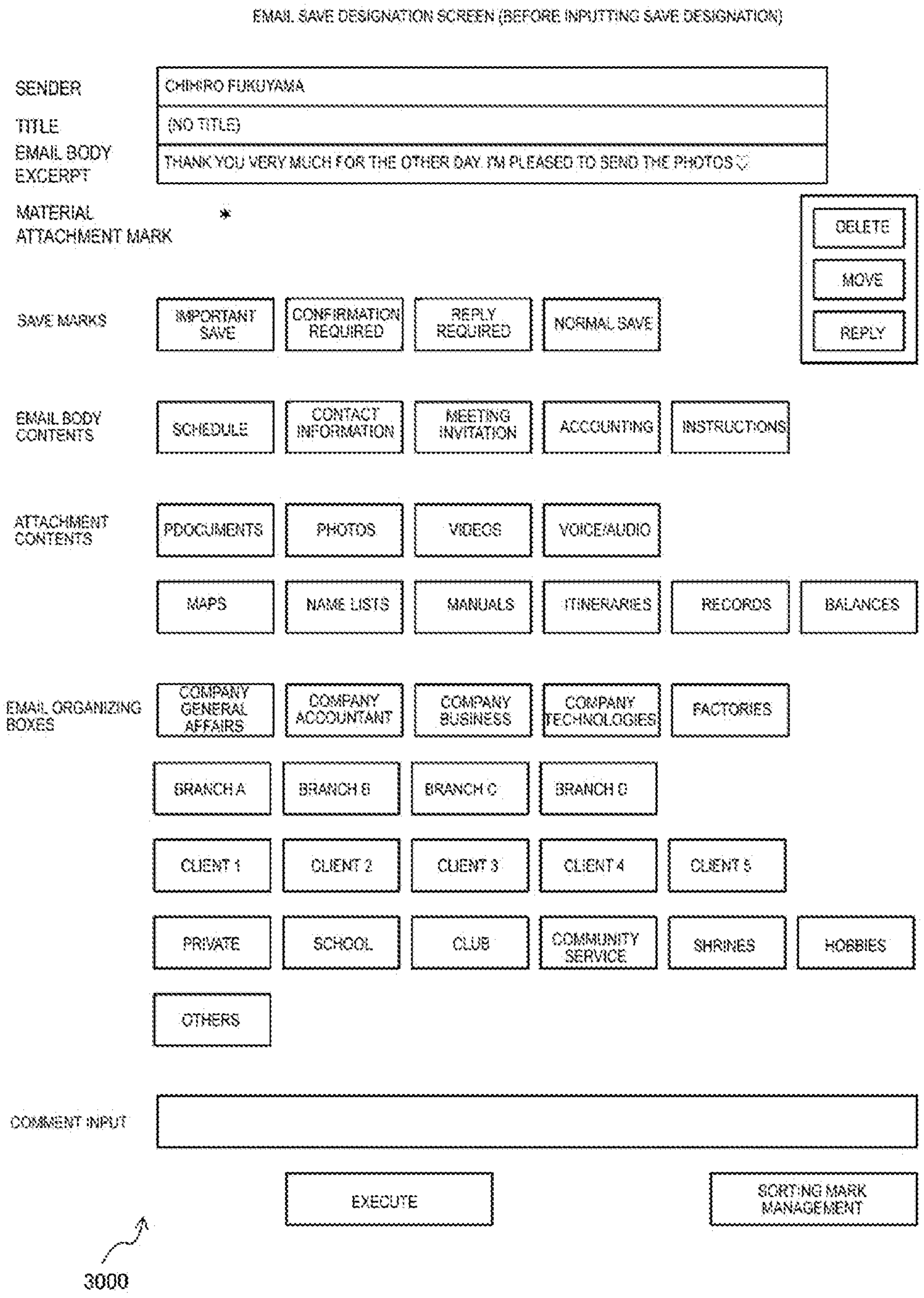

Fig. 51

EMAIL SAVE DESIGNATION SCREEN (AFTER INPUTTING SAVE DESIGNATION)

| SENDER | CHIHIRO FUKUYAMA |
| --- | --- |
| TITLE | (NO TITLE) |
| EMAIL BODY EXCERPT | THANK YOU VERY MUCH FOR THE OTHER DAY. I'M PLEASED TO SEND THE PHOTOS ♡ |
| MATERIAL ATTACHMENT MARK | * |

DELETE
MOVE
REPLY

SAVE MARKS: IMPORTANT SAVE | CONFIRMATION REQUIRED | REPLY REQUIRED | NORMAL SAVE

EMAIL BODY CONTENTS: SCHEDULE | CONTACT INFORMATION | MEETING INVITATION | ACCOUNTING | INSTRUCTIONS

ATTACHMENT CONTENTS: PDOCUMENTS | PHOTOS | VIDEOS | VOICE/AUDIO
MAPS | NAME LISTS | MANUALS | ITINERARIES | RECORDS | BALANCES

EMAIL ORGANIZING BOXES: COMPANY GENERAL AFFAIRS | COMPANY ACCOUNTANT | COMPANY BUSINESS | COMPANY TECHNOLOGIES | FACTORIES
BRANCH A | BRANCH B | BRANCH C | BRANCH D
CLIENT 1 | CLIENT 2 | CLIENT 3 | CLIENT 4 | CLIENT 5
PRIVATE | SCHOOL | CLUB | COMMUNITY SERVICE | SHRINES | HOBBIES
OTHERS

COMMENT INPUT:

EXECUTE     SORTING MARK MANAGEMENT

3000

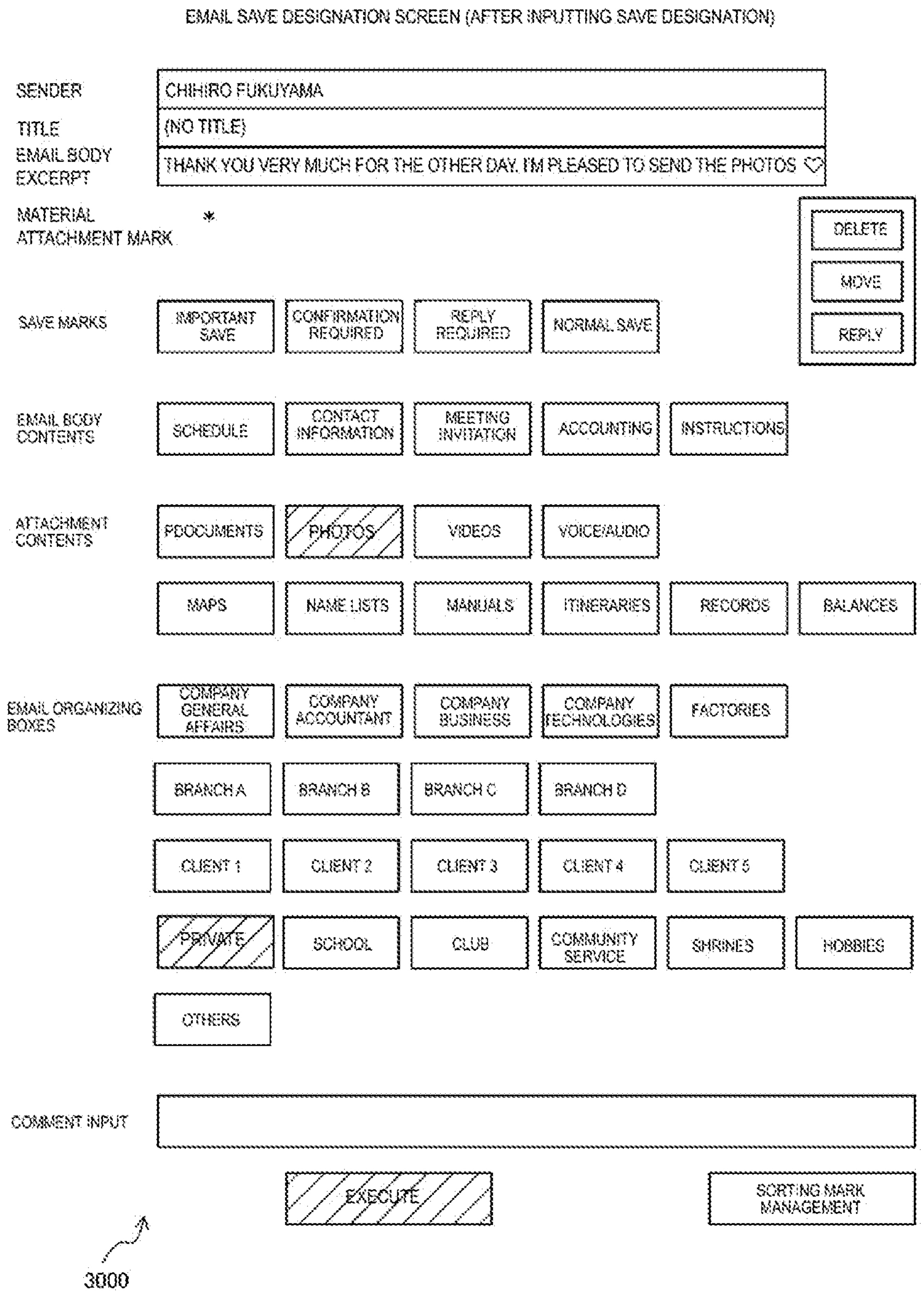

Fig. 52

EMAIL SAVE DESIGNATION SCREEN (BEFORE INPUTTING SAVE DESIGNATION)

| | |
|---|---|
| SENDER | KIKUCHI NORIO |
| TITLE | ABOUT CHAIN SAW |
| EMAIL BODY EXCERPT | I'M PLEASED TO SEND THE VIDEO OF THE WORKSHOP OTHER DAY TO YOU. IT IS THE DEMONSTRATION OF HANDLING THE CHAIN SAW. |

MATERIAL ATTACHMENT MARK    *

[DELETE] [MOVE] [REPLY]

SAVE MARKS: [IMPORTANT SAVE] [CONFIRMATION REQUIRED] [REPLY REQUIRED] [NORMAL SAVE]

EMAIL BODY CONTENTS: [SCHEDULE] [CONTACT INFORMATION] [MEETING INVITATION] [ACCOUNTING] [INSTRUCTIONS]

ATTACHMENT CONTENTS: [PDOCUMENTS] [PHOTOS] [VIDEOS] [VOICE/AUDIO]
[MAPS] [NAME LISTS] [MANUALS] [ITINERARIES] [RECORDS] [BALANCES]

EMAIL ORGANIZING BOXES: [COMPANY GENERAL AFFAIRS] [COMPANY ACCOUNTANT] [COMPANY BUSINESS] [COMPANY TECHNOLOGIES] [FACTORIES]
[BRANCH A] [BRANCH B] [BRANCH C] [BRANCH D]
[CLIENT 1] [CLIENT 2] [CLIENT 3] [CLIENT 4] [CLIENT 5]
[PRIVATE] [SCHOOL] [CLUB] [COMMUNITY SERVICE] [SHRINES] [HOBBIES]
[OTHERS]

COMMENT INPUT: [                    ]

[EXECUTE]    [SORTING MARK MANAGEMENT]

3000

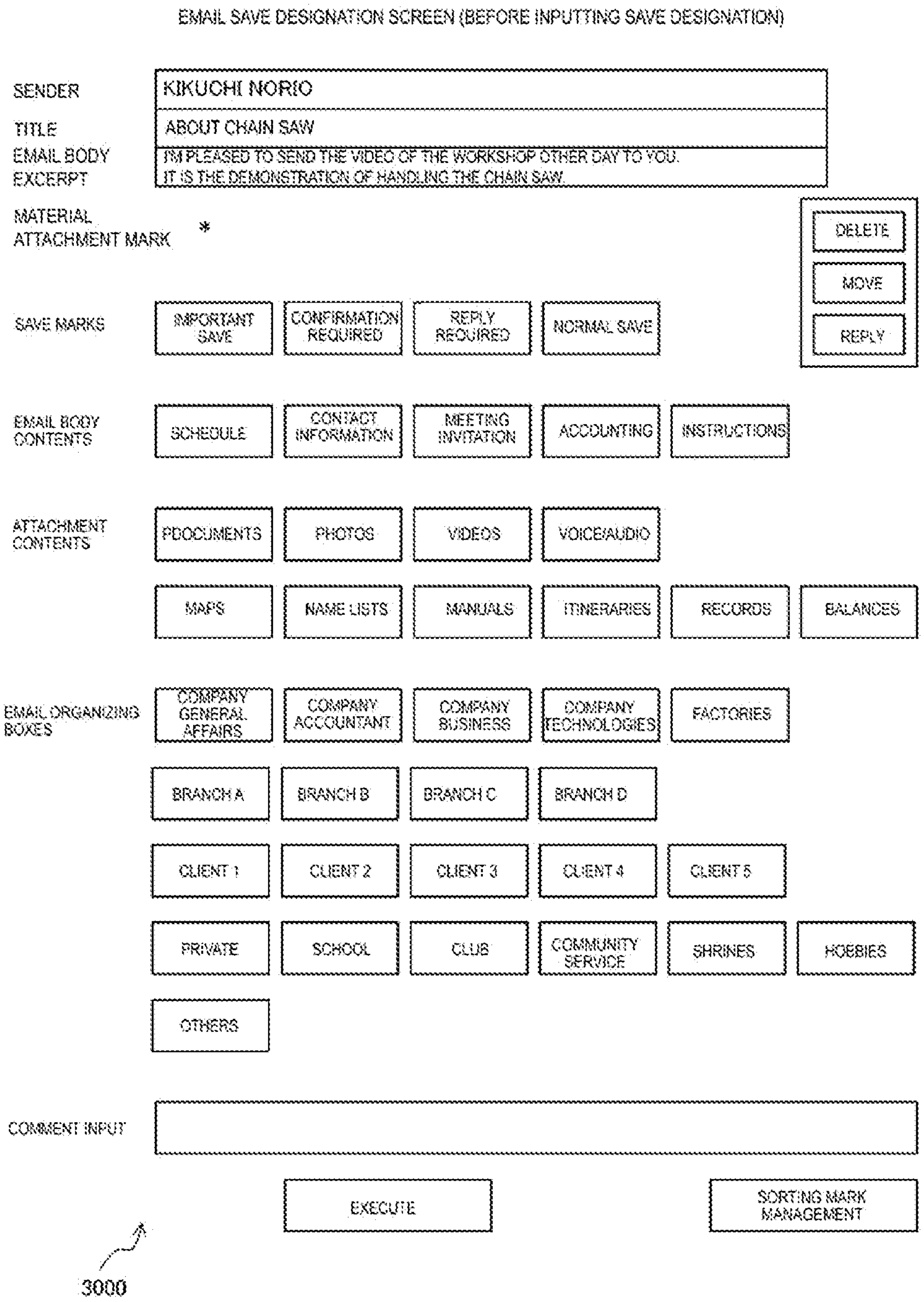

Fig. 53

EMAIL SAVE DESIGNATION SCREEN (AFTER INPUTTING SAVE DESIGNATION)

| Field | Value |
|---|---|
| SENDER | KIKUCHI NORIO |
| TITLE | ABOUT CHAIN SAW |
| EMAIL BODY EXCERPT | I'M PLEASED TO SEND THE VIDEO OF THE WORKSHOP OTHER DAY TO YOU. IT IS THE DEMONSTRATION OF HANDLING THE CHAIN SAW. |
| MATERIAL ATTACHMENT MARK | * |

Buttons: DELETE, MOVE, REPLY

SAVE MARKS: IMPORTANT SAVE | CONFIRMATION REQUIRED | REPLY REQUIRED | NORMAL SAVE

EMAIL BODY CONTENTS: SCHEDULE | CONTACT INFORMATION | MEETING INVITATION | ACCOUNTING | INSTRUCTIONS

ATTACHMENT CONTENTS: PDOCUMENTS | PHOTOS | VIDEOS | VOICE/AUDIO
MAPS | NAME LISTS | MANUALS | ITINERARIES | RECORDS | BALANCES

EMAIL ORGANIZING BOXES: COMPANY GENERAL AFFAIRS | COMPANY ACCOUNTANT | COMPANY BUSINESS | COMPANY TECHNOLOGIES | FACTORIES
BRANCH A | BRANCH B | BRANCH C | BRANCH D
CLIENT 1 | CLIENT 2 | CLIENT 3 | CLIENT 4 | CLIENT 5
PRIVATE | SCHOOL | CLUB | COMMUNITY SERVICE | SHRINES | HOBBIES
OTHERS

COMMENT INPUT: FOREST VOLUNTEER ASSOCIATION, DEMONSTRATION OF HANDLING A CHAIN SAW (MR. KIKUCHI)

EXECUTE | SORTING MARK MANAGEMENT

3000

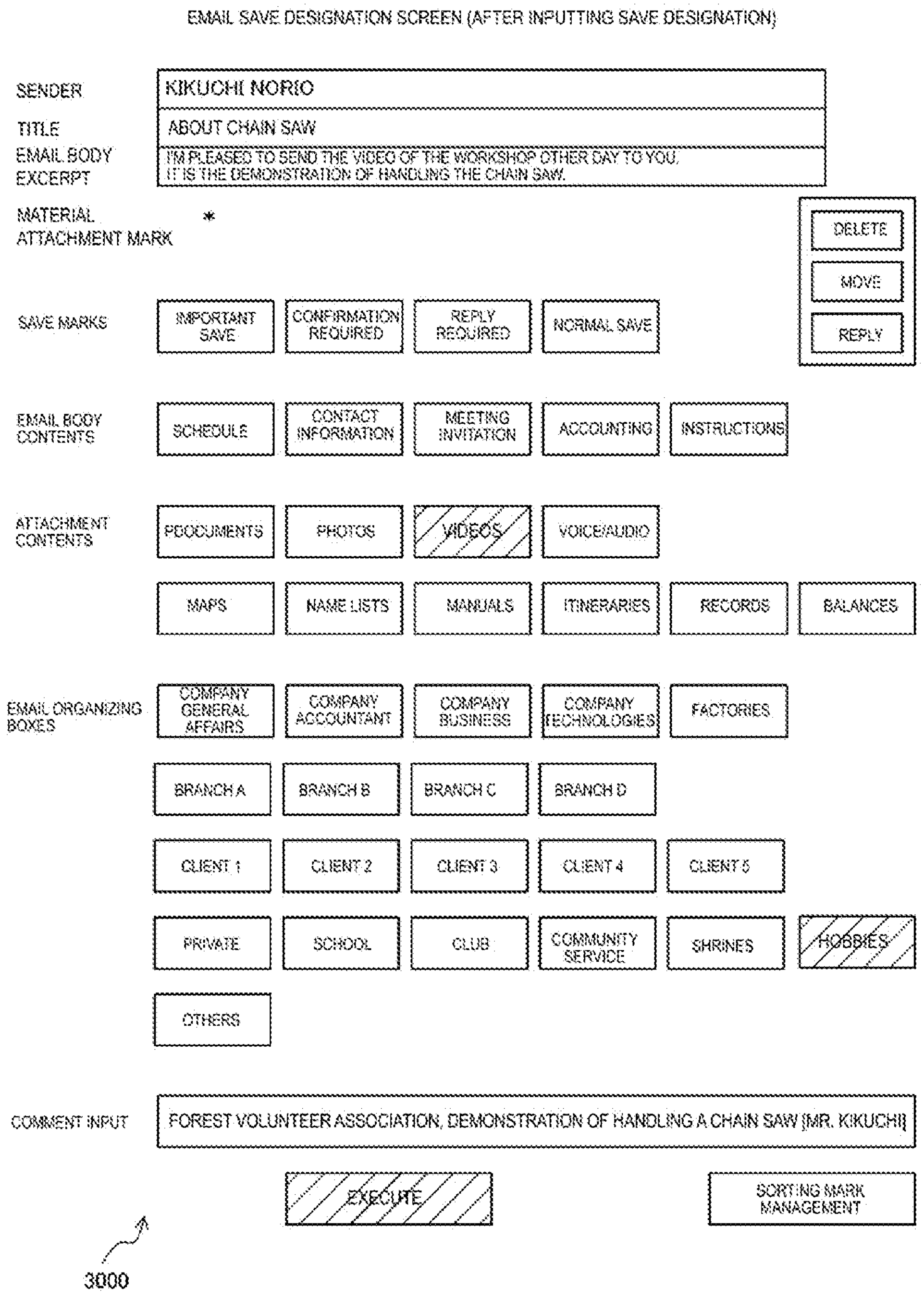

Fig. 54

EMAIL SAVE DESIGNATION SCREEN (BEFORE INPUTTING SAVE DESIGNATION)

| SENDER | HIROSHIGE KOBAYASHI |
|---|---|
| TITLE | BOAT CLUB CONTEMPORARIES NAME LIST |
| EMAIL BODY EXCERPT | I HAVE UPDATED THE BOAT CLUB CONTEMPORARIES NAME LIST. KINDLY RECEIVE IT. |

MATERIAL ATTACHMENT MARK    *

[DELETE] [MOVE] [REPLY]

SAVE MARKS: [IMPORTANT SAVE] [CONFIRMATION REQUIRED] [REPLY REQUIRED] [NORMAL SAVE]

EMAIL BODY CONTENTS: [SCHEDULE] [CONTACT INFORMATION] [MEETING INVITATION] [ACCOUNTING] [INSTRUCTIONS]

ATTACHMENT CONTENTS: [PDOCUMENTS] [PHOTOS] [VIDEOS] [VOICE/AUDIO]
[MAPS] [NAME LISTS] [MANUALS] [ITINERARIES] [RECORDS] [BALANCES]

EMAIL ORGANIZING BOXES: [COMPANY GENERAL AFFAIRS] [COMPANY ACCOUNTANT] [COMPANY BUSINESS] [COMPANY TECHNOLOGIES] [FACTORIES]
[BRANCH A] [BRANCH B] [BRANCH C] [BRANCH D]
[CLIENT 1] [CLIENT 2] [CLIENT 3] [CLIENT 4] [CLIENT 5]
[PRIVATE] [SCHOOL] [CLUB] [COMMUNITY SERVICE] [SHRINES] [HOBBIES]
[OTHERS]

COMMENT INPUT: [                    ]

[EXECUTE]    [SORTING MARK MANAGEMENT]

↗ 3000

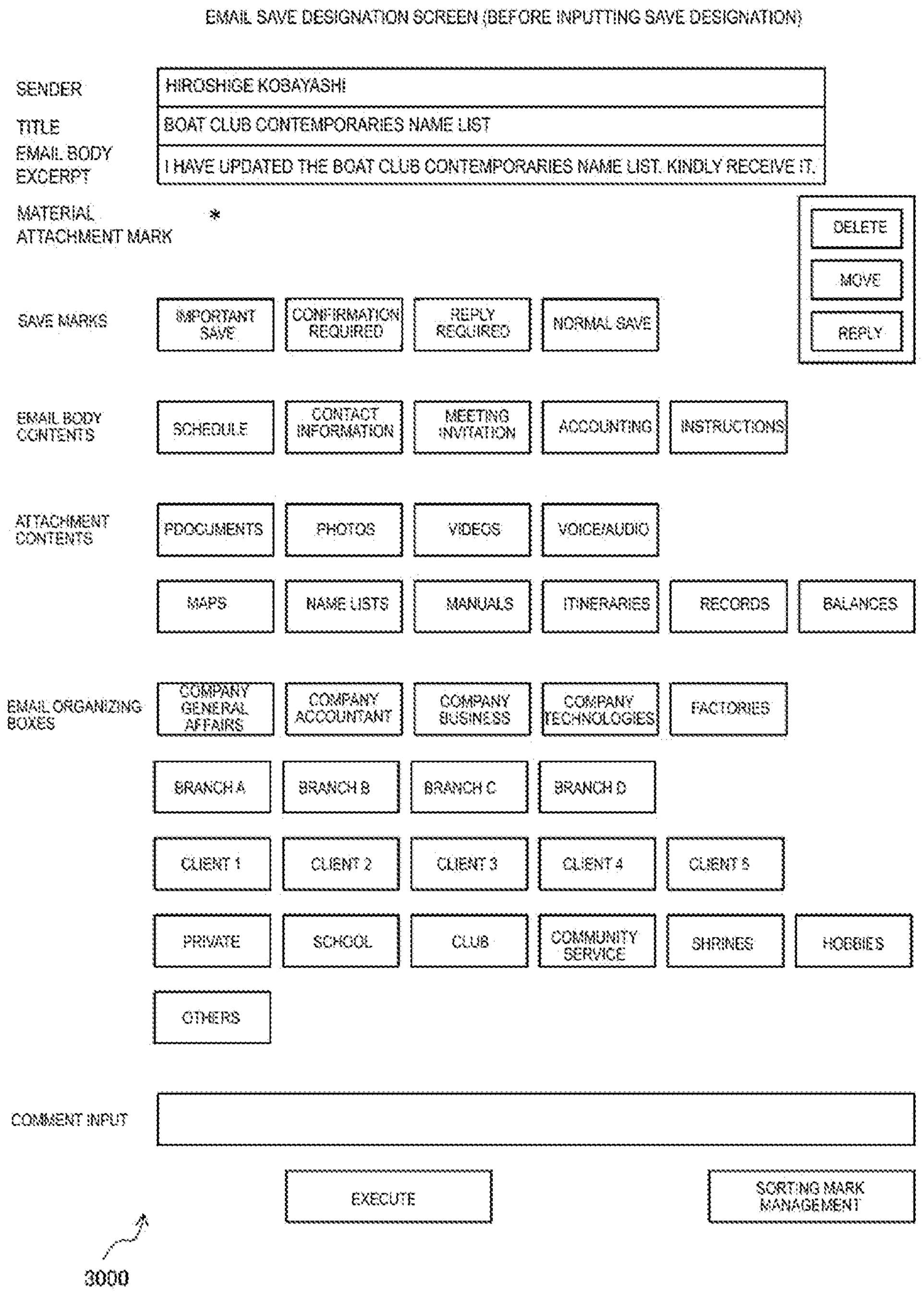

Fig. 57

EMAIL SAVE DESIGNATION SCREEN (BEFORE INPUTTING SAVE DESIGNATION)

| Field | Value |
|---|---|
| SENDER | HIROSHIGE KOBAYASHI |
| TITLE | BOAT CLUB CONTEMPORARIES NAME LIST |
| EMAIL BODY EXCERPT | I HAVE UPDATED THE BOAT CLUB CONTEMPORARIES NAME LIST. KINDLY RECEIVE IT. |
| MATERIAL ATTACHMENT MARK | * |

DELETE  MOVE  REPLY

SAVE MARKS: IMPORTANT SAVE | CONFIRMATION REQUIRED | REPLY REQUIRED | NORMAL SAVE

EMAIL BODY CONTENTS: SCHEDULE | CONTACT INFORMATION | MEETING INVITATION | ACCOUNTING | INSTRUCTIONS

ATTACHMENT CONTENTS: 
- PDOCUMENTS | PHOTOS | VIDEOS | VOICE/AUDIO
- MAPS | NAME LISTS | MANUALS | ITINERARIES | RECORDS | BALANCES

EMAIL ORGANIZING BOXES:
- COMPANY GENERAL AFFAIRS | COMPANY ACCOUNTANT | COMPANY BUSINESS | COMPANY TECHNOLOGIES | FACTORIES
- BRANCH A | BRANCH B | BRANCH C | BRANCH D
- CLIENT 1 | CLIENT 2 | CLIENT 3 | CLIENT 4 | CLIENT 5
- PRIVATE | SCHOOL | CLUB | COMMUNITY SERVICE | SHRINES | HOBBIES
- OTHERS

COMMENT INPUT: BOAT CLUB CONTEMPORARIES NAME LIST, 2018

EXECUTE    SORTING MARK MANAGEMENT

3000

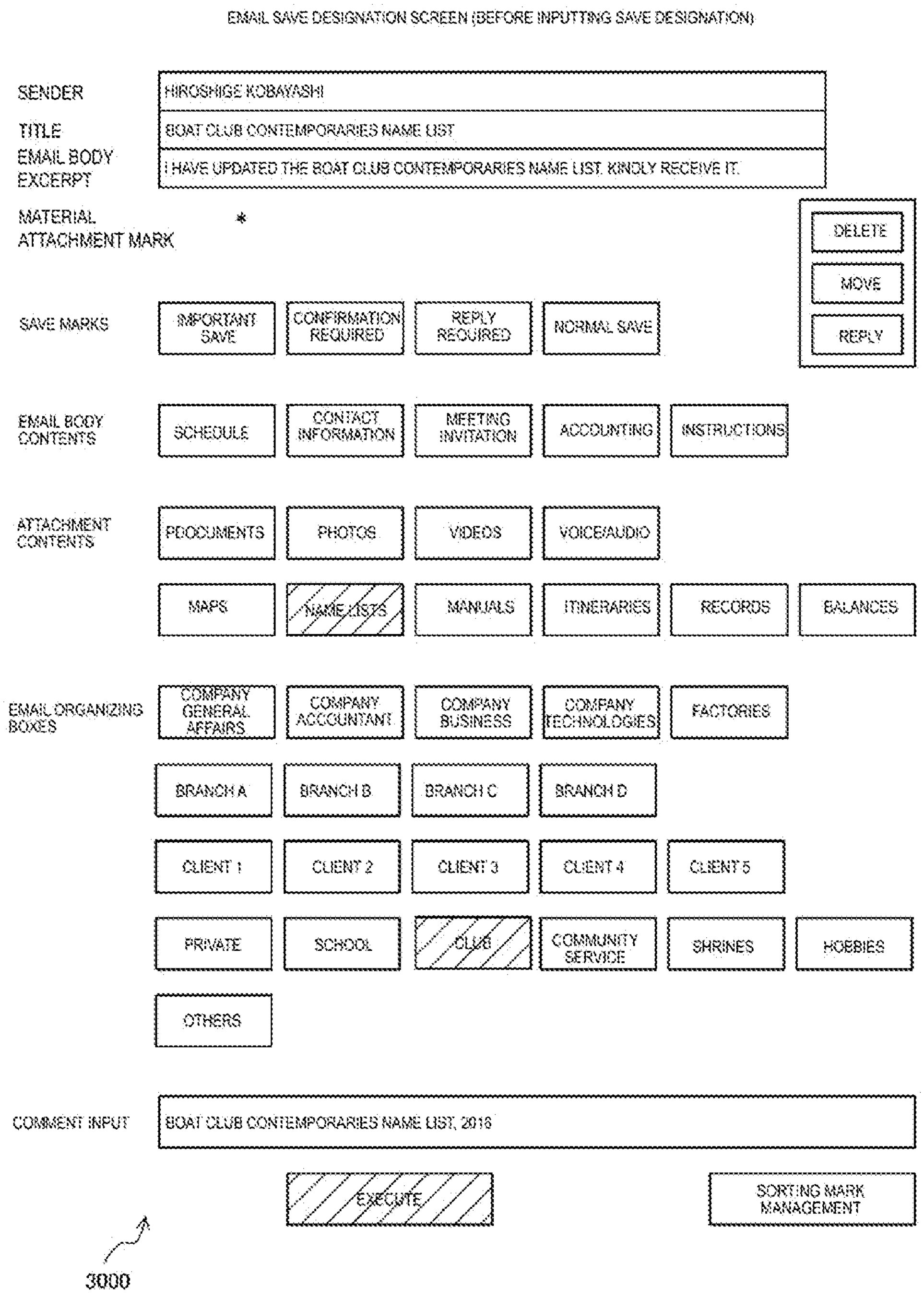

Fig. 58

SORTING MARK ADDITION SCREEN

| Category | Items | | | |
|---|---|---|---|---|
| SAVE MARKS | IMPORTANT SAVE | CONFIRMATION REQUIRED | REPLY REQUIRED | NORMAL SAVE | ADD |
| EMAIL BODY CONTENTS | SCHEDULE | CONTACT INFORMATION | MEETING INVITATION | ACCOUNTING | INSTRUCTIONS | ADD |
| ATTACHMENT CONTENTS | DOCUMENTS | PHOTOS | VIDEOS | VOICE/AUDIO | |
| | MAPS | NAME LISTS | MANUALS | ITINERARIES | RECORDS | BALANCES | ADD |
| EMAIL ORGANIZING BOXES | COMPANY GENERAL AFFAIRS | COMPANY ACCOUNTANT | COMPANY BUSINESS | COMPANY TECHNOLOGIES | FACTORIES |
| | BRANCH A | BRANCH B | BRANCH C | BRANCH D | |
| | CLIENT 1 | CLIENT 2 | CLIENT 3 | CLIENT 4 | CLIENT 5 |
| | PRIVATE | SCHOOL | CLUB | COMMUNITY SERVICE | SHRINES | HOBBIES |
| | OTHERS | | | | |
| ADD | | | | | |

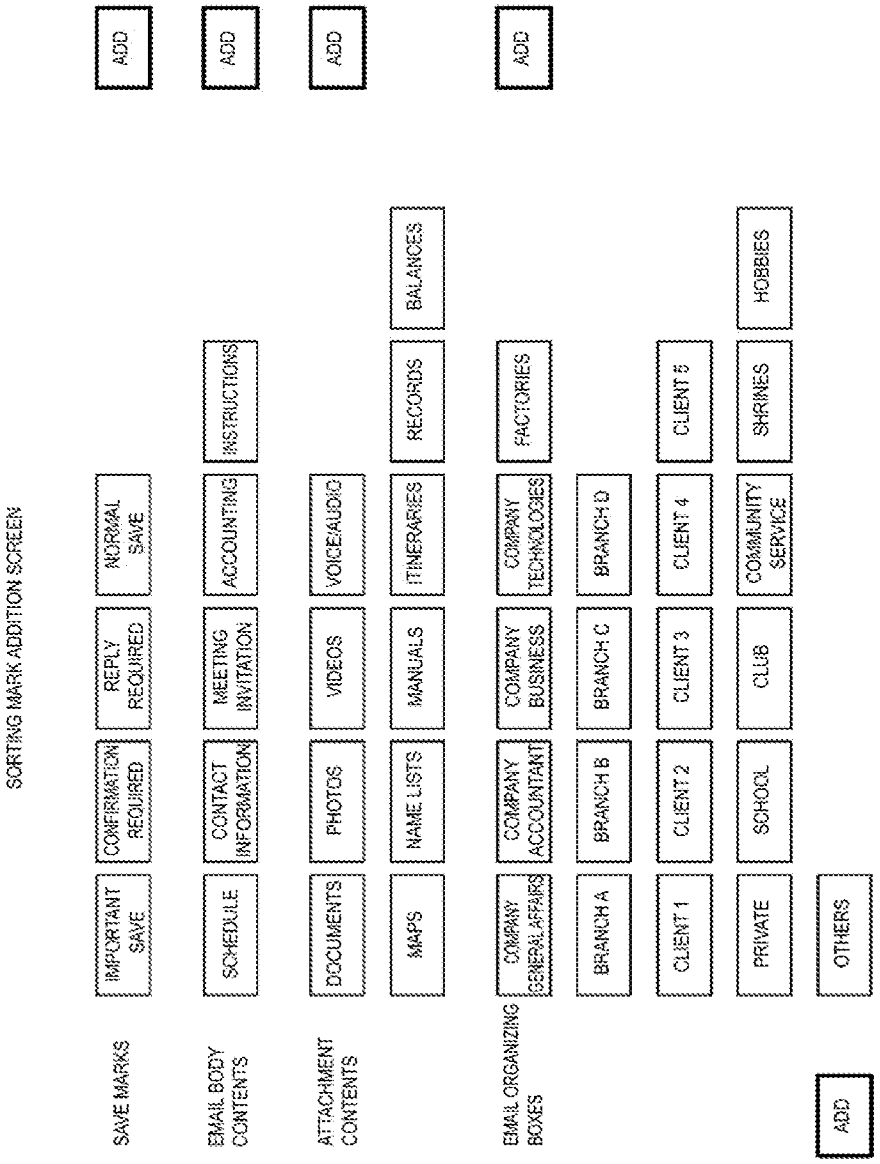

Fig. 59

| MAJOR CLASSIFICATION (FIRST HIERARCHY) | MINOR CLASSIFICATION (SECOND HIERARCHY) | |
|---|---|---|
| EMAIL ACTIONS | REPLY REQUIRED / ACTION REQUIRED / CONFIRMATION REQUIRED / CONSIDERATION REQUIRED | ADD |
| ATTACHMENTS | PHOTOS / VIDEOS / MUSIC / LINKS | ADD |
| SENDERS | NAME LISTS / ADDRESS / TEL NO / EMAIL ADDRESS | ADD |
| SENDER (ORGANIZATIONS) | SCHOOL / WORK / CLIENTS / NEIGHBORHOOD / CLUB / VOLUNTEER | ADD |
| SCHEDULE | INVITATIONS / DATES TIMES / PLACES / DIRECTIONS / PREPARES | |
| CONTENTS | SCREENING / PLANS / PROJECTS / IDEAS / HISTORY / HISTORICAL TIMELINE / MAPS / DRAWINGS / PROSE / ESSAYS / POEMS / CONTRACTS / WRITTEN PROPOSALS / OFFICIAL DOCUMENTS | ADD |
| CONTENT CATEGORIES | SCREENING / REPORTS / RECORDS / DOCUMENTS / MANUALS | ADD |
| MONEY | EXPENSES / ACCOUNTING / BALANCES / BUDGETS / CLOSED ACCOUNT / ESTIMATIONS / INVOICES / RECEIPTS / CREDITS / DEBITS | ADD |
| ADD | | |

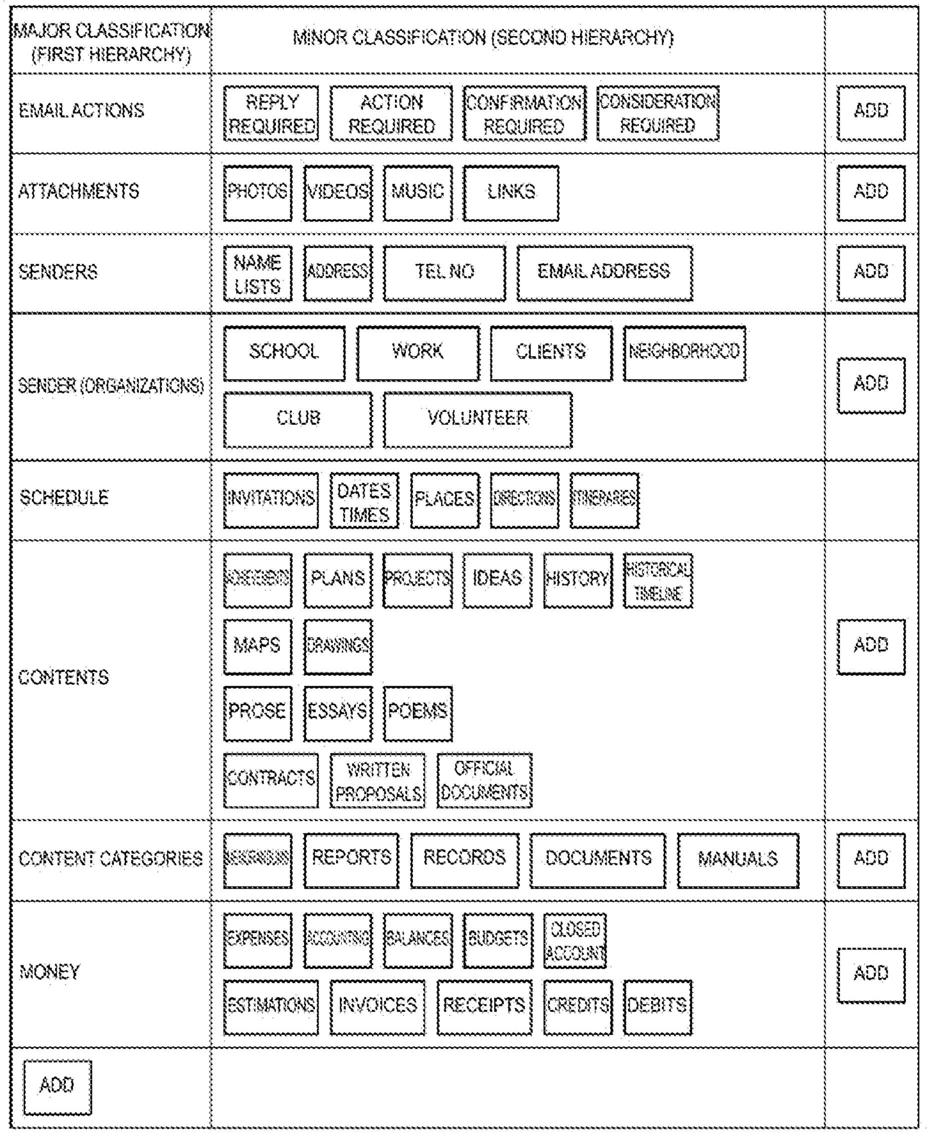

Fig. 61

SEARCH RESULT SCREEN

| SENDER | COMMENT INPUT | TITLE | EMAIL BODY EXCERPT | MATERIAL ATTACHMENT MARK |
|---|---|---|---|---|
| abcd@mico.jo | FISCAL 2016 BUDGET, JANUARY DEADLINE | FISCAL 2016 BUDGET | I AM OSAKI IN THE GENERAL AFFAIRS DIVISION. PLEASE SEND THE FISCAL 2016 BUDGET TO THE GENERAL AFFAIRS DIVISION UNTIL THE END OF JANUARY | ※ |
| yonekura@utn.com | YONEKURA INDUSTRY, APPOINTMENT ON JANUARY 29TH, AT 14:30, PRESIDENT YONEKURA'S MOBILE | RE: PLEASE MAKE AN APPOINTMENT | I HAVE RECEIVED YOUR EMAIL. WOULD IT BE CONVENIENT FOR YOU ON 29 JANUARY, 14:00 AT OUR COMPANY CONFERENCE ROOM? MY MOBILE NUMBER IS AS BELOW JUST FOR THE RECORD | |

[IMPORTANT SAVE]

6000

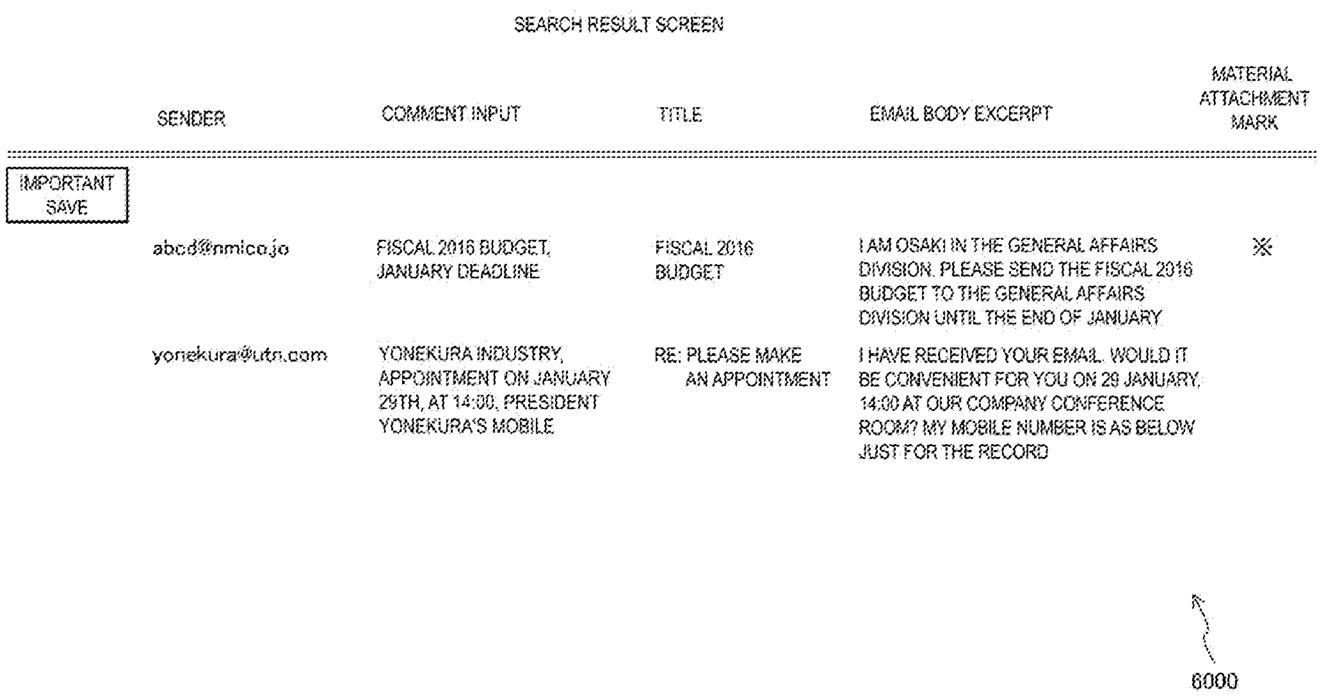

Fig. 64

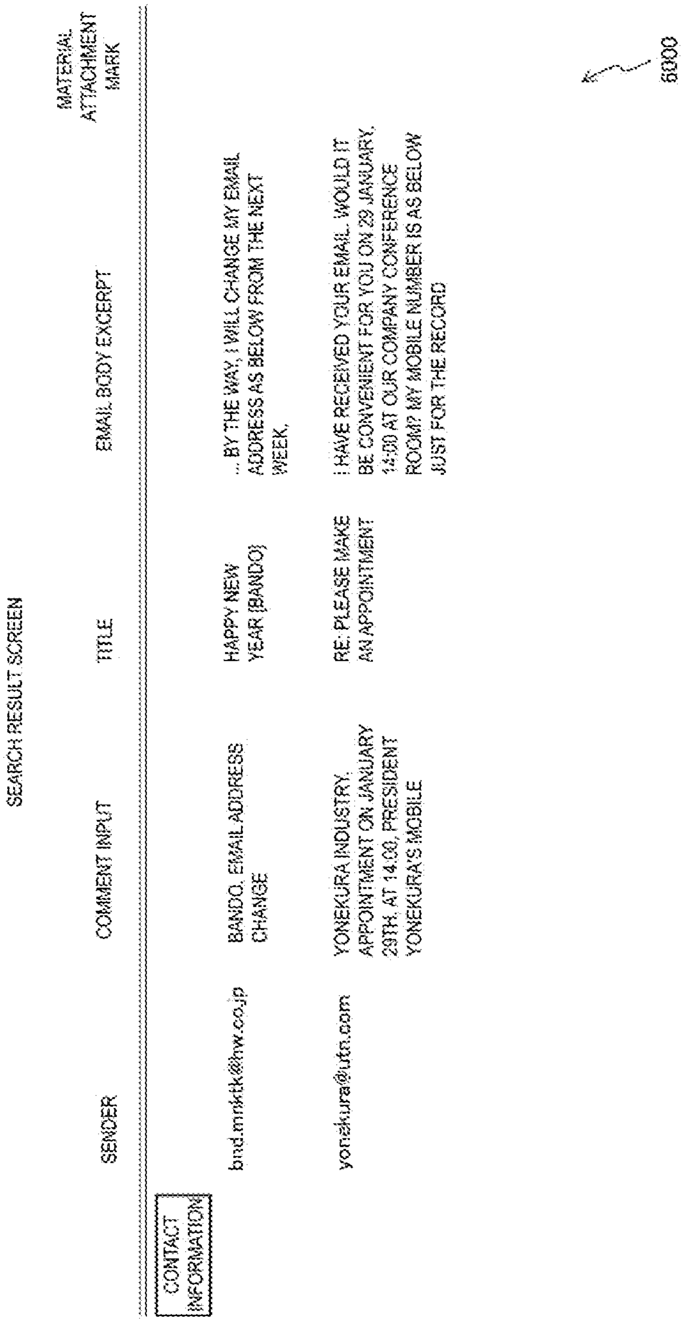

Fig. 65

SEARCH RESULT SCREEN

| SENDER | COMMENT INPUT | TITLE | EMAIL BODY EXCERPT | MATERIAL ATTACHMENT MARK |
|---|---|---|---|---|
| bnd.mnktk@hw.co.jp | BANDO. EMAIL ADDRESS CHANGE | HAPPY NEW YEAR (BANDO) | ... BY THE WAY, I WILL CHANGE MY EMAIL ADDRESS AS BELOW FROM THE NEXT WEEK. | |
| yonekura@utn.com | YONEKURA INDUSTRY. APPOINTMENT ON JANUARY 29TH. AT 14:00, PRESIDENT YONEKURA'S MOBILE | RE: PLEASE MAKE AN APPOINTMENT | I HAVE RECEIVED YOUR EMAIL. WOULD IT BE CONVENIENT FOR YOU ON 29 JANUARY, 14:30 AT OUR COMPANY CONFERENCE ROOM? MY MOBILE NUMBER IS AS BELOW JUST FOR THE RECORD. | |

[CONTACT INFORMATION]

6000

SEARCH RESULT SCREEN

| SENDER | COMMENT INPUT | TITLE | EMAIL BODY EXCERPT | MATERIAL ATTACHMENT MARK |
|---|---|---|---|---|
| ishihara@cormail.com | SUGINOMORI SHRINE PARISHIONER MEMBER NAME LIST, 2016 | SUGINOMORI SHRINE, NEW YEAR PARTY | THE PARTICIPANTS OF NEW YEAR PARTY ARE LISTED IN THE ATTACHMENT. | ※ |
| HIROSHIGE KOBAYASHI | BOAT CLUB CONTEMPORARIES NAME LIST, 2016 | BOAT CLUB CONTEMPORARIES NAME LIST | I HAVE UPDATED THE BOAT CLUB CONTEMPORARIES NAME LIST KINDLY RECEIVE IT. | ※ |

NAME LISTS

6000

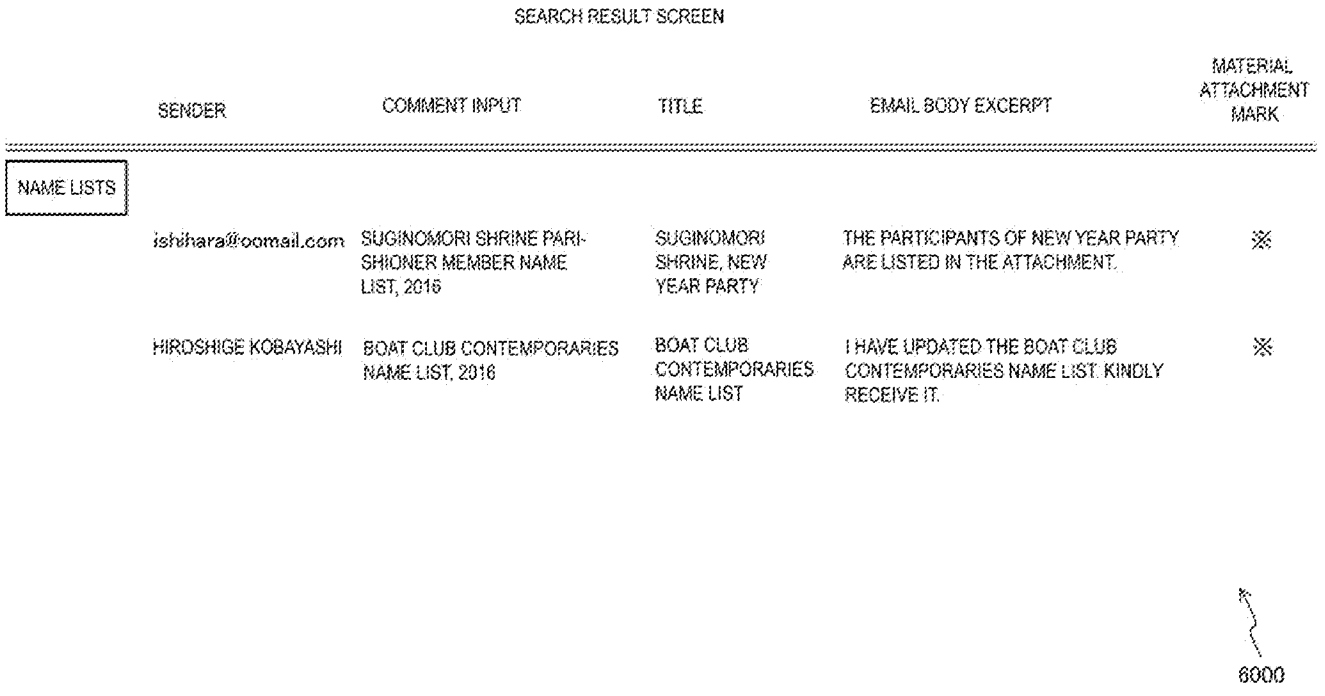

Fig. 66

SEARCH RESULT SCREEN

| SENDER | COMMENT INPUT | TITLE | EMAIL BODY EXCERPT | MATERIAL ATTACHMENT MARK |
|---|---|---|---|---|
| KIKUCHI NORIO | FOREST VOLUNTEER ASSOCIATION, DEMONSTRATION OF HANDLING A CHAIN SAW [MR. KIKUCHI] | ABOUT CHAIN SAW | I'M PLEASED TO SEND THE VIDEO OF THE WORKSHOP OTHER DAY TO YOU. IT IS THE DEMONSTRATION OF HANDLING THE CHAIN SAW. | ※ |

VIDEOS

6000

EMAIL FILE-AND-REFER SYSTEM

TECHNICAL FIELD

The present invention relates to an email file-and-refer system.

BACKGROUND ART

There exists an email file-and-refer system which is configured to save sent or received emails in a terminal device and allow the saved emails to be easily searched for, to manage the sent or received emails.

CITATION LIST

Patent Literature

PTL 1: JP 2005-020684 A

SUMMARY OF INVENTION

Technical Problem

Email has been a communication means necessary for modern people. On the other hand, there is no shortage of peoples who lose emails. In this case, "losing" means that due to too many received or sent emails, particularly received emails, the emails are buried in the saved emails, making it hard to identify where the email of interest is saved and to easily find the e-mail at a later date.

Even ordinary people receive a considerably large number of emails because not only emails for communication with specific people but also various emails such as advertisement emails, news emails, simultaneous distributing emails are received. Unless emails saved or selected appropriately, the number of received emails will increase enormously.

When surveying the problems concerning email saving on a long-term basis, it is apparent that the rapid spread of personal computers (PCs) and the Internet has involved the individual ownership of a large amount of digital electronic among ordinary people in the present age. Among such information, most of information from third parties is transmitted by way of emails and saved on PCs. In general, emails in PCs are saved chronologically. When a person wants to view again data that had been saved for a long time, it is not easy to find. Example: Searching for saved data from ten years ago, and in the future, saved data from 50 years ago (with regards to digital archive/digital legacy).

Here, the loss of emails is caused in part by how emails are created. Email inherently involves simple communication between the parties involved, and thus, the sender generally has little interest in the title of an email. There are various emails such as those which do not have an email title, have an unclear email title, have an email title not representing its content but rather the sender name or greetings, emails for which the title is irrelevant to the subject in the email, emails that are exchanged while keeping an old title, and emails which include attachments that are not represented by the email title. For this reason, when a user desires to read a specific email at a later date, having access to only the title is useless and the email may not be found as a consequence, and in the worst case scenario the user has to read all the emails one by one to locate the lost email. This is what is meant by loss of emails.

Careless thinking on the email senders part about the title may be explained by any of the following reasons. First, when conversations become lively in email exchanges, people may refrain from title changing as it may interrupt the conversation. In other words, it comes from an instinct to retain the same thread. Alternatively, when an email receiver receives many emails, the sender may write his/her name in the tile if he/she wants the receiver to read his/her email as quickly as possible. Alternatively, in the case that a delicate subject or a sensitive matter is being discussed, the title may be intentionally made vague. Alternatively, a title may be unnecessary because communication with each other is taking place in real time, and the like. Although there are various reasons, a considerable difference is generated between the title written by the email sender and the content, and it has been recognized that in actuality, the title is not useful to explain the content of the email.

There is a method for showing the degree of importance for important emails. For example, a method of showing a flag mark and the like may be used. However, in this method, in a case where there are multiple emails having a high degree of importance, multiple markers indicating a high degree-of-importance will be shown, which is confusing. The presence of many flags confuses the viewer.

There is a method for classifying emails into categories to save the emails. For example, classification by clients and the like may be used. However, in this method, if the emails are classified into categories and saved, the user may become careless and as a result, emails which have a high degree of importance may be completely forgotten. This is similar to a squirrel that diligently stores acorns in certain places, but cannot retrieve them when needed as he had forgotten where he had stored them.

There is a method whereby the recipient can give an important email a new title explaining its content and sending the email to himself/herself. However, in this method, the number of received and sent emails which are already high may further increase, leading to overloading sooner or later.

There is a method whereby the recipient gives a title to an important email, and downloads a file to the desktop of the PC or the like and saves the file. However, this takes a lot of time and effort with regards to PC operations to continuously increase the saved data without limit, obviously leading to difficulty in management of the data in the future. Moreover, the connection between the email receiving and sending screens and the saved files is broken which makes searching at a later date difficult.

Even if an email is determined to have a high degree of importance, when reading the email at a later date, in some cases it may be impossible to recall which emails are high in degree of importance. The importance of the email may be recognized only after reviewing communications before and after the email having a high degree of importance, but degree of importance may not be recognized by extracting only the email out of context of the email thread.

If a received email requires a reply and the recipient intends to send a reply after consideration, the user may forget to reply due to carelessness.

The present invention has been made in consideration of the above problems and has an object to provide an email file-and-refer system or an email file-and-refer program that are capable of easily and conveniently searching for a desired email from the received or sent emails.

Solution to Problem

An embodiment of an email file-and-refer program according to the present invention is an email file-and-refer program executed in a terminal device, wherein the terminal device includes a sending and receiving unit to send or receive communication information including emails, a storage unit to store communication information including emails sent or received, a display unit to display communication information including emails sent or received, an operation unit operable by a user, and a control unit to execute the following processes:

(1-1) a selection process to select either of a link process or an email search process based on an operation of the operation unit;

(1-2) when the link process is selected by the process (1-1), (1-2-1) a display process to display sorting marks to sort the received or sent emails, each sorting mark belonging to any of a plurality of hierarchies, wherein the display process displays the sorting mark belonging to a first hierarchy along a first direction and the sorting mark belonging to a second hierarchy along a second direction different from the first direction so as to display the sorting marks to be distributed on the display unit, and (1-2-2) a link process to link the sorting mark displayed by the process (1-2-1) to the email based on the operation of the operating unit; and (1-3) when the email search process is selected by the process (1-1), (1-3-1) a display process to display the sorting marks belonging to the first hierarchy along the first direction and the sorting marks belonging to the second hierarchy along the second direction so as to display the sorting marks to be distributed on the display, (1-3-2) a sorting mark designating process to designate the sorting mark displayed by the process (1-3-1) based on the operation of the operating unit, and (1-3-3) an extracting process to extract the emails linked to the sorting marks designated by the process (1-3-2).

Another embodiment of an email file-and-refer program according to the present invention is an email file-and-refer program executed in a terminal device, wherein the terminal device includes a sending and receiving unit to send or receive communication information including emails, a storage unit to store communication information including emails sent or received, a display unit to display communication information including emails sent or received, an operation unit operable by a user, and a control unit to execute the following processes:

(1-1) a selection process to select either of a link process or an email search process based on an operation of the operation unit;

(1-2) when the link process is selected by the process (1-1), (1-2-1) a display process to display sorting marks to sort the received or sent emails in a first hierarchy and a second hierarchy different from the first hierarchy, wherein the display process displays the sorting mark belonging to the first hierarchy along a first direction, and the sorting mark belonging to the second hierarchy along a second direction different from the first direction so as to display the sorting mark belonging to the first hierarchy and the sorting mark belonging to the second hierarchy on the display unit in matrix, and (1-2-2) a link process to link the sorting mark displayed by the process (1-2-1) to the email based on the operation of the operating unit; and (1-3) when the email search process is selected by the process (1-1), (1-3-1) a display process to display sorting marks dividing into the first and second hierarchies, wherein the display process displays the sorting marks belonging to the first hierarchy along the first direction, and the sorting marks belonging to the second hierarchy along the second direction so as to display the sorting mark belonging to the first hierarchy and the sorting mark belonging to the second hierarchy on the display unit in matrix, (1-3-2) a sorting mark designating process to designate the sorting mark displayed by the process (1-3-1) based on the operation of the operating unit, and (1-3-3) an extracting process to extract the emails linked to the sorting marks designated by the process (1-3-2).

Still another embodiment of an email file-and-refer program according to the present invention is an email file-and-refer program executed in a terminal device, wherein the terminal device includes a sending and receiving unit to send or receive communication information including emails, a storage unit to store communication information including emails sent or received, a display unit to display communication information including emails sent or received, an operation unit operable by a user, and a control unit to execute the following processes:

(1-1) a selection process to select either of a link process or an email search process based on an operation of the operation unit;

(1-2) when the link process is selected by the process (1-1), (1-2-1) a display process to display sorting marks to sort the received or sent emails in a first hierarchy and a second hierarchy different from the first hierarchy, wherein the display process displays the sorting marks belonging to the first hierarchy in an individual area along a first direction only in a non-hierarchical embodiment, displays the sorting marks belonging to the second hierarchy along to a second direction different from the first direction in a non-hierarchical embodiment, and restricts the display in the hierarchical embodiment so as to display the sorting marks dividing on the display unit, and (1-2-2) a link process to link the sorting mark displayed by the process (1-2-1) to the email based on the operation of the operating unit; and (1-3) when the email search process is selected by the process (1-1), (1-3-1) a display process to display sorting marks dividing into a first hierarchy and a second hierarchy different from the first hierarchy, wherein the display process displays the sorting marks belonging to the first hierarchy in an individual area along the first direction only in a non-hierarchical embodiment, displays the sorting marks belonging to the second hierarchy along to the second direction different from the first direction in a non-hierarchical embodiment, and restricts the display in the hierarchical embodiment so as to display the sorting marks dividing on the display unit, (1-3-2) a sorting mark designating process to designate the sorting mark displayed by the process (1-3-1) based on the operation of the operating unit, and (1-3-3) an extracting process to extract the emails linked to the sorting marks designated by the process (1-3-2).

Further, it is possible to view easily and conveniently the sorting marks by visualizing the hierarchies and displaying the sorting marks dividing, thus the designating operation of the sorting marks for linkage to the emails or for emails search is also easily and conveniently performed.

Advantageous Effects of Invention

The ability to easily and conveniently search for a desired email from received or sent emails.

BRIEF DESCRIPTION OF DRAWINGS

FIG. 28 is a table showing an example of a sorting mark management table of two-hierarchy.

FIG. 29 is a table showing an example of a selection setting table.

FIG. 30 is a table showing an example of a sorting mark management table of three-hierarchy.

FIG. 31 is a table showing an example of an email file-and-refer table.

FIG. 32A is a diagram illustrating an example of an email file-and-refer menu and FIG. 32B is a diagram illustrating an example of a sorting mark management menu.

FIG. 33 is a table showing an example of a search selection setting table.

FIG. 34 is a diagram illustrating an example of an email reception screen.

FIG. 37 is a diagram illustrating an example of an email save designation screen (before inputting a save designation).

FIG. 38 is a diagram illustrating an example of an email save designation screen (after inputting a save designation).

FIG. 39 is a diagram illustrating an example of an email save designation screen (before inputting a save designation).

FIG. 40 is a diagram illustrating an example of an email save designation screen (after inputting a save designation).

FIG. 41 is a diagram illustrating an example of an email save designation screen (before inputting a save designation).

FIG. 43 is a diagram illustrating an example of an email save designation screen (before inputting a save designation).

FIG. 46 is a diagram illustrating an example of an email save designation screen (after inputting a save designation).

FIG. 47 is a diagram illustrating an example of an email save designation screen (before inputting a save designation).

FIG. 48 is a diagram illustrating an example of an email save designation screen (after inputting a save designation).

FIG. 49 is a diagram illustrating an example of an email save designation screen (before inputting a save designation).

FIG. 51 is a diagram illustrating an example of an email save designation screen (before inputting a save designation).

FIG. 52 is a diagram illustrating an example of an email save designation screen (after inputting a save designation).

FIG. 53 is a diagram illustrating an example of an email save designation screen (before inputting a save designation).

FIG. 54 is a diagram illustrating an example of an email save designation screen (after inputting a save designation).

FIG. 57 is a diagram illustrating an example of an email save designation screen (before inputting a save designation).

FIG. 58 is a diagram illustrating an example of an email save designation screen (after inputting a save designation).

FIG. 59 a diagram illustrating an example of a sorting mark addition screen.

FIG. 61 is a diagram illustrating an example of models for newly creating a sorting mark.

FIG. 64 is a diagram illustrating an example of a search result screen.

FIG. 65 is a diagram illustrating an example of the search result screen.

FIG. 66 is a diagram illustrating an example of the search result screen.

DESCRIPTION OF EMBODIMENTS

Outline of Present Embodiment

First Embodiment

Figure 1:
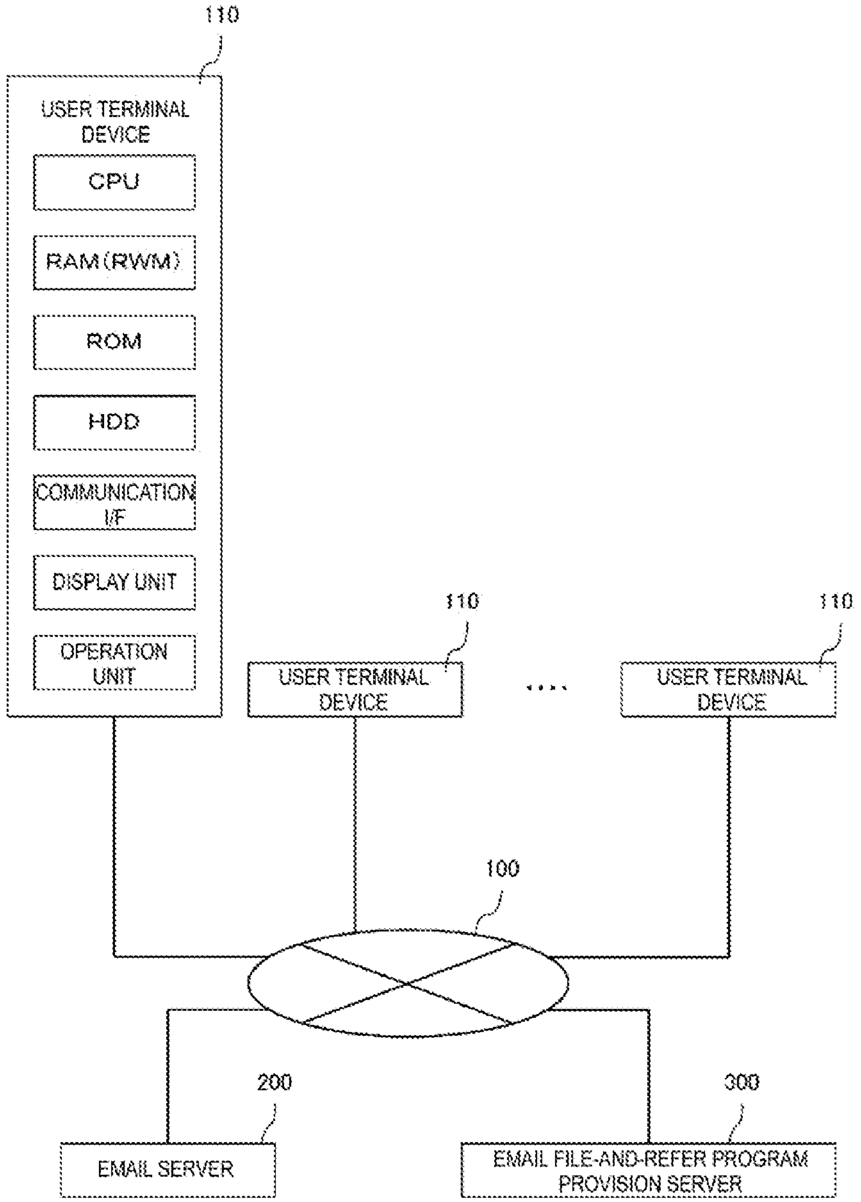
FIG. 1 is a schematic diagram illustrating an email file-and-refer system 10 according to the present embodiment.

According to a first embodiment of the present invention, an email file-and-refer program is provided, which is executed in a terminal device (e.g., a user terminal device 110 described later), the terminal device including a sending and receiving unit to send or receive communication information including emails, a storage unit to store communication information including emails sent or received, a display unit to display communication information including emails sent or received, an operation unit operable by a user, and a control unit to execute the following processes:

(1-1) a selection process (e.g., a process in FIG. 5 described later or the like) to select either a link process or an email search process, based on an operation of the operation unit;

(1-2) when the link process is selected by the process (1-1), (1-2-1) a display process (e.g., a process at step T702 in FIG. 7 described later) to display sorting marks to sort the received or sent emails, each sorting mark belonging to any of plural hierarchies, the display process displaying the sorting marks belonging to a first hierarchy along a first direction and the sorting marks belonging to a second hierarchy along a second direction different from the first direction so as to display the sorting marks on the display unit to be distributed: and (1-2-2) a link process (e.g., a process at step T1922 in FIG. 19 described later) to link the sorting mark displayed by the process (1-2-1) to the email, based on the operation of the operating unit; and (1-3) when the email search process is selected by the process (1-1), (1-3-1) a display process (e.g., a process at step T2002 in FIG. 20 described later) to display the sorting marks belonging to the first hierarchy along the first direction and the sorting marks belonging to the second hierarchy along the second direction so as to display the sorting marks on the display unit to be distributed;

(1-3-2) a sorting mark designating process (e.g., a process at step T2116 in FIG. 21 described later) to designate the sorting mark(s) displayed by the process (1-3-1), based on the operation of the operating unit; and (1-3-3) an extracting process (e.g., a process at step T2308 in FIG. 23 described later) to extract the email(s) linked to the sorting mark(s) designated by the process (1-3-2).

The first embodiment of the email file-and-refer program is executed in a terminal device.

The terminal device includes a sending and receiving unit, a storage unit, a display unit, an operation unit, and a control unit. The sending and receiving unit sends or receives communication information including emails. The storage unit stores communication information including emails sent or received. The display unit displays communication information including emails sent or received. The operation unit is configured operable by a user. The control unit executes the following processes (1-1), (1-2) and (1-3).

The process (1-1) selects based on the operation of the operation unit either a link process or an email search process. By a user operation, either of the link process or the email search process is selected.

The process (1-2) is a process performed when the link process is selected by the process (1-1).

The process (1-2-1) is the display process to display the sorting marks to sort the received or sent emails. Each sorting mark belongs to any of a plurality of hierarchies. The sorting mark belonging to the first hierarchy is displayed along the first direction and the sorting mark belonging to the second hierarchy is displayed along the second direction different from the first direction. By displaying in this way, the sorting marks are displayed to be distributed on the display unit.

The process (1-2-2) is to link the sorting mark displayed by the process (1-2-1) to an email, based on the operation of the operation unit. The sorting mark may be linked to the email.

The process (1-3) is a process performed when the email search process is selected by the process (1-1).

The process (1-3-1) is the same process as the process (1-2-1).

The process (1-3-2) is a process to designate, the sorting mark displayed by the process (1-3-1), based on the operation of the operation unit.

The process (1-3-3) is a process to extract the email linked to the sorting mark designated by the process (1-3-2).

The process (1-2) links a sorting mark to an email. The process (1-3) extracts the email linked to the designated sorting mark. In this way, the user may search the sent and received emails to find a desired email from the sent and received emails by the sorting mark linked to the emails.

Further in the processes (1-2) and (1-3), the sorting marks belonging to the first hierarchy are displayed along the first direction and the sorting marks belonging to the second hierarchy are displayed along the second direction. For example, the sorting marks belonging to the first hierarchy and the sorting marks belonging to the second hierarchy are displayed in matrix. Therefore, it is possible to visualize the hierarchies consisting of the sorting marks. Further, it is possible to view easily and conveniently the sorting marks, thus a linkage to the emails and designate process of the sorting marks to search emails are also easily and conveniently performed.

On the display unit, not only the sorting marks belonging to two hierarchies, that is, the sorting marks belonging to the first hierarchy and the sorting marks belonging to the second hierarchy, but also sorting marks belonging to three or more hierarchies including, for example, sorting marks belonging to a third hierarchy may be displayed to be divided. For example, a list of the sorting marks belonging to the first hierarchy, sorting marks belonging to the second hierarchy, and sorting marks belonging to the third hierarchy can be displayed. Furthermore, the hierarchies can be displayed in a stereoscopic aspect or some of the hierarchies can be selectively displayed. Furthermore, scrolling display can be also made to display only some of the hierarchies or sorting marks. Any display manner may be used so long as it can display the sorting marks belonging to two or more hierarchies to be distributed on the display unit.

Second Embodiment

A second embodiment further includes, in the first embodiment of the present invention, (2-1) a sample sorting mark display process (e.g., a process at step T1702 in FIG. 17 described later) to display predetermined sample sorting marks each belonging to the respective plural hierarchies, wherein the sorting mark display process displays the sample sorting marks belonging to the first hierarchy along the first direction and the sample sorting marks belonging to the second hierarchy along the second direction so as to display the sample sorting marks on the display unit to be distributed, and (2-2) a sorting mark edit process (e.g., a process at step T1706 to T1720 in FIG. 17 described later) to edit the sample sorting marks, based on the operation of the operation unit, so that the intention of the user may be reflected by changing or deleting of the sample sorting marks, or adding a new sorting mark.

The predetermined sample sorting marks, that is, model sorting marks, are provided, and thus the user can use the model sorting marks without change if the user requires no change, which facilitates the management of the sorting marks.

The user, if requiring a change in the sorting marks, can change, delete, and add the sorting mark, which allows the user to make the sorting marks suitable to the user's preference and usage.

Third Embodiment

According to a third embodiment of the present invention, in the first embodiment of the present invention, the process (1-3-1) includes (1-3-1-1) a process (e.g., a process at step T2002 in FIG. 20 described later) to display the sorting marks such that a display manner for a used sorting mark which is already used for a linkage to the email in the process (1-2-2) is different from a display manner for a non-used sorting mark which is still not used for the linkage to the email in the process (1-2-2), and the process (1-3-2) includes (1-3-2-1) a process (e.g., a process at step T2108 in FIG. 21 described later) to enable the used sorting mark to be designated and disable the non-used sorting mark to be designated by the operation of the operation unit.

The sorting marks are displayed such that the display manner for the used sorting mark is different from the display manner for the non-used sorting mark, which makes it possible to clearly indicate to the user that the non-used sorting mark is not a target to be searched.

Furthermore, the non-used sorting mark which is not allowed to be designated by the user is excluded from the search target, which can prevent unnecessary search processes from being executed.

Fourth Embodiment

According to a fourth embodiment of the present invention, in the first embodiment of the present invention, the process (1-2) further includes (1-2-3) a text information input process (e.g., a process at step T1202 in FIG. 12 described later) to input text information, based on the operation of the operation unit, and (1-2-4) a link process (e.g., a process at step T1922 in FIG. 12 described later) to link the text information input by the process (1-2-3) to the email.

The text information, that is, a comment, can be also linked to the email, and thus, not only the sorting mark common to the plural emails but also information unique to each email can be linked, which is advantageous. Only providing the sorting mark makes it difficult to search and find the searched email with pinpoint accuracy when searching for the email at a later date. This is because a title attached to the email frequently considerably differs from the email body. Therefore, it is important to record what is saved in an email save comment using the user's own words such that the email can be searched for and found with pinpoint accuracy when searching at a later date.

Fifth Embodiment

A fifth embodiment of the present invention further includes, in the first embodiment of the present invention, (5-1) a specific link process (e.g., a process in FIG. 25 described later) to link a specific sorting mark to an email if any of the sorting marks is not linked to the email after a predetermined time period elapses from when the email is received or sent.

If any of the sorting marks is not linked to the email even after a predetermined time period elapses from when the email is received or sent, a specific sorting mark is linked to the email. This allows the user to recognize that no sorting mark is linked to the email even after a predetermined time period elapses.

Sixth Embodiment

A sixth embodiment of the present invention further includes, in the first embodiment of the present invention, (6-1) a notification process (e.g., a process in FIG. 26 described later) to notify that there is a sorting mark not used for the linkage if any after a predetermined time period elapses.

If a sorting mark, even if it has been set once, is not used for a predetermined time period, the user can be notified that there is an unused sorting mark and thus, provided with an opportunity for reviewing the sorting marks.

Seventh Embodiment

Furthermore, according to a seventh embodiment of the present invention, a server providing an email file-and-refer program to a terminal device is provided, the terminal device including a sending and receiving unit to send or receive communication information including emails, a storage unit to store communication information including emails sent or received, a display unit to display communication information including emails sent or received, an operation unit operable by a user, and a control unit to execute the email file-and-refer program received by the sending and receiving unit, the email file-and-refer program causing the control unit to execute following processes:

(1-1) a selection process to select either a link process or an email search process, based on an operation of the operation unit;

(1-2) when the link process is selected by the process (1-1), (1-2-1) a first display process to display sorting marks to sort the received or sent emails, each sorting mark belonging to any of a plurality hierarchies, wherein the display process displays the sorting marks belonging to a first hierarchy along a first direction and the sorting marks belonging to a second hierarchy along a second direction different from the first direction so as to display the sorting marks on the display unit to be distributed, and (1-2-2) a link process to link the sorting mark displayed by the process (1-2-1) to the email, based on the operation of the operating unit; and (1-3) when the email search process is selected by the process (1-1), (1-3-1) a second display process to display the sorting marks belonging to the first hierarchy along the first direction and the sorting marks belonging to the second hierarchy along the second direction so as to display the sorting marks on the display unit to be distributed;

(1-3-2) a sorting mark designating process to designate the sorting mark(s) displayed by the process (1-3-1), based on the operation of the operating unit; and (1-3-3) an extracting process to extract the email(s) linked to the sorting mark(s) designated by the process (1-3-2).

Eighth Embodiment

According to an eighth embodiment of the present invention, in the seventh embodiment of the present invention, the server is capable of providing to the terminal device predetermined sample sorting marks each belonging to any of a plurality of hierarchies and provides the email file-and-refer program causing the control unit to further execute following processes:

(2-1) a sample sorting mark display process to display the sample sorting marks belonging to the first hierarchy along the first direction and the sample sorting marks belonging to the second hierarchy along the second direction so as to display the sample sorting marks on the display unit to be distributed, and (2-2) a sorting mark edit process to edit the sample sorting marks, based on the operation of the operation unit, so that the intention of the user may be reflected by changing or deleting the sample sorting marks, or adding a new sorting mark.

Ninth Embodiment

A ninth embodiment of the present invention, in the seventh embodiment of the present invention, provides the email file-and-refer program causing the control unit to execute following processes:

in the process (1-3-1)

(1-3-1-1) a process to display the sorting marks such that a display manner for a used sorting mark which is already used for a linkage to the email in the process (1-2-2) is different from a display manner for a non-used sorting mark which is still not used for the linkage to the email in the process (1-2-2); and in the process (1-3-2)

(1-3-2-1) a process to enable the used sorting mark to be designated and disable the non-used sorting mark to be designated by the operation of the operation unit.

Tenth Embodiment

A tenth embodiment of the present invention, in the seventh embodiment of the present invention, provides the email file-and-refer program causing the control unit to further execute following processes:

in the process (1-2)

(1-2-3) a text information input process to input text information, based on the operation of the operation unit, and (1-2-4) a link process to link the text information input by the process (1-2-3) to the email.

Eleventh Embodiment

An eleventh embodiment of the present invention, in the seventh embodiment of the present invention, provides the email file-and-refer program causing the control unit to further execute following process:

(5-1) a specific link process to link a specific sorting mark to an email if any of the sorting marks is not linked to the email after a predetermined time period elapses from when the email is received or sent.

Twelfth Embodiment

A twelfth embodiment of the present invention, in the seventh embodiment of the present invention, provides the email file-and-refer program causing the control unit to further execute following process:

(6-1) a notification process to notify that there is a sorting mark not used for the linkage if any after a predetermined time period elapses.

Thirteenth Embodiment

Furthermore, according to a thirteenth embodiment of the present invention, an email file-and-refer method for managing emails in a terminal device is provided, the terminal device including a sending and receiving unit to send or receive communication information including emails, a storage unit to store communication information including emails sent or received, a display unit to display communication information including emails sent or received, an operation unit operable by a user, and a control unit to execute the various processes, the method including:

(1-1) a step of selecting either a link step or an email search step, based on an operation of the operation unit;

(1-2) when the link step is selected in the step (1-1), (1-2-1) a step of displaying sorting marks to sort the received or sent emails, each sorting mark belonging to any of a plurality of hierarchies, wherein the sorting marks belonging to a first hierarchy is displayed along a first direction and the sorting marks belonging to a second hierarchy is displayed along a second direction different from the first direction so as to display the sorting marks on the display unit to be distributed; and (1-2-2) a step of linking the sorting mark displayed in the step (1-2-1) to the email, based on the operation of the operating unit; and (1-3) when the email search step is selected in the step (1-1), (1-3-1) a step of displaying the sorting marks belonging to the first hierarchy along the first direction and the sorting marks belonging to the second hierarchy along the second direction so as to display the sorting marks on the display unit to be distributed;

(1-3-2) a step of designating the sorting mark(s) displayed in the step (1-3-1) based on the operation of the operating unit; and (1-3-3) a step of extracting the email(s) linked to the sorting mark(s) designated in the step (1-3-2).

Fourteenth Embodiment

A fourteenth embodiment of the present invention further includes, in the thirteenth embodiment of the present invention, (2-1) a step of displaying predetermined sample sorting marks each belonging to the any of a plurality of hierarchies, wherein the sample sorting marks belonging to the first hierarchy are displayed along the first direction and the sample sorting marks belonging to the second hierarchy are displayed along the second direction so as to display the sample sorting marks on the display unit to be distributed, and (2-2) a step of editing the sample sorting marks, based on the operation of the operation unit, so that an intention of the user may be reflected by changing or deleting of the sample sorting marks, or adding a new sorting mark.

Fifteenth Embodiment

According to a fifteenth embodiment of the present invention, in the thirteenth embodiment of the present invention, the step (1-3-1) includes (1-3-1-1) a step of displaying the sorting marks such that a display manner for a used sorting mark which is already used for a linkage to the email in the step (1-2-2) is different from a display manner for a non-used sorting mark which is still not used for the linkage to the email in the step (1-2-2), and the step (1-3-2) includes (1-3-2-1) a step of enabling the used sorting mark to be designated and disabling the non-used sorting mark to be designated by the operation of the operation unit.

Sixteenth Embodiment

According to a sixteenth embodiment of the present invention, in the thirteenth embodiment of the present invention, the step (1-2) further includes (1-2-3) a step of inputting text information, based on the operation of the operation unit, and (1-2-4) a step of linking the text information input in the step (1-2-3) to the email.

Seventeenth Embodiment

A seventeenth embodiment of the present invention further includes, in the thirteenth embodiment of the present invention, (5-1) a step of linking a specific sorting mark to an email if any of the sorting marks is not linked to the email after a predetermined time period elapses from when the email is received or sent.

Eighteenth Embodiment

An eighteenth embodiment of the present invention further includes, in the thirteenth embodiment of the present invention, (6-1) a step of notifying that there is a sorting mark not used for the linkage if any after a predetermined time period elapses.

Details of Present Embodiments

Hereinafter, a description is given of the embodiments based on the drawings.

<<<Email File-and-Refer System 10>>>

FIG. 1 is a schematic diagram illustrating an email file-and-refer system 10 according to the present embodiment. The email file-and-refer system 10 mainly includes an email server 200, an email file-and-refer program provision server 300, and a user terminal device 110. The email server 200, the email file-and-refer program provision server 300, and plural user terminal devices 110 are connected to be communicable with each other via a network 100.

FIG. 1 illustrates one email server 200 and one network 100 for the purpose of simplification, but plural email servers 200 or plural networks 100 may be connected.

<User Terminal Device 110>

The user terminal device 110 is a terminal device which is operable by a user using a so-called email and capable of communication. Examples of the user terminal device 110 includes a personal computer and a portable terminal device. Examples of the portable terminal device includes a so-called mobile telephone, a smartphone, and a tablet terminal device. The user terminal device 110 may be a device which can be operated by the user using the email, and can send and receive the email via the network 100 or perform other various communications. The user terminal device 110 includes a central processing unit (CPU), a random access memory (RAM) or a read write memory (RWM), a read only memory (ROM), a hard disk drive (HDD), and various interfaces (I/F) including a communication I/F.

The user terminal device 110 includes a display unit for displaying various pieces of information such as a display device or touch panel (not illustrated), and an operation unit such as a keyboard, a mouse, and a touch panel.

<Email Server 200>

The email server 200 is a computer for sending and receiving emails of users in the network of its own. Furthermore, the email server 200 sends an email to a user in another network or keeps an email sent to a user in the network of its own to execute a process corresponding to a receive request from the user.

Specifically, the email server 200 has a mail transfer agent (MTA) function, a mail delivery agent (MDA) function, and the like. The mail transfer agent function is a function to sort senders of the emails. The mail delivery agent function is a function to deliver the sorted emails to the users in the network of its own or to an email server in another network (not illustrated).

The email server 200 can be provided by a network service provider or a software service provider who possesses the email server 200 or can be leased from these providers and provided.

The email server 200 includes a central processing unit (CPU), a random access memory (RAM) or a read write memory (RWM), a read only memory (ROM), a hard disk drive (HDD), and various interfaces (I/F) including a communication I/F.

The above-described various functions of the email server 200 allow the emails to be sent or received between plural user terminal devices 110 connected to be communicable with both the network of its own and another network.

<Email File-and-Refer Program Provision Server 300>

The email file-and-refer program provision server 300 is a server to provide the email file-and-refer program according to the present embodiment to the user terminal device 110 via the network 100. The email file-and-refer program provision server 300 includes, for example, a central processing unit (CPU), a random access memory (RAM), a read only memory (ROM), a hard disk drive (HDD), and various interfaces (I/F) including a communication I/F.

The email file-and-refer program provision server 300, when requested from the user terminal device 110 to deliver the email file-and-refer program, sends the email file-and-refer program to the user terminal device 110. So long as the function of the email file-and-refer program may be provided to be executable by the user terminal device 110, it may be provided in a form of delivering a recording medium in which the email file-and-refer program is recorded such as a CD-ROM or DVD without via the network 100.

The email file-and-refer program according to the present embodiment may be in a form of a program pre-installed in a so-called email software (mailer) itself, or a program to add the function of the email file-and-refer program to an existing email software (e.g., add-on function). Any form may be used so long as the function of the email file-and-refer program is provided to be executable in the user terminal device 110. Even if the email file-and-refer program is added to the existing email software by an installation operation, the email file-and-refer program may be downloaded from the email file-and-refer program provision server 300 and executed, as needed. Any case may be sufficient so long as the function of the email file-and-refer program can be realized in each user terminal device 110 owned by the user.

Here, the email software (mailer) is software for creating, sending, receiving an email, or saving and managing the received email. The email software may be sufficient so long as it can be executed in the user terminal device 110.

<<Outline of Process of Email File-and-Refer Program>>

Figure 2:
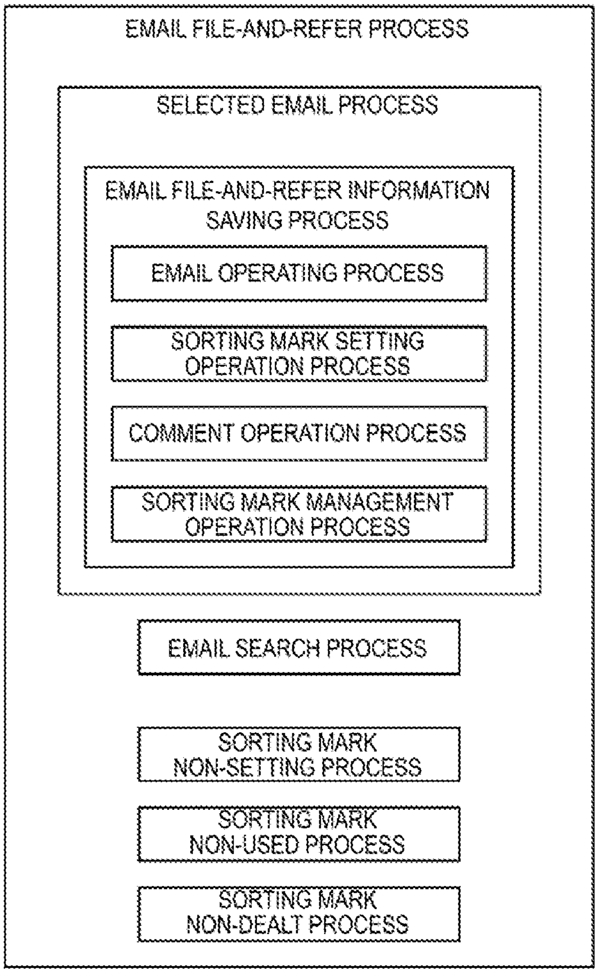
FIG. 2 is a functional block diagram illustrating an outline of processes of an email file-and-refer program.

FIG. 2 is a functional block diagram illustrating an outline of processes of an email file-and-refer program.

The processes of the email file-and-refer program includes mainly an email file-and-refer process. A concrete process of the email file-and-refer process is described with reference to FIG. 5.

The email file-and-refer process mainly includes a selected email process, an email search process, a sorting mark non-setting process, a sorting mark non-used process, and a sorting mark non-dealt process.

The selected email process includes an email file-and-refer information saving process, and the email file-and-refer information saving process mainly includes an email operating process, a sorting mark setting operation, a comment operation, and a sorting mark management operation.

A concrete process of the email operating process includes processes to delete, move and reply to an email, and is described with reference to FIG. 9.

A concrete process of the sorting mark setting operation is a process mainly to link a sorting mark designated by a user to an email, and is described with reference to FIG. 10 to FIG. 11.

A concrete process of the comment operation is a process to input or edit a comment, and is described with reference to FIG. 12.

A concrete process of the sorting mark management operation is a process to add, change, delete, or newly create a sorting mark, and is described with reference to FIG. 13 to FIG. 17.

A concrete process of the email search process is a process to designate a sorting mark and search for the email linked to the designated sorting mark, and is described with reference to FIG. 20 to FIG. 24.

The sorting mark non-setting process is a process to link a specific sorting mark to an email if the email is not linked to the sorting mark even after a predetermined time period elapses from when the email is received or sent, and is described with reference to FIG. 25.

The sorting mark non-used process is a process to display a message notifying of an unused sorting mark if there is a sorting mark not used for the linkage to the email even after a predetermined time period elapses, and is described with reference to FIG. 26.

The sorting mark non-dealt process is a process to display a message notifying that a process corresponding to the sorting mark should be executed if the corresponding process is not executed even after a predetermined time period elapses from when the sorting mark is linked to the email, and is described with reference to FIG. 27.

<<Processes of Email File-and-Refer System 10>>

<Download Process of Email File-and-Refer Program>

Figure 3:
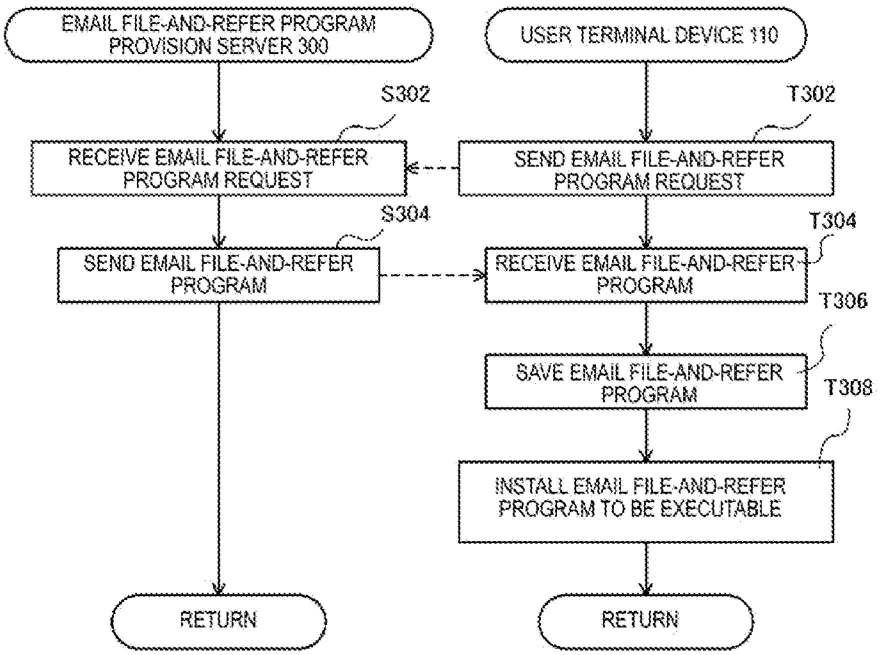
FIG. 3 is a flowchart showing a process to provide the email file-and-refer program to a user terminal device 110.

FIG. 3 is a flowchart showing a process to provide the email file-and-refer program to the user terminal device 110.

First, the user terminal device 110 sends an email file-and-refer program request to the email file-and-refer program provision server 300 (at step T302).

The email file-and-refer program according to the present embodiment is a program for linking the sent or received email to the sorting mark to store the email, and when searching for the email, designating the sorting mark and extracting the email linked to the sorting mark to find out a target.

Next, the email file-and-refer program provision server 300 receives the email file-and-refer program request sent from the user terminal device 110 (at step S302).

Next, the email file-and-refer program provision server 300 sends the email file-and-refer program to the user terminal device 110 in response to receiving the email file-and-refer program request (at step S304).

The processes at steps T302, S302, and S304 enables the user terminal device 110 to download the email file-and-refer program.

Next, the user terminal device 110 receives the email file-and-refer program sent from the email file-and-refer program provision server 300 (at step T304).

Next, the user terminal device 110 stores the email file-and-refer program received in the process at step T304 in a RAM region of the user terminal device 110 (at step T306).

Next, the user terminal device 110 installs the email file-and-refer program stored in the RAM region so that the program is executable by the user terminal device 110 (at step T308).

Executing the processes illustrated in FIG. 3 allows the user terminal device 110 to use the email file-and-refer program to enable the email sent and received by the user terminal device 110 to be managed by the email file-and-refer program.

<<Email Send and Reception Process>>

Figure 4:
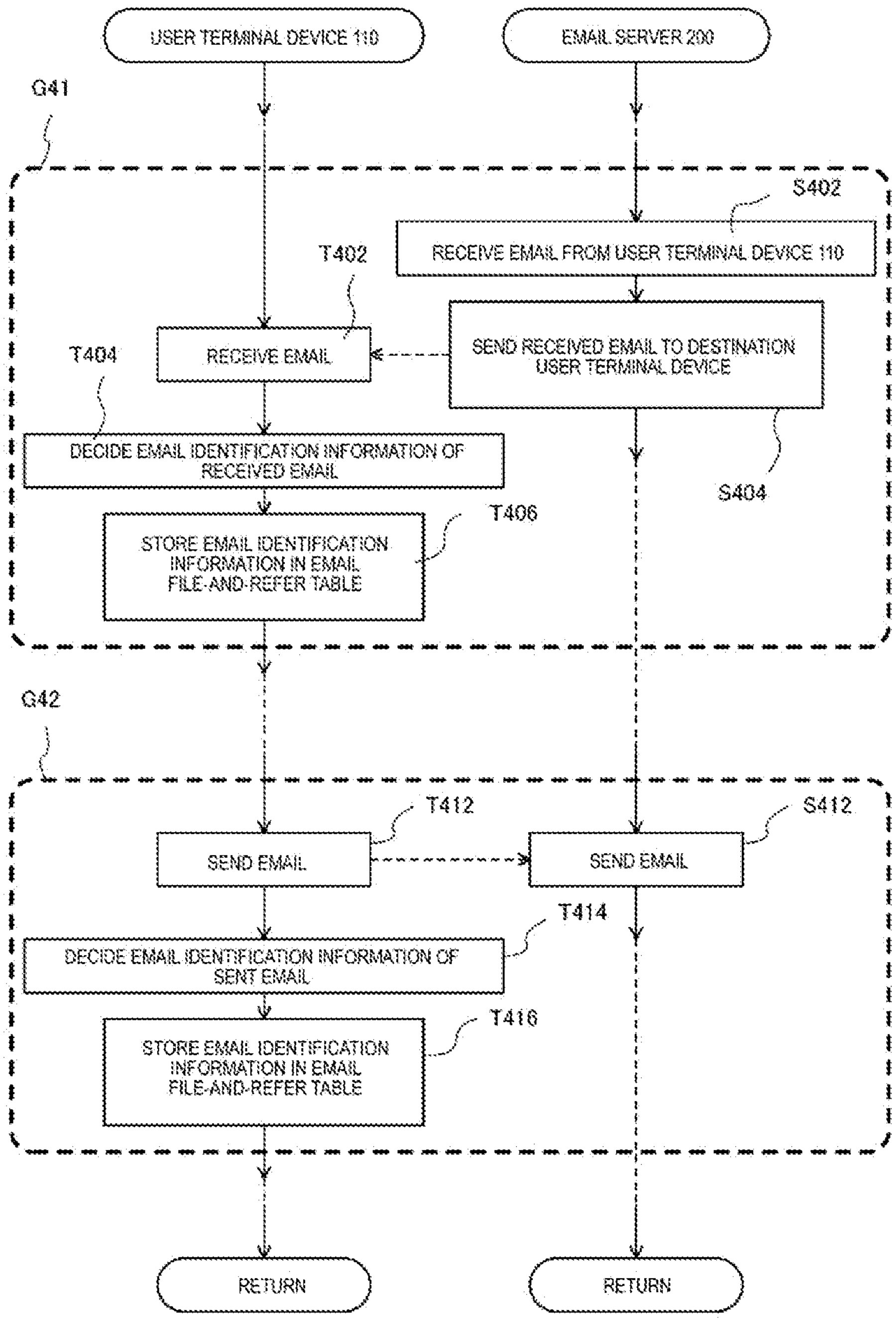
FIG. 4 is a flowchart showing an outline of a process of the email file-and-refer program executed in the user terminal device 110 when sending and receiving an email.

FIG. 4 is a flowchart showing an outline of a process of the email file-and-refer program executed in the user terminal device 110 when sending and receiving an email. Various send and reception processes are performed between the user terminal device 110 and the email server 200. FIG. 4 illustrates an outline of a process to receive and send an email.

<Process in Receiving Email>

A process in receiving an email includes processes at steps S402, S404, T402, T404, and T406 (processes in a frame G41 illustrated in FIG. 4).

First, the email server 200 receives an email sent by a sender to the user terminal device 110 (at step S402).

Next, the email server 200 sends the email received in a process at step S402 to the user terminal device 110 (at step S404).

Next, the user terminal device 110 receives the email sent from the email server 200 (at step T402).

Next, the user terminal device 110 decides email identification information for identifying the email received at step T402 (at step T404). The email identification information is information for identifying each of the received or sent emails, and the identification information constituted by numerals, texts or the like. The email identification information may be information capable of distinguishing the emails from each other.

Next, the user terminal device 110 stores the email identification information in an email file-and-refer table (at step T406). The email file-and-refer table is a table storing the email identification information, sorting mark identification information, comments and the like as illustrated in FIG. 31. The email identification information, the sorting mark identification information, the comments and the like are stored correspondingly to each of the received or sent emails, and are configured to be searchable.

<Process in Sending Email>

A process of sending an email includes processes at steps T412, T414, T416, and S412 (processes in a frame G42 illustrated in FIG. 4).

First, the user terminal device 110 sends an email to the email server 200 (at step T412).

The user terminal device 110 receives the email sent from the email server 200 (at step S412).

Next, the user terminal device 110 decides email identification information for identifying the email sent at step T412 (at step T414). As described above, the email identification information is information for identifying the received or sent email.

Next, the user terminal device 110 stores the email identification information in the email file-and-refer table (see FIG. 31) (at step T416).

In this way, every time an email is received or sent in the user terminal device 110, the email identification information for identifying the received email or sent email is decided and stored in the email file-and-refer table. The email identification information allows each of the sent or received emails to be identified and managed.

<<Processes of Email File-and-Refer Program>>

Next, the processes of the email file-and-refer program according to the present embodiment are described with reference to FIG. 5 to FIG. 27.

<Email File-and-Refer Process>

Figure 5:
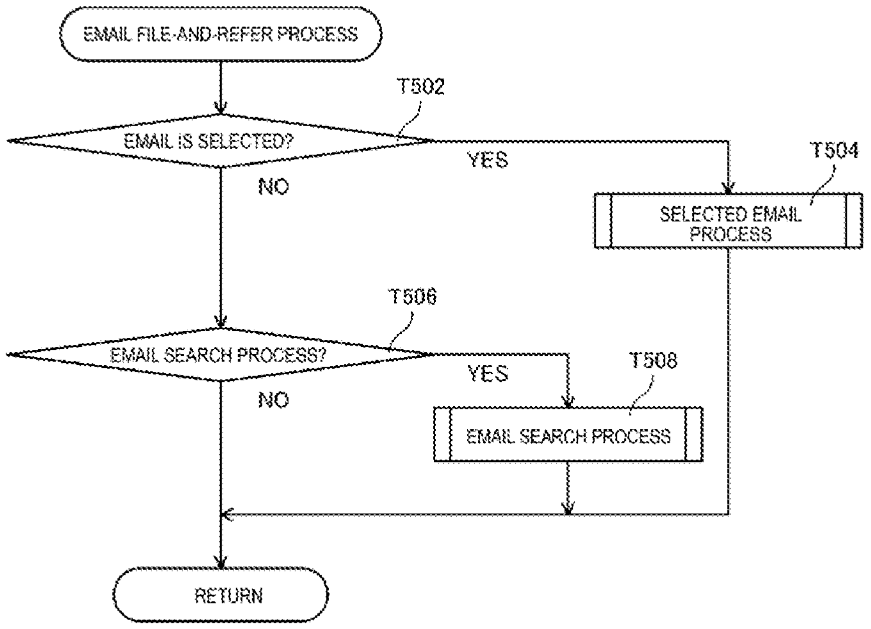
FIG. 5 is a flowchart showing an email file-and-refer process.

FIG. 5 is a flowchart showing the email file-and-refer process. This process is executed when a list of summaries of the received emails or the sent emails (e.g., a received email list screen 1000 illustrated in FIG. 34) is displayed. For example, a summary of one email, such as a transmission destination, an address, a received date and time, a sent date and time, is displayed for each line. An aspect of displaying the summary of the email may be used without limiting to an aspect of displaying in one line for one email.

First, the user terminal device 110 determines whether not an email is selected by an operation of the user (at step T502). This process is a process to determine whether or not one email (e.g., an email summary display 1100 illustrated in FIG. 34) is selected from plural emails a list of which is displayed.

Figure 6:
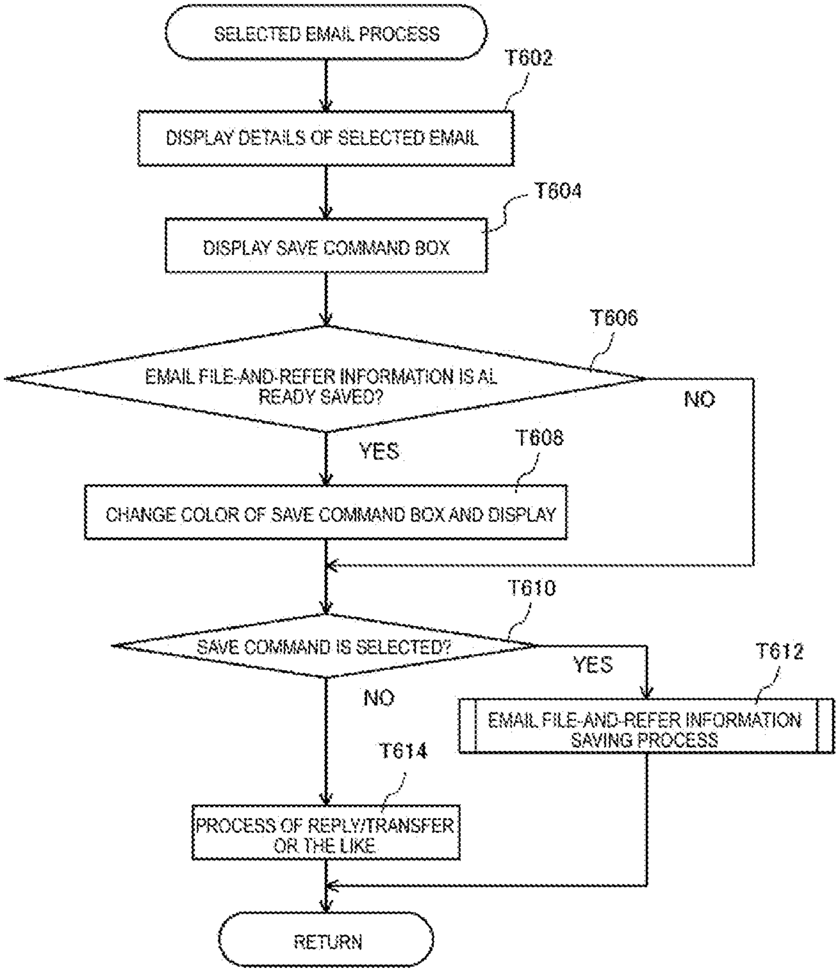
FIG. 6 is a flowchart showing a selected email process.

The user terminal device 110, if determining that an email is selected by the operation of the user (YES), calls and executes the selected email process illustrated in FIG. 6 (at step T504), and ends this subroutine.

The user terminal device 110, if determining that an email is not selected by the operation of the user (NO), determines whether or not the search process is selected by the operation of the user (at step S506).

Figure 20:
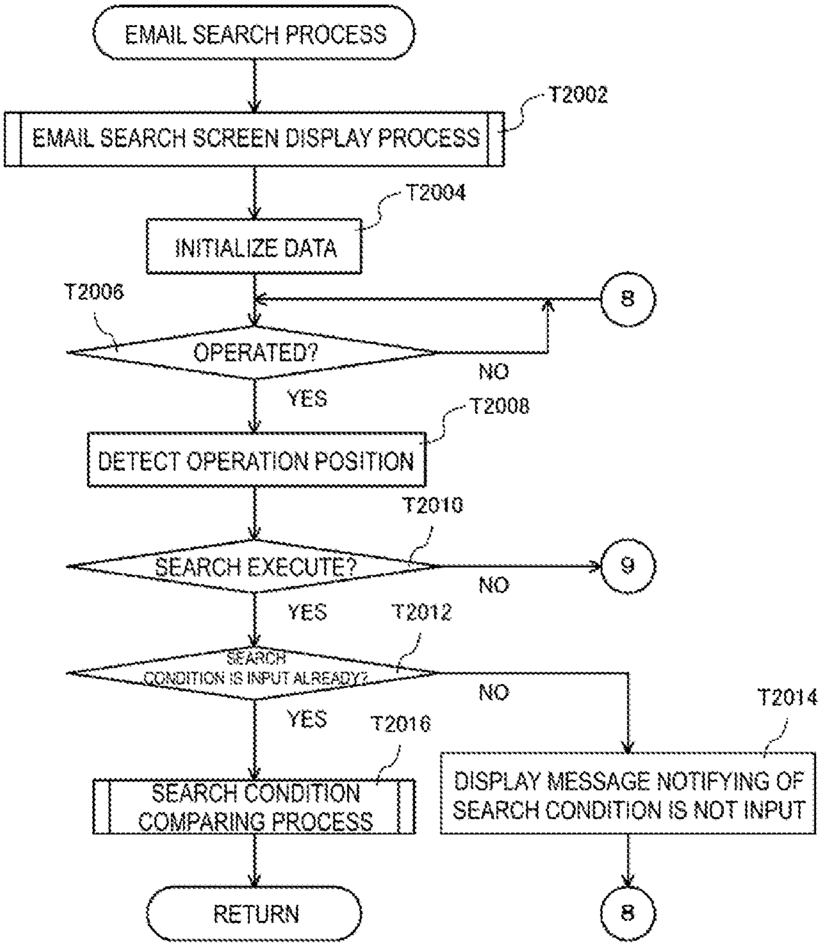
FIG. 20 is a flowchart showing a search process.

The user terminal device 110, if determining that the search process is selected by the operation of the user (YES), calls and executes the email search process illustrated in FIG. 20 (at step T508), and ends this subroutine.

The user terminal device 110, if determining that the search process is not selected by the operation of the user (NO), ends this subroutine with no specific operation.

<Selected Email Process>

FIG. 6 is a flowchart showing the selected email process. This process is called and executed by being triggered by that one email is selected by the process at step T502 in FIG. 5.

First, the user terminal device 110 displays details of the selected email (at step T602). For example, a sender, a title, an email body, a name of an attached file, and the like are displayed.

Next, the user terminal device 110 displays a save command box (at step T604). For example, the save command box is a rectangular region displayed with "save email" on the upper left portion of a received email body screen (e.g., see a "save email" button 2100 illustrated in FIG. 35 and FIG. 36).

Next, the user terminal device 110 determines whether or not the email file-and-refer information for the selected email is already saved in the email file-and-refer table (see FIG. 31) (at step T606). In the present embodiment, the email file-and-refer information includes various pieces of information stored in the email file-and-refer table in FIG. 31, and means comprehensive information including the sorting mark identification information, the comment, the presence or absence of attachments, the presence or absence of links, and the like described later. The email file-and-refer information is saved in the email file-and-refer table to allow the email file-and-refer information to be linked to the email.

Next, the user terminal device 110, if determining that the email file-and-refer information is already saved in the email file-and-refer table (YES), changes and displays the save command box (at step T608).

This can prevent that the email file-and-refer information for the email, which information is already saved in the email file-and-refer table, is carelessly changed.

The user terminal device 110, if determining that the email file-and-refer information is not still saved in the email file-and-refer table (NO), or if executing the process at step T608, determines whether or not a save command is selected by the operation of the user (at step T610). Selecting by the operation of the user is done by, for example, a click operation using a mouse and a tap operation using a finger. The operation of the user is not limited to these operations and may be an operation capable of selecting the save command such as a key-in using a keyboard and voice instructions.

Figure 7:
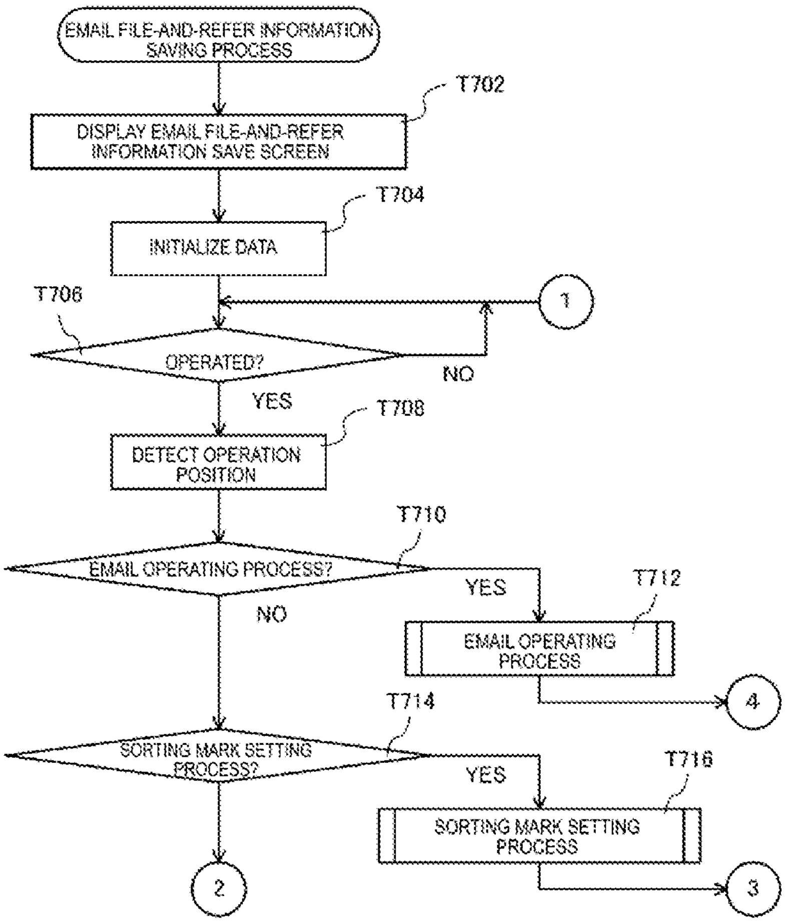
FIG. 7 is a flowchart showing an email file-and-refer information saving process.
Figure 8:
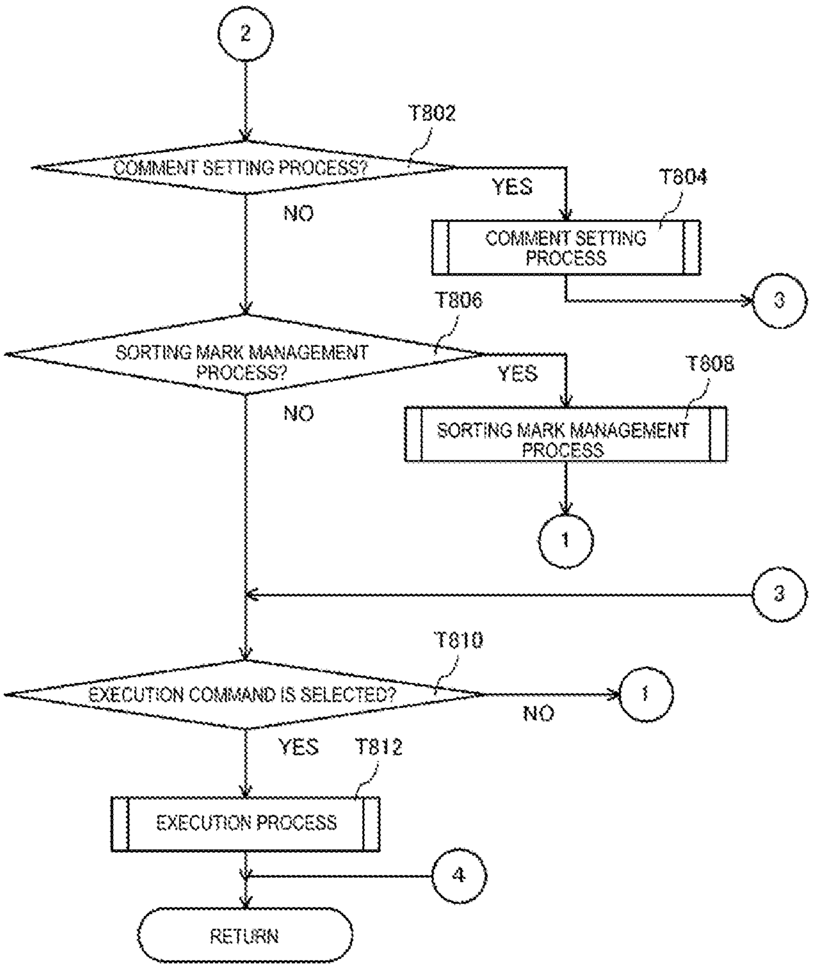
FIG. 8 is a flowchart showing the email file-and-refer information saving process.

The user terminal device 110, if determining that the save command is selected by the operation of the user (YES), calls and executes the email file-and-refer information saving process illustrated in FIG. 7 (at step T612), and ends this subroutine.

The user terminal device 110, if determining in the determination process at step T610 that the save command is not selected by the operation of the user (NO), or if executing the process at step T612, executes general processes for the email such as forwarding and address administration (at step T614), and ends this subroutine.

<<Email File-and-Refer Information Saving Process>>

FIG. 7 is a flowchart showing the email file-and-refer information saving process. This process is called and executed under a condition that the save command is selected by the operation of the user in the determination process at step T610 in FIG. 6.

First, the user terminal device 110 displays an email file-and-refer information save screen (at step T702). The email file-and-refer information save screen may be displayed as a window, or in full screen by switching an entire screen. Displaying the email file-and-refer information save screen may be sufficient so long as when ending displaying this screen, the next screen or a previous screen can be displayed.

For example, the email file-and-refer information save screen is an email save designation screen 3000 as illustrated in FIG. 37 to FIG. 54, FIG. 57, and FIG. 58. The email file-and-refer information save screen displays on an upper portion thereof a sender, a title, and content of an excerpted part of an email body. The above information is information which can be directly acquired from the received email and the sent email.

The email file-and-refer information save screen also displays plural sorting marks. As illustrated in FIG. 37 to FIG. 54, FIG. 57, and FIG. 58, a major classification (higher hierarchy) is displayed along an up-down direction of the screen. The examples illustrated in FIG. 37 to FIG. 54, FIG. 57, and FIG. 58 includes four kinds of the sorting marks in the major classification, that is, save marks, email body contents, attachment contents, and email organizing boxes.

Furthermore, a minor classification (lower hierarchy) is displayed along a right-left direction of the screen. The sorting marks in the minor classification are defined correspondingly to each of the sorting marks in the major classification.

The sorting marks belonging under the save marks include four kinds, that is, important save, confirmation required, reply required, and normal save. The sorting marks belonging under the email body contents include five kinds, that is, schedule, contact information, meeting invitations, accounting, and instructions. The sorting marks belonging under the attachment contents include ten kinds, that is, documents, photos, videos, voice/audio, maps, name lists, manuals, itineraries, records, and balances. Furthermore, the sorting marks belonging under the email organizing boxes include 22 kinds, that is, company general affairs, company accountant, company business, company technologies, factories, branch A, branch B, branch C, branch D, client 1, client 2, client 3, client 4, client 5, private, school, club, community service, shrines, hobbies, and others.

Displaying simultaneously the sorting marks in the major classification and the sorting marks in the minor classification in different directions allows a list of the sorting marks in a hierarchical relationship to be displayed to be distributed. It is possible for the user to appropriately view the sorting marks by visualizing the hierarchies and displaying the plural sorting marks to be distributed, thus the designating operation of the sorting marks for the linkage or search is also easily and conveniently performed.

Furthermore, a comment input region for inputting a comment is formed on a lower portion of the email file-and-refer information save screen. Not only the sorting mark usable commonly to plural emails but also information unique to each email can be linked, which is advantageous.

Additionally, the email file-and-refer information save screen displays on a lowermost portion thereof an "execute" button and a "sorting mark management" button (see FIG. 37 to FIG. 54, FIG. 57, and FIG. 58). The user operating the "execute" button enables the sorting mark designated by the user to be linked to the email. The user operating the "sorting mark management" button makes the sorting mark management process be executed (see FIG. 13).

Next, the user terminal device 110 initializes various pieces of data (at step T704). For example, a selected state stored in a selection setting table shown in FIG. 29, data of the comment, and the like are initialized.

Next, the user terminal device 110 determines whether or not the device 110 is operated by the user (at step T706). Examples of the operation of the user include a click operation using a mouse and a tap operation using a finger.

Next, the user terminal device 110, if determining that the device 110 is not operated by the user (NO), returns the process to step T706.

On the other hand, the user terminal device 110, if determining that the device 110 is operated by the user (YES), detects an operation position where the user operates (at step T708). Examples of the operation position include a position clicked by a mouse operation and a position tapped by a finger. The process at step T708 may be a process to identify an operated key or identify input voice/audio.

Next, the user terminal device 110 determines whether or not the email operating process is selected, based on the detected operation position (at step T710). The email operating process can be selected by clicking by a mouse or tapping by a finger a region of "email operation" displayed on the email file-and-refer information save screen.

Figure 9:
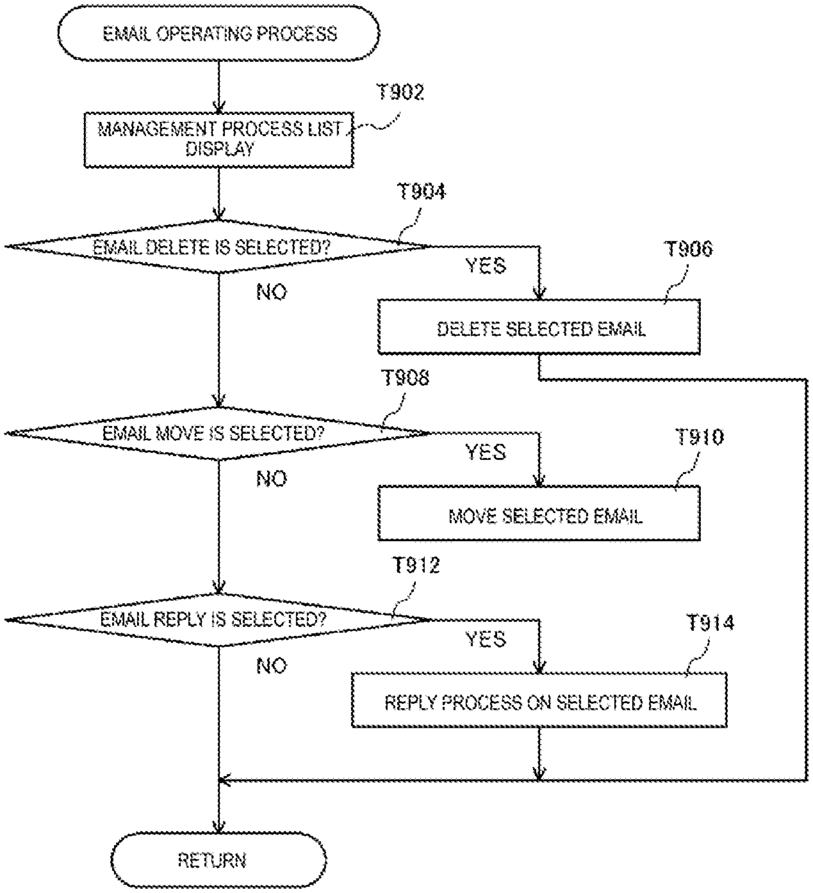
FIG. 9 is a flowchart showing an email operating process.

The user terminal device 110, if determining that the email operating process is selected (YES), calls and executes a subroutine of the email operating process illustrated in FIG. 9 (at step T712), and ends this subroutine.

The user terminal device 110, if determining that the email operating process is not selected (NO), determines whether or not the sorting mark setting process is selected (at step T714). The sorting mark setting process can be selected by clicking with a mouse or tapping with a finger on a region where various sorting marks are displayed on the email file-and-refer information save screen. For example, the selection can be made by the operation of clicking or tapping the region where the sorting mark such as the "important save" or the "schedule" is displayed.

Figure 10:
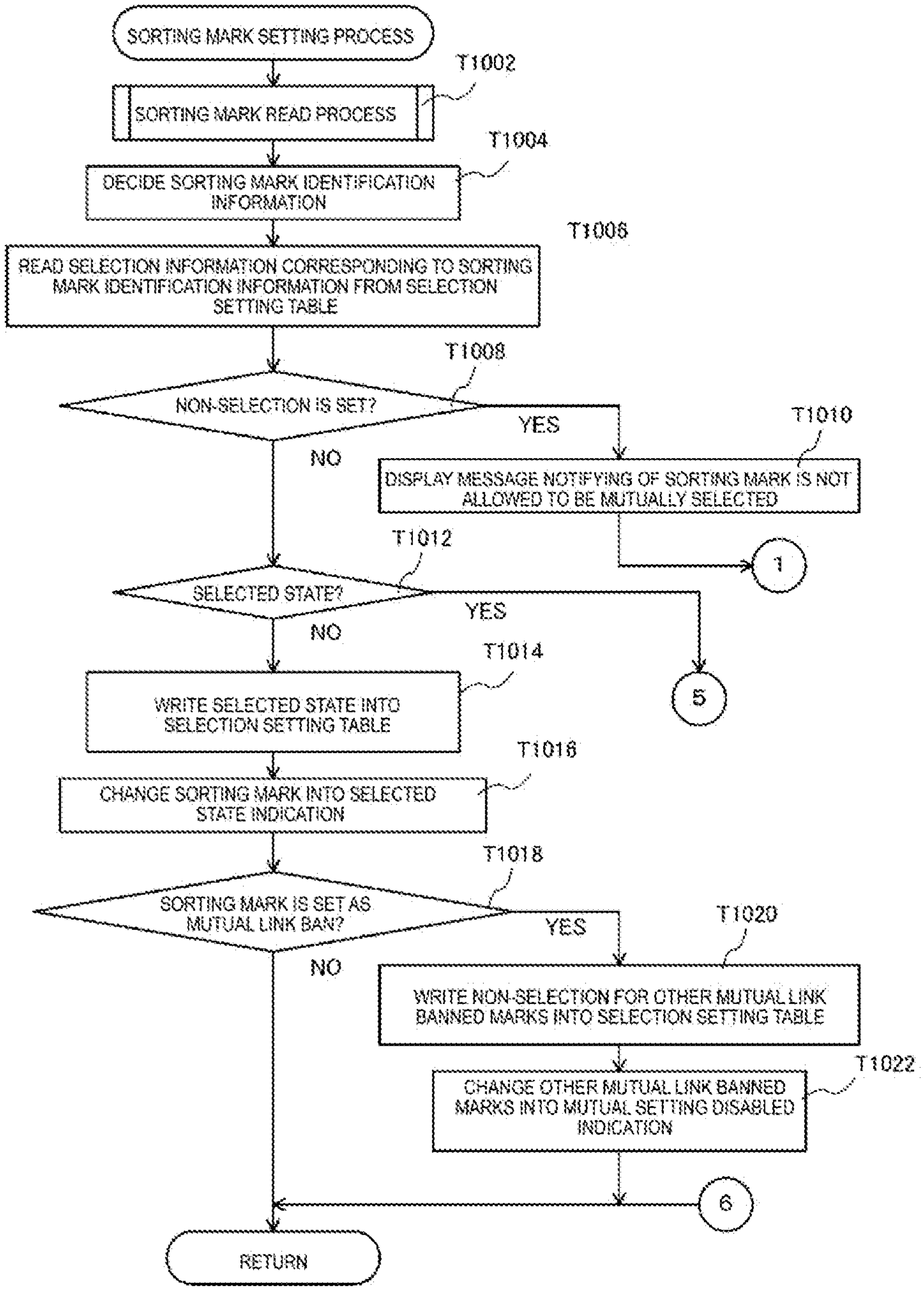
FIG. 10 is a flowchart showing a sorting mark setting process.
Figure 11:
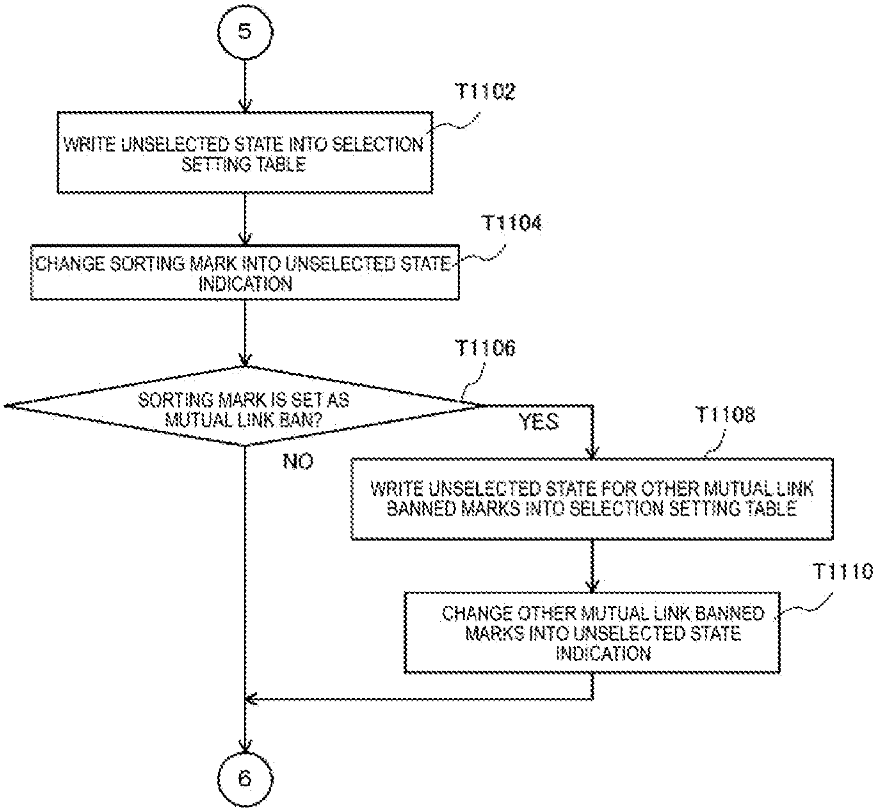
FIG. 11 is a flowchart showing the sorting mark setting process.

The user terminal device 110, if determining that the sorting mark setting process is selected (YES), calls and executes a subroutine of the sorting mark setting process illustrated in FIG. 10 (at step T716), and advances the process to step T810.

The user terminal device 110, if determining that the sorting mark setting process is not selected (NO), determines whether or not the comment setting process is selected (at step T802). The comment setting process can be selected by clicking with a mouse or tapping with a finger on the comment input region on the email file-and-refer information save screen.

Figure 12:
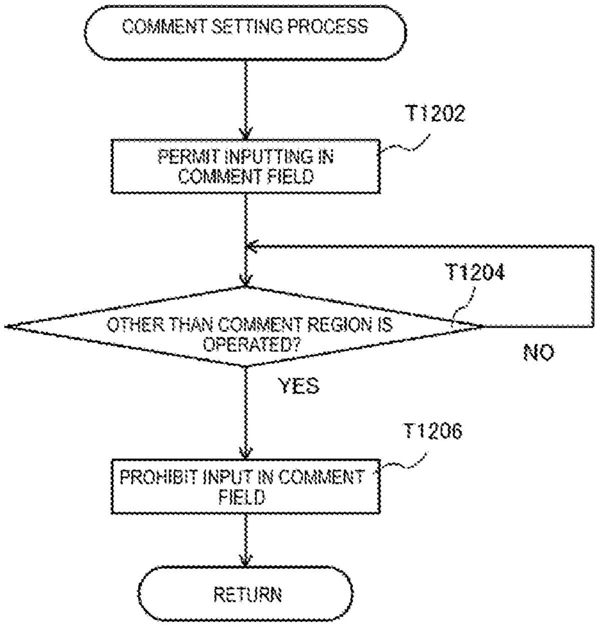
FIG. 12 is a flowchart showing a comment setting process.

The user terminal device 110, if determining that the comment setting process is selected (YES), calls and executes a subroutine of the comment setting process illustrated in FIG. 12 (at step T804), and advances the process to step T810.

The user terminal device 110, if determining that the comment setting process is not selected (NO), determines whether or not the sorting mark management process is selected (at step T806). The sorting mark management process can be selected by clicking with a mouse or tapping with a finger on a region where the "sorting mark management" is displayed on the email file-and-refer information save screen.

Figure 13:
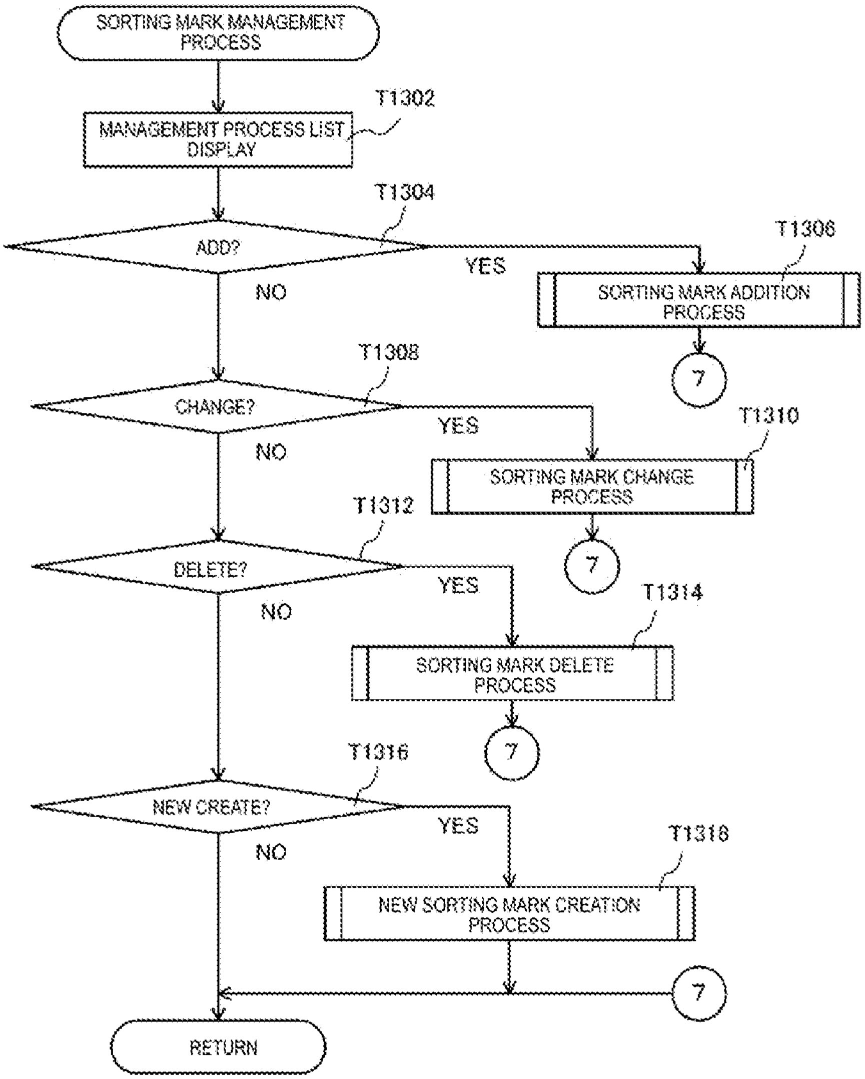
FIG. 13 is a flowchart showing a sorting mark management process.

The user terminal device 110, if determining that the sorting mark management process is selected (YES), calls and executes a subroutine of the sorting mark management process illustrated in FIG. 13 (at step T808), and returns the process to step T706.

The user terminal device 110, if determining that the sorting mark management process is not selected (NO), or if executing the process at step T808, determines whether or not an execution command is selected (at step T810). The execution command can be selected by clicking with a mouse or tapping with a finger on a region where "execute" is displayed on the email file-and-refer information save screen.

The user terminal device 110, if determining that the execution command is not selected (NO), returns the process to step T706 in FIG. 7.

Figure 19:
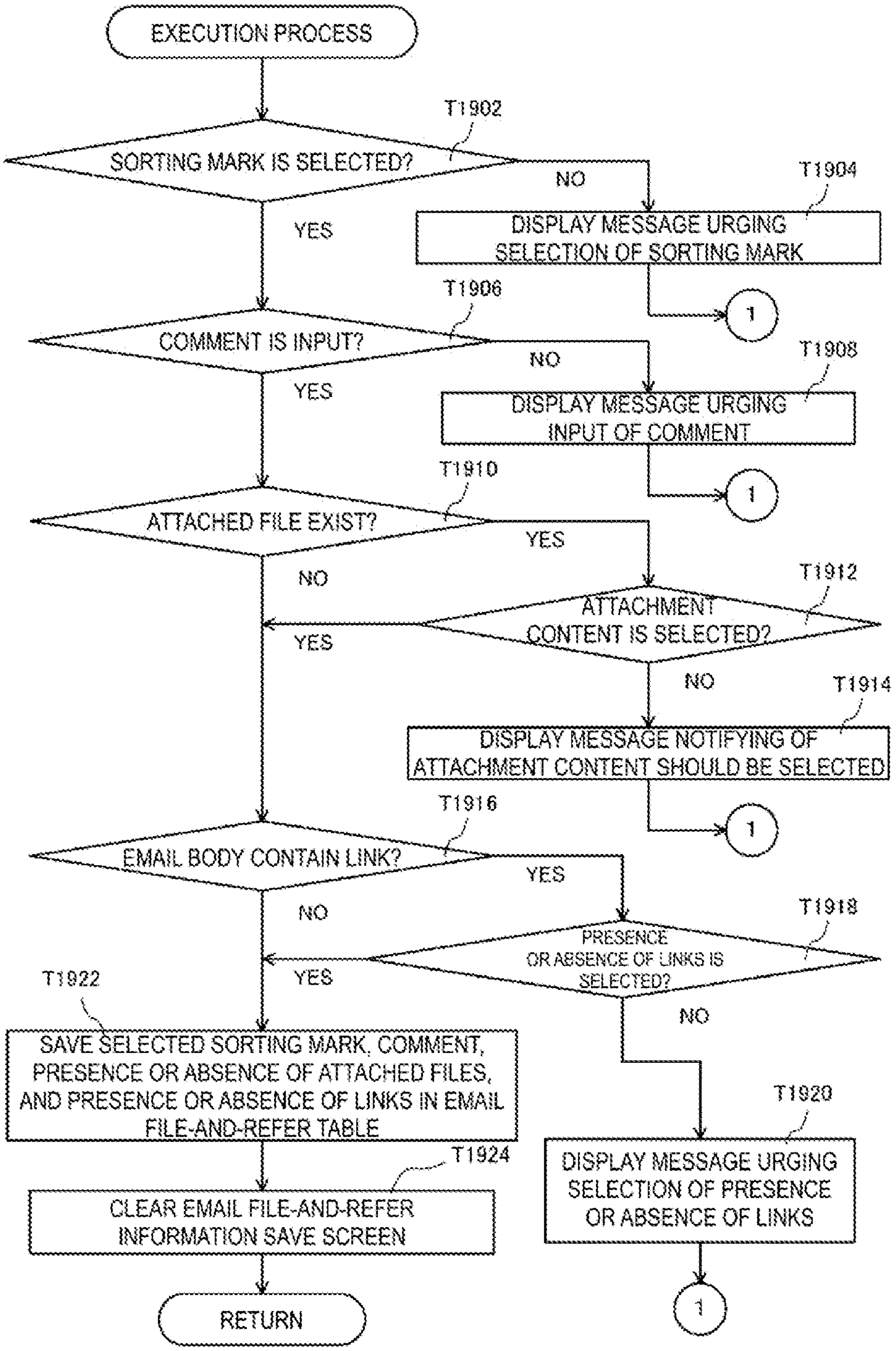
FIG. 19 a flowchart showing an execution process.

The user terminal device 110, if determining that the execution command is selected (YES), calls and executes a subroutine of the execution process illustrated in FIG. 19 (at step T812), and ends this subroutine.

<<Email Operating Process>>

FIG. 9 is a flowchart showing the email operating process. This is called and executed in the process at step T712 in FIG. 7.

First, the user terminal device 110 displays a list of the email operating processes as an email operating menu (at step T902). The list of the email operating processes includes email delete, email move, and email reply (e.g., see FIG. 32A). Displaying the list of the email operating processes allows the user to select any of the processes. Examples of the operation of the user include a click operation using a mouse and a tap operation using a finger.

Next, the user terminal device 110 determines whether or not the email delete is selected (at step T904).

The user terminal device 110, if determining that the email delete is selected (YES), deletes the selected email (at step T906), and ends this subroutine.

The user terminal device 110, if determining that the email delete is not selected (NO), determines whether or not the email move is selected (at step T908).

The user terminal device 110, if determining that the email move is selected (YES), moves the selected email to a desired folder or the like (at step T910), and ends this subroutine.

The user terminal device 110, if determining that the email move is not selected (NO), determines whether or not the email reply is selected (at step T912).

The user terminal device 110, if determining that the email reply is selected (YES), opens a window for creating a reply email to the selected email to provide a state where the reply email can be created (at step T914).

The user terminal device 110, if determining that the email reply is not selected (NO), or if executing the process at step T914, ends this subroutine.

In this way, the process for the currently selected email can be immediately executed, which can facilitate work.

<<Sorting Mark Setting Process>>

FIG. 10 is a flowchart showing the sorting mark setting process. This is called and executed in the process at step T716 in FIG. 7.

Figure 18:
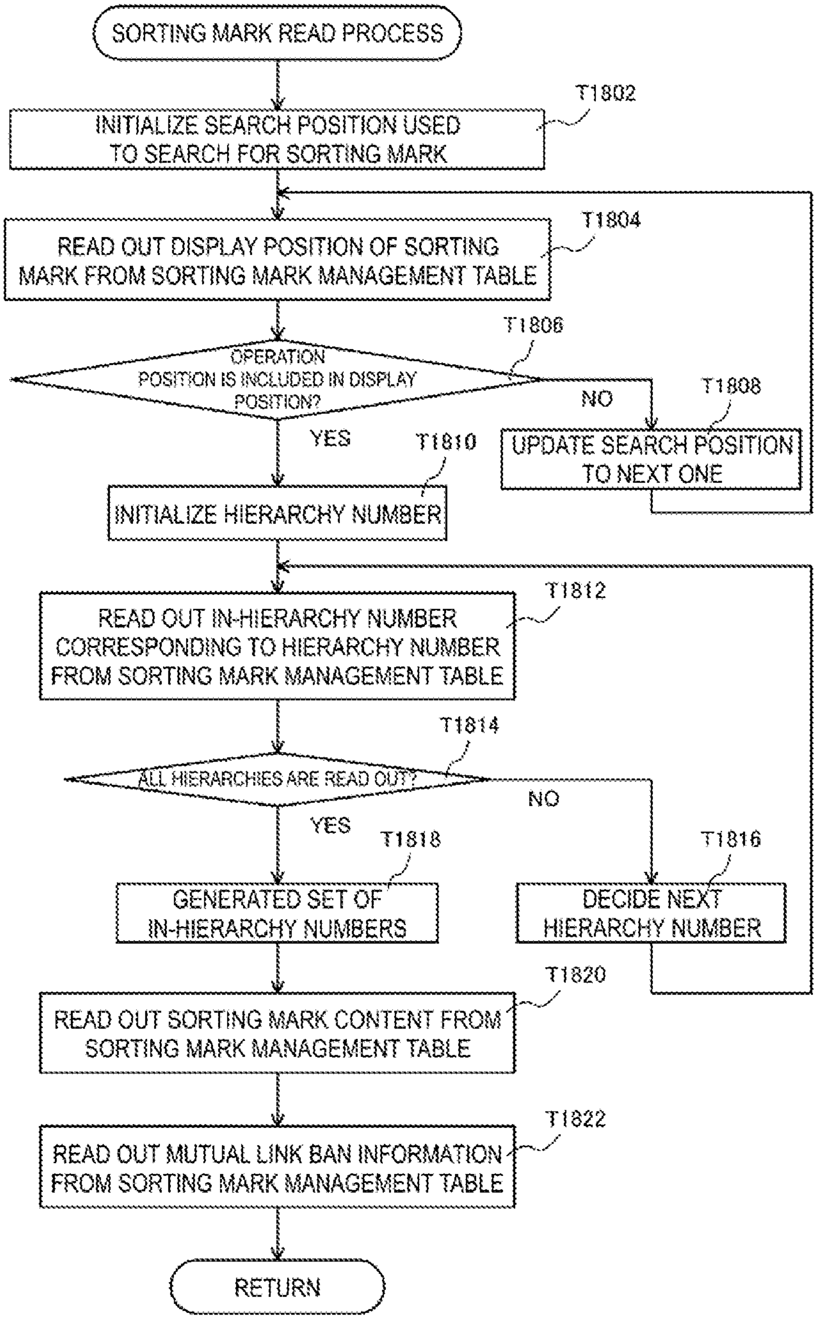
FIG. 18 is a flowchart showing a sorting mark read process.

First, the user terminal device 110 calls and executes a sorting mark read process illustrated in FIG. 18 (at step T1002). The sorting mark read process is a process to decide the sorting mark corresponding to the operation position operated by the user and read out information about the decided sorting mark, as described later. It is determined in which region of sorting mark a click operation by a mouse, a tap operation by a finger, or the like is performed, and such a sorting mark is identified. This process allows the user to designate one sorting mark by the operation.

Note that the term "designation" of the sorting mark herein refers to that the sorting mark desired by the user is defined by the operation of the user. At this point of time, the sorting mark is not still linked to the email, and thus, the sorting mark identification information is not stored in the email file-and-refer table.

Next, the user terminal device 110 decides the sorting mark identification information of the sorting mark designated by the user (at step T1004).

Next, the user terminal device 110 refers to the selection setting table to read out selection information corresponding to the sorting mark identification information designated by the user (at step T1006).

The selection information in the selection setting table includes three kinds, that is, a selected state, an unselected state, and a non-selection.

The selected state is a state of fixing the selection of the sorting mark designated by the operation of the user. A state where the sorting mark is designated by the operation of the user does not immediately become the selected state. The sorting mark set to non-selection is not selected even if designated by the operation of the user as described later. If the sorting mark is designated by the operation of the user and the designated sorting mark is not set to non-selection, a "selected" state is fixed and the sorting mark becomes in the selected state.

The unselected state is a state where the sorting mark is not designated by the operation of the user, and also includes a state where the selection of the sorting mark is released by the operation of the user. Non-selection is described later.

Next, the user terminal device 110 determines whether or not the selection information is set to non-selection (at step T1008).

Non-selection means a state where the sorting mark is not allowed to be selected by the operation of the user. Non-selection is directed to the sorting mark set as mutual link ban. Hereinafter, the sorting mark set as the mutual link ban is referred to as a mutual link banned sorting mark. The mutual link banned sorting mark is a sorting mark banned from being mutually selected by the operation of the user. If the user selects one sorting mark of the mutual link banned sorting marks, the rest of the mutual link banned sorting marks are set to non-selection and is not allowed to be selected. In this way, the mutual link banned sorting marks are sorting marks exclusively selected.

The mutual link ban can be set for plural sorting marks belonging to the higher hierarchy. The mutual link ban is described later in detail.

The user terminal device 110, if determining that non-selection is set (YES), displays a message notifying of that the sorting mark designated by the user is not allowed to be mutually selected (at step T1010), and returns the process to step T706 in FIG. 7.

The user terminal device 110, if determining that non-selection is not set (NO), determines whether or not the sorting mark designated by the user is in the selected state (at step T1012).

The user terminal device 110, if determining that the sorting mark designated by the user is not in the selected state (NO), that is, is in the unselected state, writes the selected state into the selection setting table (see FIG. 29) (at step T1014), and changes an indication of the sorting mark into the selected state indication (at step T1016).

Next, the user terminal device 110 determines whether or not the sorting mark designated by the user is set as the mutual link ban (at step T1018).

The user terminal device 110, if determining that the sorting mark designated by the user is set as the mutual link ban (YES), writes the non-selection for other mutual link banned sorting marks into the selection setting table (at step T1020).

Next, the user terminal device 110 changes indications of other mutual link banned sorting marks into mutual setting disabled indication (at step T1022).

If one of the mutual link banned sorting marks is selected in the process at step T1020, the rest of the mutual link banned sorting marks are set to be incapable of being selected, and the indication is switched to that representing an indication the rest of the mutual link banned sorting marks is not allowed to be selected in the process at step T1022.

The user terminal device 110, if determining in the determination process at step T1012 described above that the sorting mark designated by the user is in the selected state (YES), writes the unselected state into the selection setting table (at step T1102) and changes the indication of the sorting mark into the unselected state indication (at step T1104).

Next, the user terminal device 110 determines whether or not the sorting mark designated by the user is set as the mutual link ban (at step T1106).

The user terminal device 110, if determining that the sorting mark designated by the user is set as the mutual link ban (YES), writes the unselected state for other mutual link banned sorting marks into the selection setting table (at step T1108).

Next, the user terminal device 110 changes other mutual link banned sorting marks into the unselected state (at step T1110).

If one mutual link banned sorting mark which was selected is unselected, and changed to the unselected state in the process at step T1102, the rest of the mutual link banned sorting marks are also set to the unselected state in the process at step T1108. This allows all the mutual link banned sorting marks to return to a selectable state.

Furthermore, one mutual link banned sorting mark having been selected is switched to the unselected state indication in the process at step T1104 as well as the rest of the mutual link banned sorting marks are also switched to the unselected state indication in the process at step T1110. This can indicate that all the mutual link banned sorting marks have returned to the selectable state.

The user terminal device 110, if determining in the determination process at step T1018 or T1106 that the sorting mark is not set as the mutual link ban (NO), or if the process at step T1022 or T1110 is executed, ends this subroutine.

The processes in steps T1012, T1014, T1016, T1102, and T1104 described above allow the setting and releasing of the sorting mark to be alternately selected. In other words, an on-state and an off-state can be alternately selected like a toggle switch. The indication of the sorting mark is also switched depending on the selection of the setting and releasing of the sorting mark. For example, an indication color for a set state and an indication color for a released state (unselected state) are differentiated to allow the set and released states of the sorting mark to be easily viewed.

<<Comment Setting Process>>

FIG. 12 is a flowchart showing the comment setting process. This is called and executed in the process at step T804 in FIG. 8.

First, the user terminal device 110 permits inputting in a comment field (at step T1212).

Next, the user terminal device 110 determines whether or not the user operates other region than the comment region (at step T1214).

The user terminal device 110, if determining that the user does not operate other than the comment region (NO), returns the process to step T1214.

The user terminal device 110, if determining that the user operates other than the comment region (YES), prohibits the comment field from being input (at step T1216), and ends this subroutine.

<<Sorting Mark Management Process>>

FIG. 13 is a flowchart showing the sorting mark management process. This is called and executed in the process at step T808 in FIG. 8.

First, the user terminal device 110 displays a management process list display for the sorting mark management process (at step T1302). For example, a sorting mark management menu as illustrated in FIG. 32B is displayed. The user can select one of the processes displayed in the sorting mark management menu.

Next, the user terminal device 110 determines whether or not an addition process of the sorting mark is selected (at step T1304).

Figure 14:
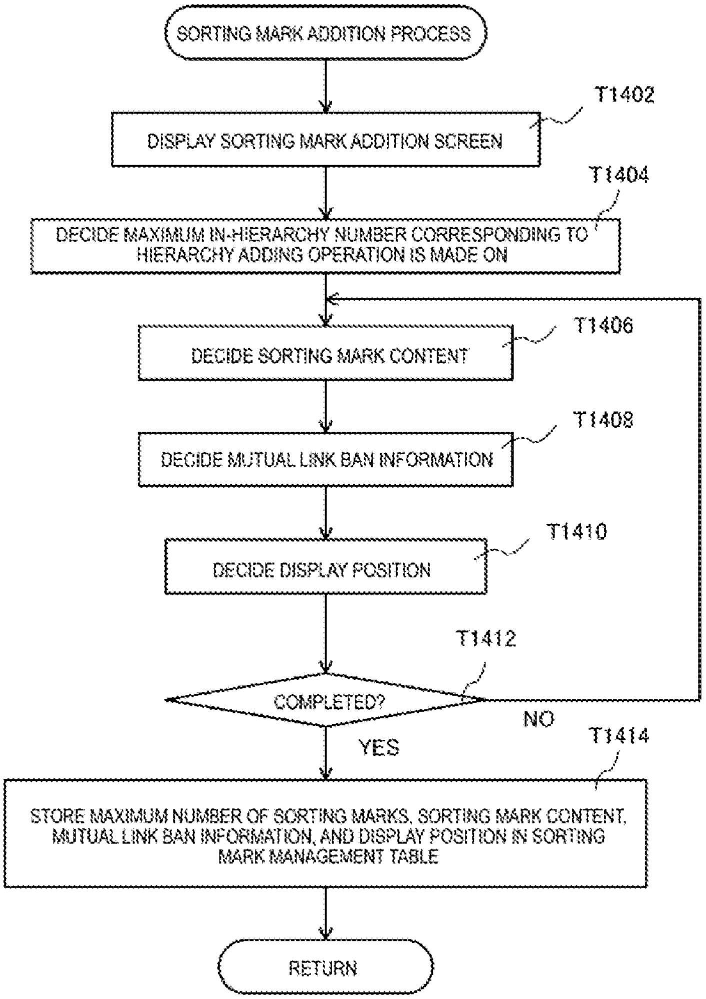
FIG. 14 is a flowchart showing a sorting mark addition process.

The user terminal device 110, if determining that the addition process of the sorting mark is selected (YES), calls and executes a sorting mark addition process illustrated in FIG. 14 (at step T1306), and ends this subroutine.

The user terminal device 110, if determining that the addition process of the sorting mark is not selected (NO), determines whether or not a change process of the sorting mark is selected (at step T1308).

Figure 15:
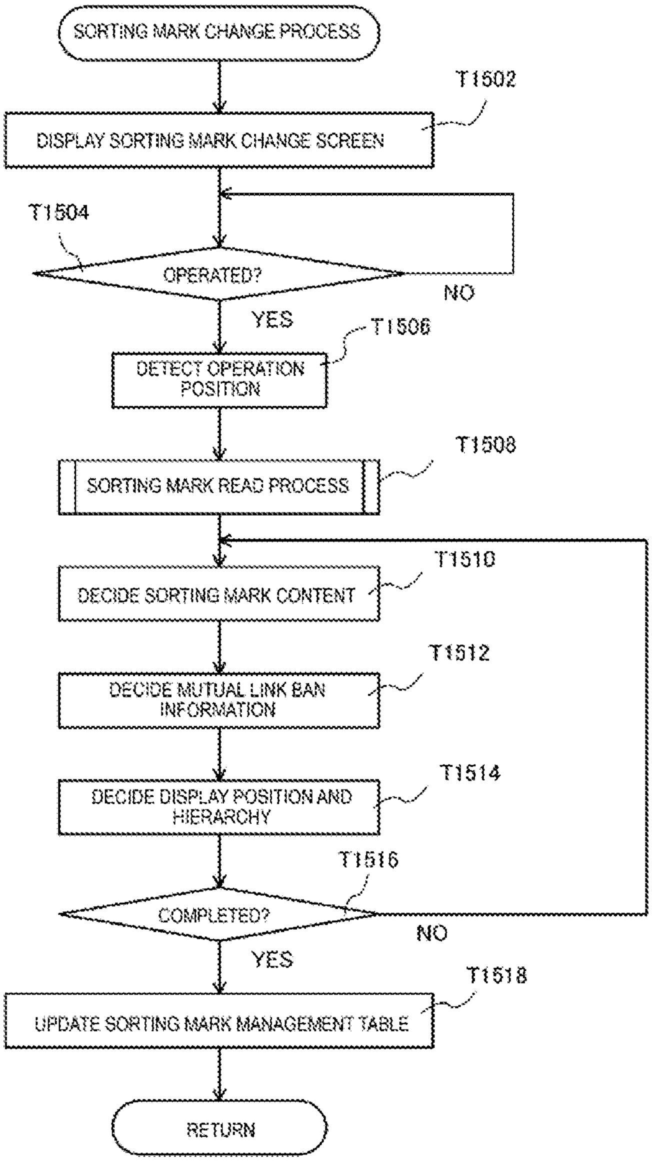
FIG. 15 is a flowchart showing a sorting mark change process.

The user terminal device 110, if determining that the change process of the sorting mark is selected (YES), calls and executes a sorting mark change process illustrated in FIG. 15 (at step T1310), and ends this subroutine.

The user terminal device 110, if determining that the change process of the sorting mark is not selected (NO), determines whether or not a delete process of the sorting mark is selected (at step T1312).

Figure 16:
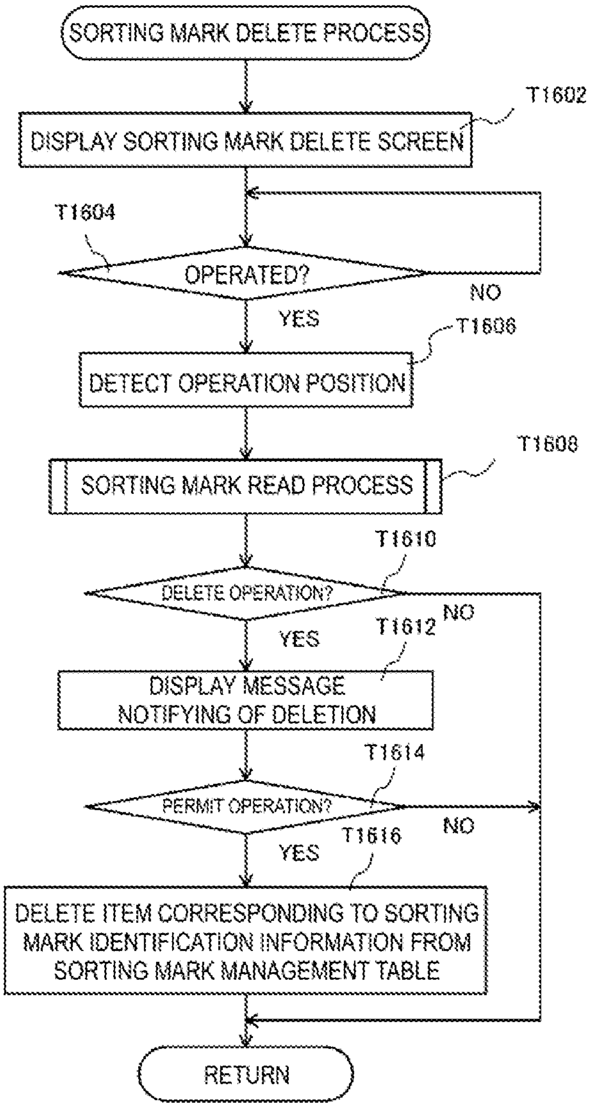
FIG. 16 is a flowchart showing a sorting mark delete process.

The user terminal device 110, if determining that the delete process of the sorting mark is selected (YES), calls and executes a sorting mark delete process illustrated in FIG. 16 (at step T1314), and ends this subroutine.

The user terminal device 110, if determining that the delete process of the sorting mark is not selected (NO), determines whether or not a new sorting mark creation process is selected (at step T1316).

Figure 17:
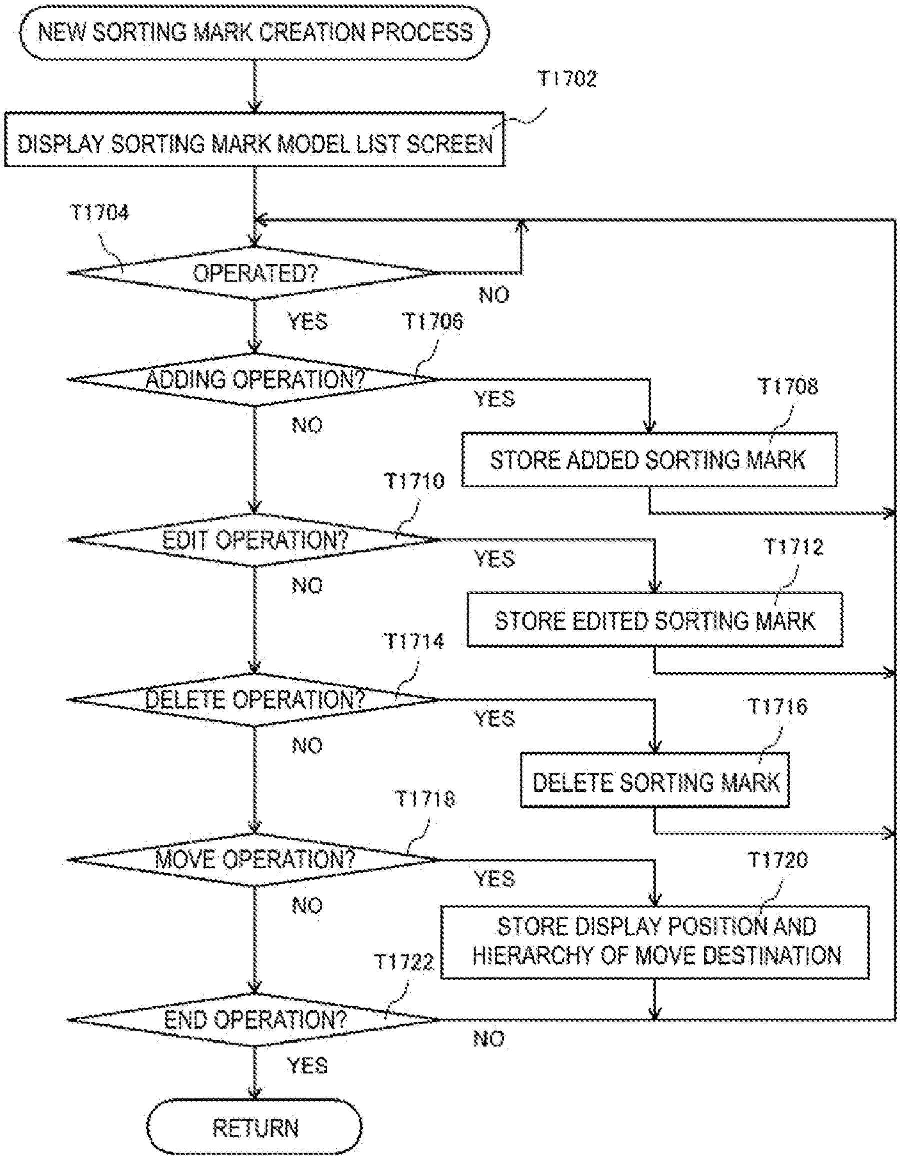
FIG. 17 is a flowchart showing a new sorting mark creation process.

The user terminal device 110, if determining that the new sorting mark creation process is selected (YES), calls and executes a new sorting mark creation process illustrated in FIG. 17 (at step T1318).

The user terminal device 110, if determining that the new sorting mark creation process is not selected (NO), or if executing the process at step T1318, ends this subroutine.

This sorting mark management process makes it possible to add, delete, and change the sorting mark, and newly create the sorting mark.

For example, in a case where the sorting mark for travels increases, the following three methods can be used to create the sorting marks to be classified.

(1) Create a sorting mark "schedule" belonging to the major classification, and create a sorting mark "travel" belonging to the minor classification for "schedule".

(2) If the sorting mark "schedule" belonging to the major classification already exists and a sorting mark "itineraries" belonging to the minor classification for "schedule" already exists, change to the sorting mark "travel".

(3) Create a sorting mark "travel" belonging to the major classification and list up the sorting marks indicating the individual travels such as "domestic travel" or "international travel" belonging to the minor classification for "travel".

For example, in a case where the sorting mark for clients belonging to the minor classification increases, the following three methods can be used to create the sorting marks to be classified.

(1) Create a sorting mark "senders" belonging to major classification, and sequentially add a sorting mark "client A", a sorting mark "client B" and the like belonging to the minor classification for "senders".

(2) Further create a sorting mark belonging to a minimum classification for the sorting mark "clients" belonging to the minor classification.

(3) Upgrade the sorting mark "clients" so as to belong to the major classification and sequentially list up "client A", . . . belonging to the minor classification for "clients".

In this way, the addition, delete, change, and new creation processes of the sorting mark make it possible to configure hierarchies desired by the user and set the sorting marks belonging to the hierarchies.

<<Sorting Mark Management Table>>

The sorting mark management process illustrated in FIG. 13 is a process to edit the sorting mark management table. FIG. 28 is a table showing an example of the sorting mark management table. The sorting mark management table is stored in a storage device of the user terminal device 110, for example, a predetermined storage area such as the RAM and the HDD. The sorting mark management table shown in FIG. 28 is a table schematically illustrated for the purpose of description.

As illustrated in FIG. 28, the sorting mark management table includes "display position", "first hierarchy" and "second hierarchy", and "mutual link ban". The "display position" in FIG. 28 represents a display position of the sorting mark on the email file-and-refer information save screen. For example, the "display position" in FIG. 28 can be used to define a position where the sorting mark is displayed on the email file-and-refer information save screen (see FIG. 37 to FIG. 54, FIG. 57, and FIG. 58). Two numerals in the "display position" in FIG. 28 represent a position in the right-left direction by a left one and a position in the up-down direction by a right one.

For example, a display position of the "voice/audio" in the "attachment contents" is (4, 3). As illustrate in FIG. 37 to FIG. 54, FIG. 57, and FIG. 58, the "voice/audio" in the "attachment contents" is displayed at the fourth from the left and the third from the top. A display position of the "school" in the "email organizing boxes" is (2, 8). As illustrated in FIG. 37 to FIG. 54, FIG. 57, and FIG. 58, the "school" in the "email organizing boxes" is displayed at the second from the left and the eighth from the top.

The sorting mark can be also specified by acquiring a display position on the email file-and-refer information save screen. For example, the sorting mark designated by the user can be decided by detecting a position on the email file-and-refer information save screen where the user operates.

Furthermore, in the example illustrated in FIG. 28, the first hierarchy corresponds to the major classification and is the highest hierarchy. The second hierarchy corresponds to the minor classification and is a lower hierarchy than the major classification. Not only the first hierarchy and the second hierarchy but also a further lower hierarchy can be provided. For example, a third hierarchy corresponds to the minimum classification and is a lower hierarchy than the minor classification.

The number of hierarchies may be at least two, and is not limited. The hierarchies may be adequately defined depending on the kinds of the sorting marks required for managing the emails. In the present embodiment, the user can select only the sorting marks belonging to the lowest hierarchy, and the sorting marks defined in the hierarchy higher than the lowest hierarchy are not allowed to be selected by the user and serve as titles. Not only the lowest hierarchy but also a higher hierarchy may be configured to be selected by the user. This makes it possible to comprehensively select the sort to facilitate the work.

In each hierarchy, a number is assigned to each sorting mark belonging to the hierarchy (hereinafter, referred to as an in-hierarchy number). The sorting mark can be specified by the hierarchy and the in-hierarchy number. In the example illustrated in FIG. 28, the sorting mark "attachment contents" is assigned with the in-hierarchy number 3 in the first hierarchy. The sorting mark "school" is assigned with the in-hierarchy number 16 in the second hierarchy under the mark (email organizing boxes) assigned with the in-hierarchy number 4 in the first hierarchy. In this way, the sorting marks belonging to the lower hierarchy can be specified by a set with the higher hierarchy (the in-hierarchy number 4 in the first hierarchy-the in-hierarchy number 17 in the second hierarchy).

The mutual link ban is the information for restricting the selection of the user. As described above, in the present embodiment, the user can only select the sorting marks belonging to the lowest hierarchy. Basically, the user can mutually select the sorting mark. However, some sorting marks if mutually selected may cause an inconsistency. For example, if the "important save", the "confirmation required" and the "normal save" are simultaneously selected, an inconsistency is to occur. Therefore, these need to be selected exclusively from each other. The mutual link ban information is the information for enabling an exclusive selection process and the information for enabling the user to select only one sorting mark of plural sorting marks. Therefore, if the user selects one sorting mark of the plural sorting marks set as the mutual link ban, the user is not allowed to select the rest of those sorting marks.

As described above, in the present embodiment, the user can only select the sorting marks belonging to the lowest hierarchy. Therefore, the mutual link ban may be set for the lowest hierarchy belonging to sorting mark.

The sorting marks can be grouped by sorting marks belonging to the hierarchy higher by one level than the lowest hierarchy. For example, in the example illustrated in FIG. 28, four sorting marks “important save”, “confirmation required”, “reply required”, and “normal save” in the lowest hierarchy belong to the sorting mark “save marks” in the hierarchy higher by one level. In addition, five sorting marks “schedule”, “contact information”, “meeting invitation”, “accounting”, and “instructions” in the lowest hierarchy belong to the sorting mark “email body contents” in the hierarchy higher by one level. In this way, sorting marks in the lower hierarchy can be grouped by the sorting marks in the hierarchy higher by one level. The mutual link ban can be set for each sorting mark in the hierarchy higher by one level (for each group).

For example, in a case where three sorting marks (“important save”, “confirmation required”, and “normal save”) belonging to the sorting mark “save marks” in the hierarchy higher by one level are set as the mutual link ban, and five sorting marks (“schedule”, “contact information”, “meeting invitation”, “accounting”, and “instructions”) belonging to the “email body contents” are set as the mutual link ban, when the “important save” in the “save marks” is selected by the user, the “confirmation required”, “reply required”, and “normal save” remained in the “save marks” is not allowed to be selected, but any one of five sorting marks (“schedule”, “contact information”, “meeting invitation”, “accounting”, and “instructions”) belonging to the “email body contents” can be selected in a state where no one is selected. In this way, the mutual link ban set for one sorting mark in the hierarchy higher by one level has no effect on other sorting marks in the hierarchy higher by one level.

As described above, the number of hierarchies may be at least two. FIG. 30 illustrates an example in which the sorting marks are defined using three hierarchies. For example, as for the “photos” lower than the “attachments”, the third hierarchy further lower is defined, and the “landscapes” and “portraits” belong to the third hierarchy under “photos”. As for “school” lower than the “sender (organizations)”, the third hierarchy further lower is defined, and “primary school”, “junior high school”, “high school”, and “college/university” belong to the third hierarchy lower than “school”.

As describe above, the sorting mark management process illustrated in FIG. 13 is a process to edit the sorting mark management table. The process to add the sorting mark is a process to add the sorting mark belonging to any hierarchy of a plurality of hierarchies. The sorting mark can be added in any hierarchy of a plurality of hierarchies, that is, even in the highest hierarchy or the lowest hierarchy.

Adding the sorting mark is a process to add the sorting mark in a designated hierarchy in the sorting mark management table.

<<Sorting Mark Addition Process>>

FIG. 14 is a flowchart showing the sorting mark addition process. This is called and executed in the process at step T1306 in FIG. 13.

First, the user terminal device 110 displays a sorting mark addition screen (at step T1402).

FIG. 59 a diagram illustrating an example of the sorting mark addition screen. The sorting mark addition screen displays the sorting marks in a layout similar to the email save designation screen or the email search designation screen.

The sorting mark addition screen displays on the lower left portion an add button for adding a new sorting mark to the major classification (the first hierarchy). On the right portion of the screen, each of add buttons is displayed for adding a new sorting mark to each of the “save marks”, “email body contents”, “attachment contents”, and “email organizing boxes” in the minor classification (the second hierarchy). The user operates the add button corresponding to a sorting mark he/she wants to add.

Next, the user terminal device 110 refers to the sorting mark management table to decide the maximum in-hierarchy number of the hierarchy on which the operation for adding the sorting mark is made (at step T1404).

For example, in the case of the sorting mark management table shown in FIG. 28, four sorting marks are already defined in the major classification (the first hierarchy). The add button is pushed to decide the maximum in-hierarchy number of the first hierarchy to be five. Four sorting marks are already defined for the “save marks” in the minor classification (the second hierarchy). The add button is pushed to decide the maximum in-hierarchy number of the hierarchy for the “save marks” to be five. Five sorting marks are already defined for the “email body contents” in the minor classification (the second hierarchy). The add button is pushed to decide the maximum in-hierarchy number of the hierarchy for the “email body contents” to be six. Ten sorting marks are already defined for the “attachment contents” in the minor classification (the second hierarchy). The add button is pushed to decide the maximum in-hierarchy number of the hierarchy for the “attachment contents” to be 11. Twenty-one sorting marks are already defined for the “email organizing boxes” in the minor classification (the second hierarchy). The add button is pushed to decide the maximum in-hierarchy number of the hierarchy for the “email organizing boxes” to be 22.

Next, the user terminal device 110 displays a field for inputting content of the sorting mark to decide the content of the sorting mark input by the user (at step T1406). For example, the user can input text information representing the content of the sorting mark through the keyboard or the like to decide the content of the sorting mark. The content of the sorting mark is an indicated name of the sorting mark. For example, the indicated names of the sorting marks displayed on an email save designation screen 3000 as illustrated in FIG. 37 to FIG. 54, FIG. 57, and FIG. 58 are the contents of the sorting marks.

Next, the user terminal device 110 displays a field for inputting mutual link ban information to decide the mutual link ban information input by the user (at step T1408). For example, the mutual link ban information can be set for plural sorting marks to ban these sorting marks from being mutually selected.

Next, the user terminal device 110 decides the display position of the sorting mark depending on the operation of the user (at step T1410). For example, the sorting mark can be dragged and moved by a mouse, a finger, or the like to decide the display position of the sorting mark.

Next, the user terminal device 110 determines whether or not the user carries out a completion operation (at step T1412).

The user terminal device 110, if determining that the user does not carry out the completion operation (NO), returns the process to step T1406.

The user terminal device 110, if determining that the user carries out the completion operation (YES), stores the maximum number of sorting marks, the sorting mark content, the mutual link ban information, and the display position in the sorting mark management table (at step T1414), and ends this subroutine.

<<Sorting Mark Change Process>>

FIG. 15 is a flowchart showing the sorting mark change process. This is called and executed in the process at step T1310 in FIG. 13.

First, the user terminal device 110 displays a sorting mark change screen (at step T1502).

Figure 60:
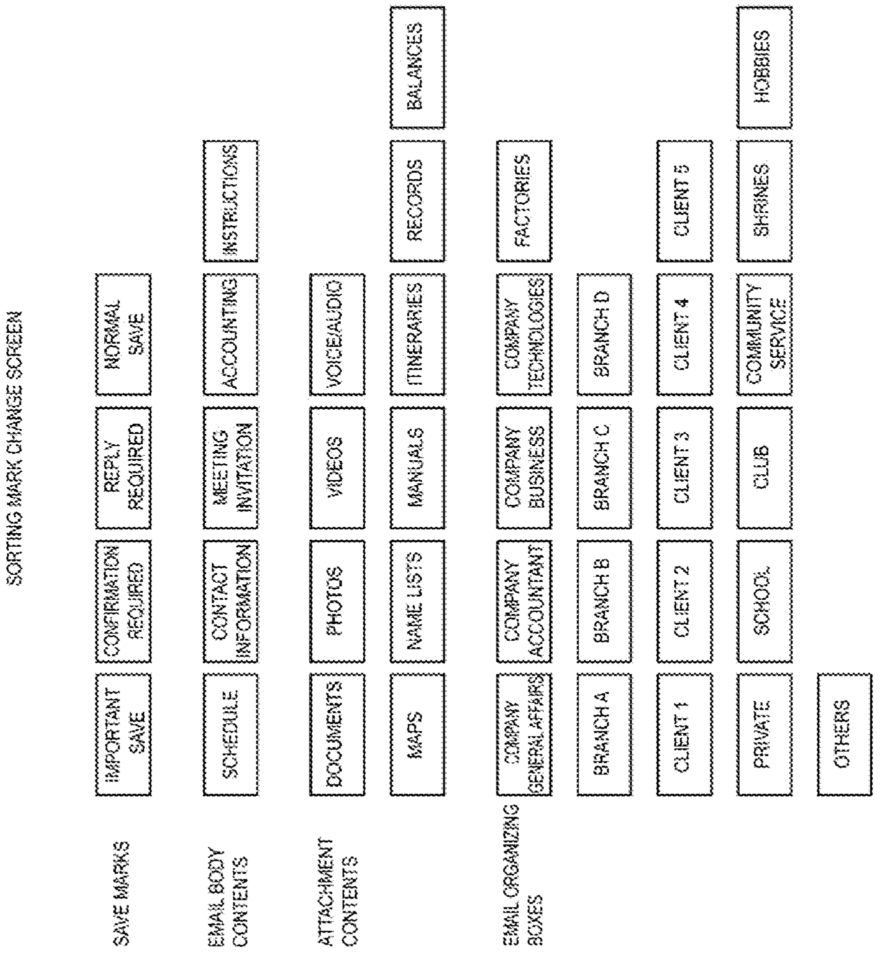
FIG. 60 is a diagram illustrating an example of a sorting mark change screen.

FIG. 60 is a diagram illustrating an example of the sorting mark change screen. The sorting mark change screen also displays the sorting marks in a layout similar to the email save designation screen or the email search designation screen, like in FIG. 59.

Next, the user terminal device 110 determines whether or not the device 110 is operated by the user (at step T1504). Examples of the operation of the user include a click operation using a mouse and a tap operation using a finger.

Next, the user terminal device 110, if determining that the device 110 is not operated by the user (NO), returns the process to step T1504.

On the other hand, the user terminal device 110, if determining that the device 110 is operated by the user (YES), detects an operation position where the user operates (at step T1506). Examples of the operation position include a position clicked with a mouse operation and a position tapped with a finger. The process at step T1506 may be a process to identify an operated key or identify input voice/audio.

Next, the user terminal device 110 calls and executes the sorting mark read process illustrated in FIG. 18 (at step T1508). This allows the sorting mark designated by the operation of the user to be specified.

Next, the user terminal device 110 display a field for inputting content of the sorting mark to decide the content of the sorting mark input by the user (at step T1512). For example, the user can input text information representing the content of the sorting mark through the keyboard or the like to decide the content of the sorting mark.

Next, the user terminal device 110 displays a field for inputting mutual link ban information to decide the mutual link ban information input by the user (at step T1514). For example, the mutual link ban information can be set for plural sorting marks to ban these sorting marks from being mutually selected.

Next, the user terminal device 110 decides the display position of the sorting mark and the hierarchy depending on the operation of the user (at step T1516). For example, the sorting mark can be dragged and moved by a mouse, a finger, or the like to decide the display position of the sorting mark. Changing the display position of the sorting mark can also change the hierarchy to which the sorting mark belongs.

Next, the user terminal device 110 determines whether or not the user carries out a completion operation (at step T1516).

The user terminal device 110, if determining that the user does not carry out the completion operation (NO), returns the process to step T1510.

The user terminal device 110, if determining that the user carries out the completion operation (YES), stores the sorting mark content, the mutual link ban information, and the display position in the sorting mark management table (at step T1518), and ends this subroutine.

<<Sorting Mark Delete Process>>

FIG. 16 is a flowchart showing the sorting mark delete process. This is called and executed in the process at step T1314 in FIG. 13.

First, the user terminal device 110 displays a sorting mark delete screen (at step T1602).

The sorting mark delete screen (not illustrated) is configured similar to the sorting mark change screen illustrated in FIG. 57. The sorting mark delete screen also displays the sorting marks in a layout similar to the email save designation screen or the email search designation screen.

Next, the user terminal device 110 determines whether or not the device 110 is operated by the user (at step T1604). Examples of the operation of the user include a click operation using a mouse and a tap operation using a finger.

Next, the user terminal device 110, if determining that the device 110 is not operated by the user (NO), returns the process to step T1604.

On the other hand, the user terminal device 110, if determining that the device 110 is operated by the user (YES), detects an operation position where the user operates (at step T1606). Examples of the operation position include a position clicked by a mouse operation and a position tapped by a finger. The process at step T1606 may be a process to identify an operated key or identify input voice/audio.

Next, the user terminal device 110 calls and executes the sorting mark read process illustrated in FIG. 18 (at step T1608). This allows the sorting mark designated by the operation of the user to be specified.

Next, the user terminal device 110 determines whether or not the user carries out a delete operation (at step T1610).

The user terminal device 110, if determining that the user does not carry out the delete operation (NO), immediately ends this subroutine.

The user terminal device 110, if determining that the user carries out the delete operation (YES), displays a message notifying of that the deletion will be made (at step T1612).

The user terminal device 110 determines whether or not the user carries out an operation to permit the deletion (at step T1614).

The user terminal device 110, if determining that the user does not carry out the operation to permit the deletion (NO), immediately ends this subroutine.

The user terminal device 110, if determining that the user caries out the operation to permit the deletion (YES), deletes an item corresponding to the sorting mark designated by the user from the sorting mark management table (at step T1616), and ends this subroutine.

<<New Sorting Mark Creation Process>>

FIG. 17 is a flowchart showing the new sorting mark creation process. This is called and executed in the process at step T1318 in FIG. 13.

First, the user terminal device 110 displays a sorting mark model list screen (at step T1702).

FIG. 61 is a diagram illustrating the sorting mark model list screen. The representative sorting marks are predefined and stored in the model. The user may use the sorting marks defined in the model with or without change. The sorting mark determined to be unnecessary by the user can be deleted. Even the sorting mark determined to be unnecessary by the user and deleted can be also registered again.

Next, the user terminal device 110 determines whether or not the device 110 is operated by the user (at step T1704).

Examples of the operation of the user include a click operation using a mouse and a tap operation using a finger.

Next, the user terminal device 110, if determining that the device 110 is not operated by the user (NO), returns the process to step T1704.

On the other hand, the user terminal device 110, if determining that the device 110 is operated by the user (YES), determines whether or not the operation of the user is an operation for adding the sorting mark (at step T1706).

The user terminal device 110, if determining that the operation of the user is the operation for adding the sorting mark (YES), stores the added sorting mark (at step T1708) and returns the process to step T1704.

The user terminal device 110, if determining that the operation of the user is not the operation for adding the sorting mark (NO), determines whether or not the operation of the user is an operation for editing the sorting mark (at step T1710).

The user terminal device 110, if determining that the operation of the user is the operation for editing the sorting mark (YES), stores the edited sorting mark (at step T1712) and returns the process to step T1704.

The user terminal device 110, if determining that the operation of the user is not the operation for editing the sorting mark (NO), determines whether or not the operation of the user is an operation for deleting the sorting mark (at step T1714).

The user terminal device 110, if determining that the operation of the user is the operation for deleting the sorting mark (YES), deletes the sorting mark (at step T1716) and returns the process to step T1704.

The user terminal device 110, if determining that the operation of the user is not the operation for deleting the sorting mark (NO), determines whether or not the operation of the user is an operation for moving the sorting mark (at step T1718).

The user terminal device 110, if determining that the operation of the user is the operation for moving the sorting mark (YES), stores a display position and hierarchy of a sorting mark move destination (at step T1720) and returns the process to step T1704.

The user terminal device 110, if determining that the operation of the user is not the operation for moving the sorting mark (NO), determines whether or not the operation of the user is an end operation (at step T1722).

The user terminal device 110, if determining that the operation of the user is not the end operation (NO), returns the process to step T1704, or if determining the end operation (YES), ends this subroutine.

<<Sorting Mark Read Process>>

FIG. 18 is a flowchart showing the sorting mark read process. This is called and executed in the process at step T1002 in FIG. 10, step T1508 in FIG. 15, step T1608 in FIG. 16, or step T2102 in FIG. 21.

The sorting mark read process is a process to refer to the sorting mark management table to read out the in-hierarchy number of the sorting mark designated by the operation of the user for each hierarchy, and read out the display position of the sorting mark, the content of the sorting mark and the ban information. By this process, the display position, content and ban information of the sorting mark designated by the user can be read out.

The in-hierarchy number is a number, in each hierarchy, assigned to the sorting mark belonging to the hierarchy. A set of the in-hierarchy numbers in the respective hierarchies can specify the sorting mark, and the set of the in-hierarchy numbers is referred to as an identification number of the sorting mark.

The sorting mark management table defines a correspondence relationship between the display position of the sorting mark and the sorting mark, and even if the display position of the sorting mark is changed, the identification number of the sorting mark is fixed. In this way, the sorting mark and the display position are linked such that the user can display the sorting mark at a position which is easy for the user to view and specify.

First, the user terminal device 110 refers to the sorting mark management table to initialize a search position used to search for the sorting mark (at step T1802).

Next, the user terminal device 110 reads out the display position of the sorting mark from the sorting mark management table (at step T1804).

Next, the user terminal device 110 determines whether or not the operation position operated by the user is included in the display position (at step T1806). For example, it is determined whether or not the operation position is included in a predetermined display region centered on the display position.

Determining whether or not the operation position operated by the user is included in the display position enables to determine whether or not a sorting mark exists at the operation position operated by the user and enables, if exists, to decide a sorting mark among the sorting marks stored in the sorting mark management table.

The user terminal device 110, if determining that the operation position operated by the user is not in the display position (NO), updates the search position to the next one (at step T1808).

The user terminal device 110, if determining that the operation position operated by the user is included in the display position (YES), initializes a hierarchy number (at step T1810).

The sorting mark exists at the position operated by the user and is any of the sorting marks stored in the sorting mark management table.

Next, the user terminal device 110 reads out the in-hierarchy number corresponding to the hierarchy number from the sorting mark management table (at step T1812).

Next, the user terminal device 110 determines whether or not all the hierarchies from the highest hierarchy to the lowest hierarchy are read out (at step T1814).

The user terminal device 110, if determining that all the hierarchies are not read out (NO), decides the next hierarchy number (at step T1816) and returns the process to step T1812.

The user terminal device 110, if determining that all the hierarchies are read out (YES), generates a set of the in-hierarchy numbers (at step T1818).

As described above, the identification number of the sorting mark is defined by a set of the in-hierarchy numbers. The processes at step T1802 to T1818 described above enable to generate the identification number of the sorting mark designated by the user.

Next, the user terminal device 110 reads out the sorting mark content from the sorting mark management table (at step T1820).

Next, the user terminal device 110 reads out the mutual link ban information from the sorting mark management table (at step T1822) and ends this subroutine.

The processes at steps T1820 and T1822 enable to read out the sorting mark content and mutual link ban information of the sorting mark designated by the user.

<<Execution Process>>

FIG. 19 a flowchart showing the execution process. This is called and executed in the process at step T812 in FIG. 8.

First, the user terminal device 110 determines whether or not the sorting mark is selected (at step T1902).

The user terminal device 110, if determining that the sorting mark is not selected (NO), displays a message urging the selection of the sorting mark (at step T1904) and returns the process to step T706 in FIG. 7.

The user terminal device 110, if determining that the sorting mark is selected (YES), determines whether or not a comment is input (at step T1906).

The user terminal device 110, if determining that the comment is not input (NO), displays a message urging an input of a comment (at step T1908) and returns the process to step T706 in FIG. 7.

In a case of a configuration where the sorting mark may be saved in the email file-and-refer table in a state without a comment, the processes at steps T1906 and T1908 can be omitted.

The user terminal device 110, if determining that the comment is input (YES), determines whether or not an attached file exists (at step T1910).

The user terminal device 110, if determining that the attached file exists (YES), determines whether or not the attachment content is selected (at step T1912).

The user terminal device 110, if determining that the attachment content is not selected (NO), displays a message urging a selection of the attachment content (at step T1914) and returns the process to step T706 in FIG. 7.

The user terminal device 110, if determining in the determination process at step T1910 that the attached file does not exist (NO), or if determining in the determination process at step T1912 that the attachment content is selected (YES), the determines whether or not email body contains a link (at step T1916).

The user terminal device 110, if determining that the email body contains a link (YES), determines whether or not the presence or absence of links is selected (at step T1918).

The user terminal device 110, if determining that the presence or absence of links is not selected (NO), displays a message urging a selection of the presence or absence of links (at step T1920) and returns the process to step T706 in FIG. 7.

The user terminal device 110, if determining in the determination process at step T1916 that the email body does not contain a link (NO) and if determining in the determination process at step T1918 that the presence or absence of links is selected (YES), saves in the email file-and-refer table the sorting mark identification information, the comment, the presence or absence of attached files, and the presence or absence of links which are selected in the selection setting table (at step T1922).

By the process at step S1922, as illustrated in FIG. 31, the sorting mark identification information, the comment, the presence or absence of attached files, and the presence or absence of links are stored in the email file-and-refer table in association with the email identification information. Storing in the email file-and-refer table in this way allows the sorting mark to link to (be associated with) the email. Searching for the sorting mark allows the email linked to the sorting mark to be extracted as described later.

Next, the user terminal device 110 clears the email file-and-refer information save screen displayed at step T702 in FIG. 7 (at step T1924) and ends this subroutine.

<<Email Search Process>>

FIG. 20 is a flowchart showing the Email search process. This is called and executed in the process at step T508 in FIG. 5.

Figure 24:
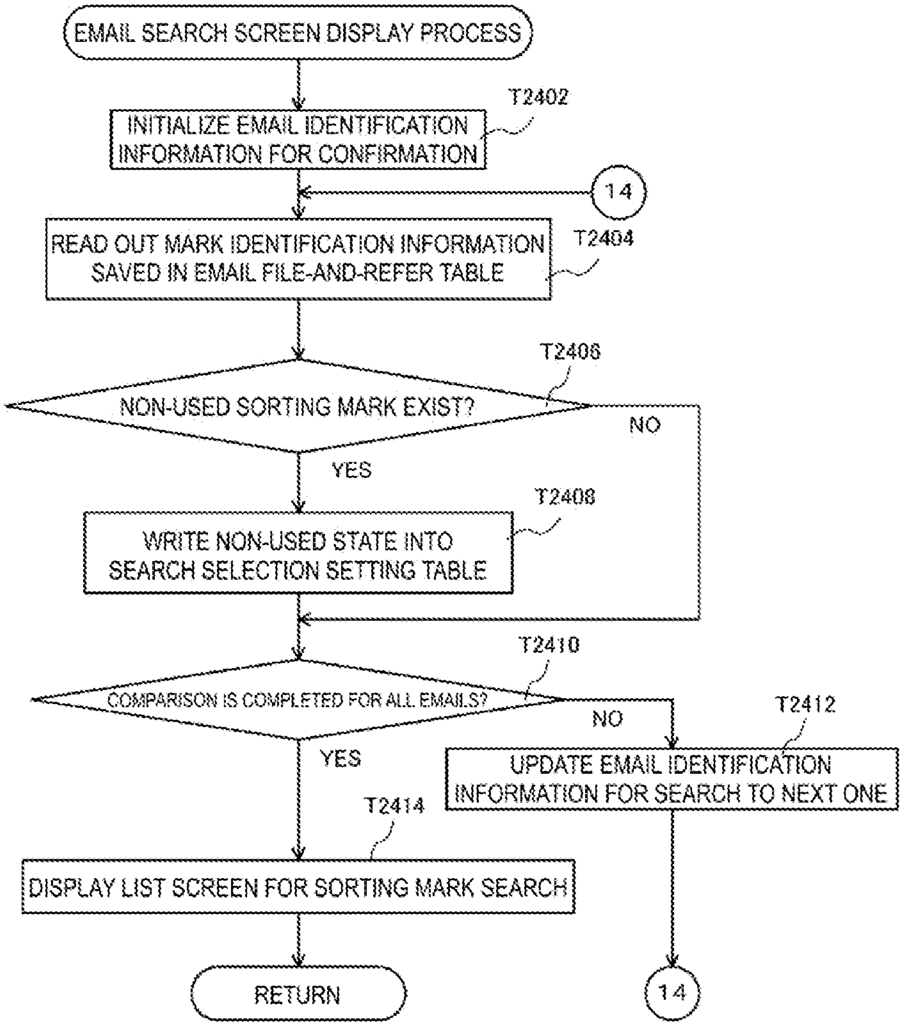
FIG. 24 a flowchart showing an email search screen display process.

First, the user terminal device 110 calls and executes an email search screen display process illustrated in FIG. 24 (at step T2002). The email search screen may be displayed as a window, or in full screen by switching an entire screen. Displaying the email search screen may be sufficient so long as when ending displaying this screen, the next screen or a previous screen can be displayed.

For example, FIG. 62 and FIG. 63 each illustrate an example of the email search screen (an email search designation screen 5000 described later). The plural sorting marks are displayed similarly to the email file-and-refer information save screen displayed in the process at step T702 in FIG. 7.

The major classification (higher hierarchy) is displayed along the up-down direction of the email search screen. In the examples illustrated in FIG. 62 and FIG. 63 also, similarly to the examples illustrated in FIG. 37 to FIG. 54, FIG. 57, and FIG. 58, displaying simultaneously the sorting marks in the major classification and the sorting marks in the minor classification along different directions allows a list of the sorting marks in a hierarchical relationship to be displayed to be distributed. It is possible to view easily and conveniently the sorting marks by visualizing the hierarchies and displaying the sorting marks to be distributed, thus the designating operation of the sorting marks for the linkage or search is also easily and conveniently performed.

Next, the user terminal device 110 initializes various pieces of data (at step T2004). For example, a selected state stored in a search selection setting table shown in FIG. 33, data of the comment, and the like are initialized.

The search selection setting table has the same configuration as the selection setting table shown in FIG. 29. As described above, the selection information in the case of the selection setting table includes three kinds, that is, the selected state, the unselected state, and the non-selection. The selection information in the case of the search selection setting table includes four kinds, that is, a selected state, an unselected state, a non-selection, and a non-use.

The non-use is a state of a sorting mark having not been used for selection before and of a sorting mark not linked to an email. Search by using an unused sorting mark wastes time of searching because the corresponding email does not exist of course. For this reason, the unused sorting mark is distinguished as the non-use in order to exclude in advance from being the targets to be searched.

The non-used sorting mark is displayed in a color different from a color of the selectable sorting mark in the email search screen in order to indicate not being the target to be searched. Furthermore, the non-used sorting mark is not allowed to be designated by the user.

Next, the user terminal device 110 determines whether or not the device 110 is operated by the user (at step T2006). Examples of the operation of the user include a click operation using a mouse and a tap operation using a finger.

Next, the user terminal device 110, if determining that the device 110 is not operated by the user (NO), returns the process to step T2006.

On the other hand, the user terminal device 110, if determining that the device 110 is operated by the user (YES), detects an operation position where the user operates (at step T2008). Examples of the operation position include a position clicked with a mouse operation and a position tapped with a finger. The process at step T2008 may be a process to identify an operated key or identify input voice/audio.

Next, user terminal device 110 determines whether or not a search execute button is operated (at step T2010).

Figure 62:
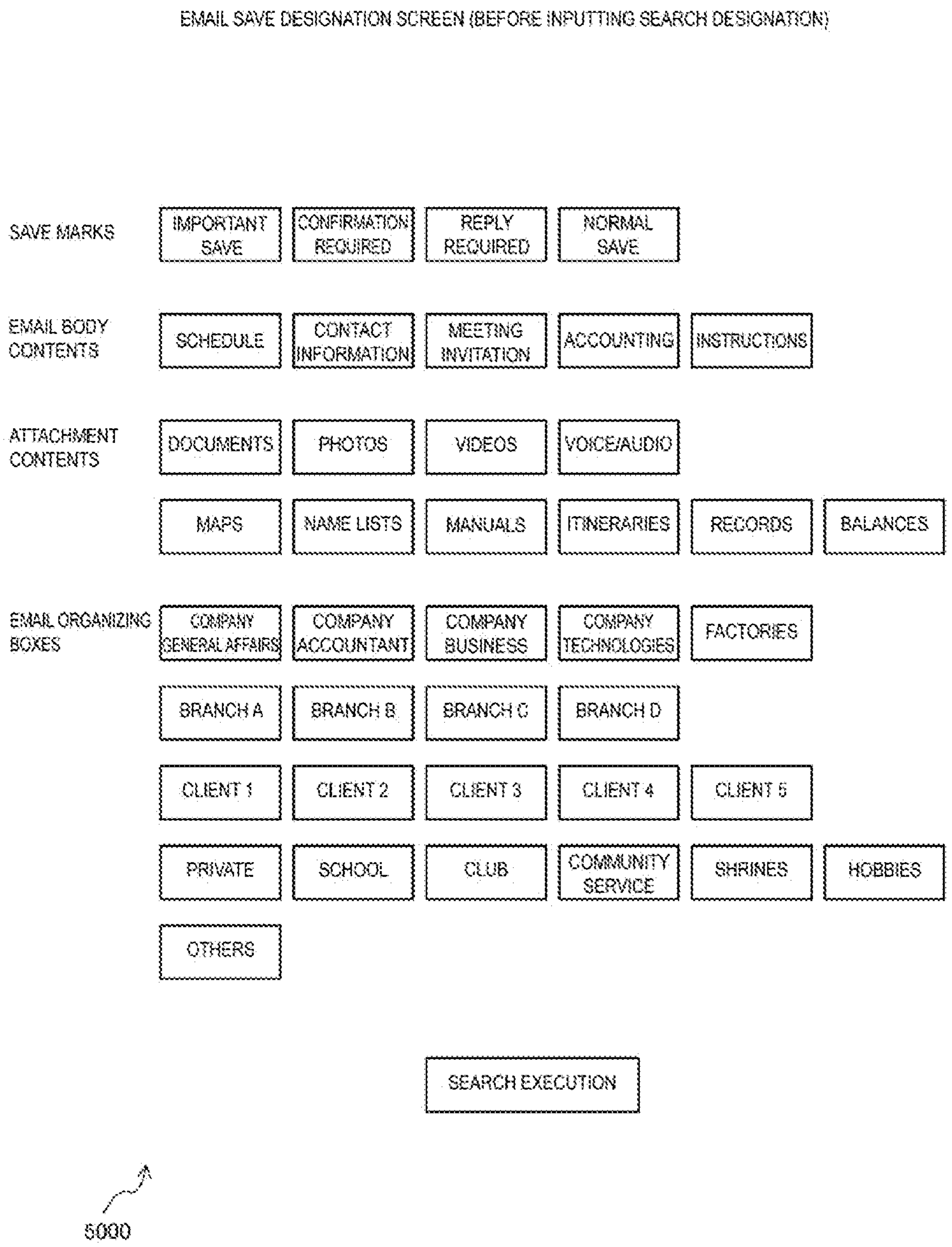
FIG. 62 is a diagram illustrating an example of an email search screen (before an search execution).
Figure 63:
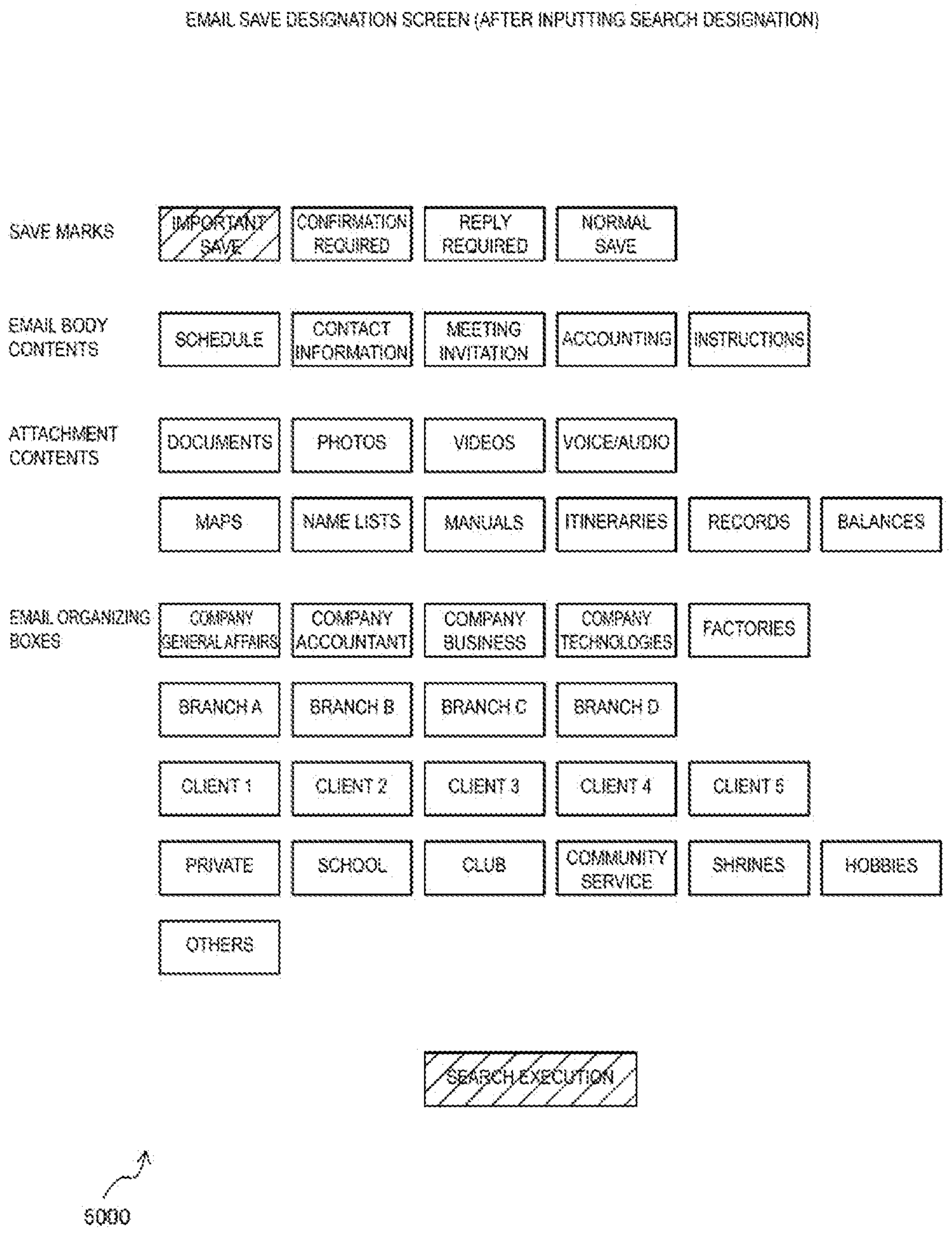
FIG. 63 is a diagram illustrating an example of an email search screen (after the search execution).

For example, as illustrated in FIG. 62 and FIG. 63, the "search execute" button is displayed at a lower portion on the email search designation screen 5000. The user can operate this "search execute" button to start searching.

Figure 21:
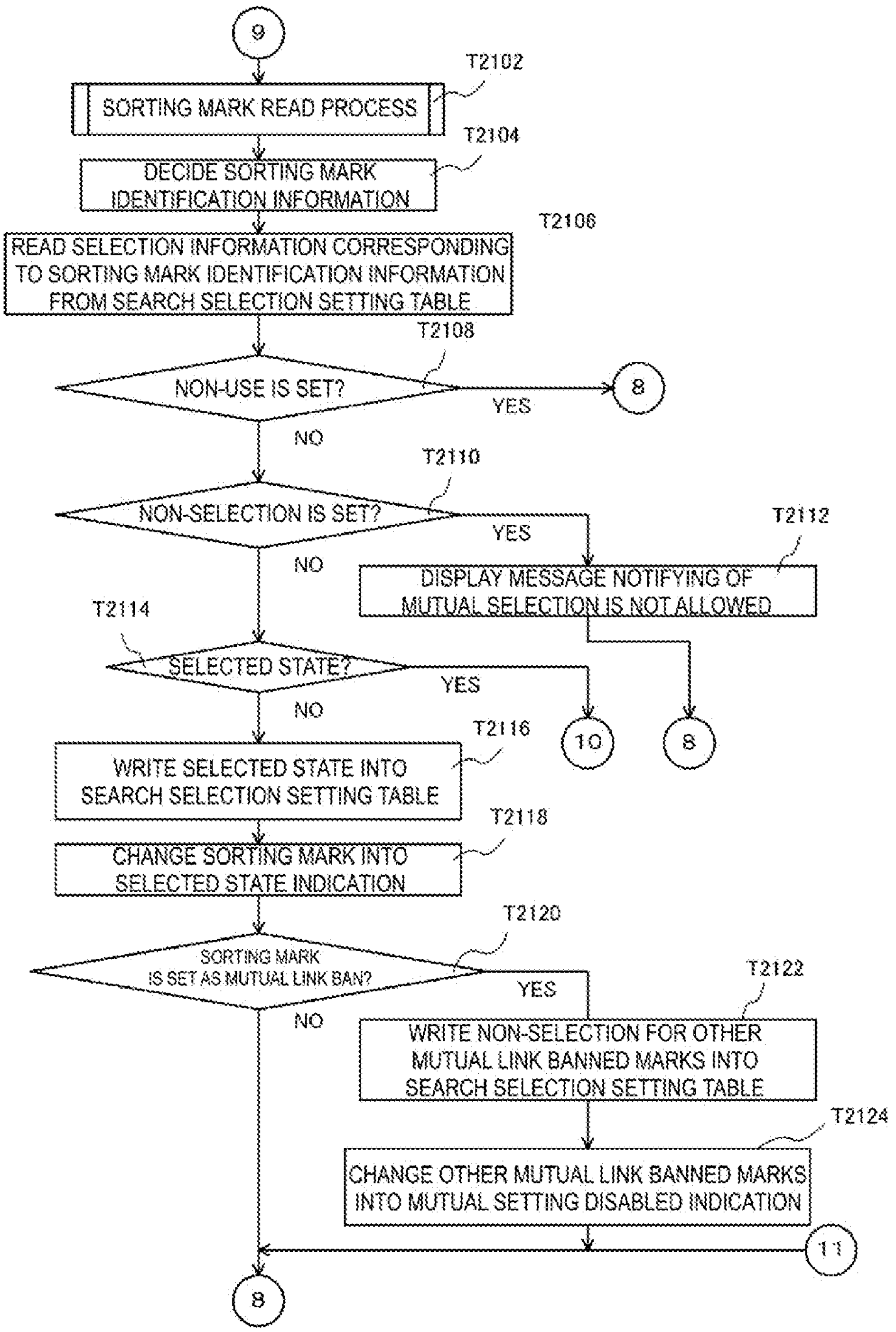
FIG. 21 is a flowchart showing the search process.
Figure 22:
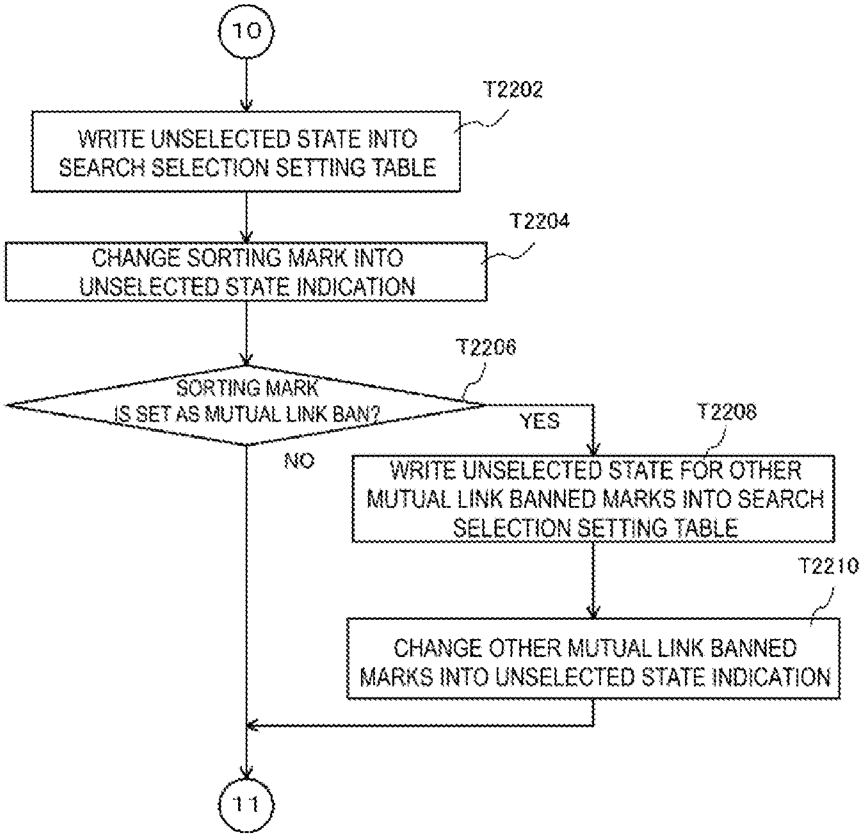
FIG. 22 is a flowchart showing the search process.

The user terminal device 110, if determining that the search execute button is not operated (NO), returns the process to step T2102 in FIG. 21.

The user terminal device 110, if determining that the search execute button is operated (YES), determines whether or not a search condition is input (at step T2012).

In the present embodiment, the search condition refers to the sorting mark or set of sorting marks selected by the user.

The user terminal device 110, if determining that the search condition is not input (NO), displays a message notifying of that a search condition is not input (at step T2014), and returns the process to step T2006.

Figure 23:
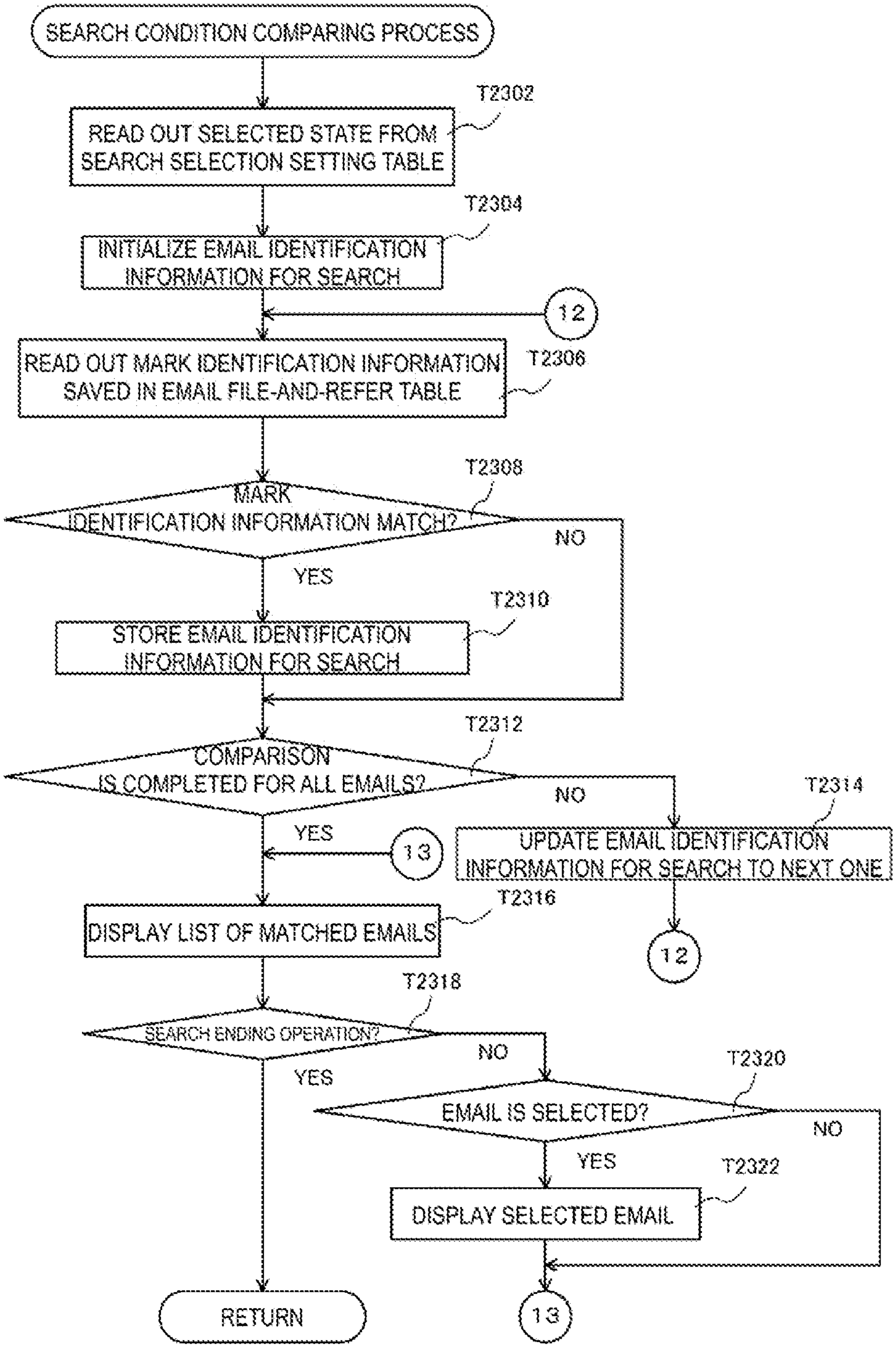
FIG. 23 is a flowchart showing a search condition comparing process.

The user terminal device 110, if determining that the search condition is input (YES), calls and executes a search condition comparing process illustrated in FIG. 23 (at step T2016), and ends this subroutine.

The user terminal device 110, if determining in the determination process at step T2010 described above that the search execute button is not operated (NO), calls and executes the sorting mark read process illustrated in FIG. 18 (at step T2102).

Next, the user terminal device 110 decides the sorting mark identification information (at step T2104).

Next, the user terminal device 110 reads out the selection information corresponding to the sorting mark identification information from the search selection setting table (at step T2106).

Next, the user terminal device 110 determines whether or not the selection information is set to the non-use (at step T2108).

The user terminal device 110, if determining that the selection information is set to the non-use (YES), returns the process to step T2006 in FIG. 20.

The non-use which means a sorting mark having not been used before as described above includes no merit in using as the target to be searched, and therefore, the process is immediately returned.

The user terminal device 110, if determining that the selection information is not set to non-use (NO), determines whether or not the selection information is set to non-selection (at step T2110).

Non-selection means a state where the sorting mark is not allowed to be selected by the operation of the user. Non-selection is directed to the sorting mark set as mutual link ban. The mutual link ban is information for selecting predetermined plural sorting marks exclusively from each other.

The user terminal device 110, if determining that the selection information is set to non-selection (YES), displays a message notifying of that the sorting mark designated by the user is not allowed to be mutually selected (at step T2112) and returns the process to step T2006 in FIG. 20.

The user terminal device 110, if determining that the selection information is not set to the non-selection (NO), determines whether or not the sorting mark designated by the user is in the selected state (at step T2114).

The user terminal device 110, if determining that the sorting mark designated by the user is not in the selected state (NO), that is, is in the unselected state, writes the selected state into the search selection setting table (at step T2116), and changes an indication of the sorting mark into the selected state indication (at step T2118).

Next, the user terminal device 110 determines whether or not the sorting mark designated by the user is set as the mutual link ban (at step T2120).

The user terminal device 110, if determining that the sorting mark designated by the user is set as the mutual link ban (YES), writes the non-selection for other mutual link banned sorting marks into the selection setting table (at step T2122).

Next, the user terminal device 110 changes indications of other mutual link banned sorting marks into mutual setting disabled indication (at step T2124).

If one of the mutual link banned sorting marks is selected in the process at step T1020, the rest of the mutual link banned sorting marks are set to be incapable of being selected, and the indication is switched to that representing an indication the rest of the mutual link banned sorting marks is not allowed to be selected in the process at step T1022.

The user terminal device 110, if determining in the determination process at step T2014 described above that the sorting mark designated by the user is in the selected state (YES), writes the unselected state into the selection setting table (at step T2202) and changes the indication of the sorting mark into the unselected state indication (at step T2204).

Next, the user terminal device 110 determines whether or not the sorting mark designated by the user is set as the mutual link ban (at step T2206).

The user terminal device 110, if determining that the sorting mark designated by the user is set as the mutual link ban (YES), writes the unselected state for other mutual link banned sorting marks into the selection setting table (at step T2208).

Next, the user terminal device 110 changes other mutual link banned sorting marks into the unselected state (at step T2210).

If one mutual link banned sorting mark having been selected is released from being selected, and changed into the unselected state in the process at step T2202, the rest of the mutual link banned sorting marks are also set to the unselected state in the process at step T2208. This allows all the mutual link banned sorting marks to return to a selectable state.

Furthermore, one mutual link banned sorting mark having been selected is switched to the unselected state indication in the process at step T2204 as well as the rest of the mutual link banned sorting marks are also switched to the unselected state indication in the process at step T2210. This can indicate that all the mutual link banned sorting marks have returned to the selectable state.

The user terminal device 110, if determining in the determination process at step T2120 or T2206 that the sorting mark is not set as the mutual link ban (NO), or if executing the process at step T2124 or T2210, ends this subroutine.

The processes at steps T2114, T2116, T2118, T2202, and T2204 described above allow setting and releasing of the sorting mark to be alternately selected. In other words, an on-state and an off-state can be alternately selected like a toggle switch. The indication of the sorting mark is also switched depending on the selection of the setting and releasing of the sorting mark. For example, an indication color for a set state and an indication color for a released state (unselected state) are differentiated to allow the set and released states of the sorting mark to be easily viewed.

<<Search Condition Comparing Process>>

FIG. 23 is a flowchart showing the search condition comparing process. This is called and executed in the process at step T2016 in FIG. 20.

First, the user terminal device 110 reads out the selected state from the search selection setting table (at step T2302).

Next, the user terminal device 110 initializes email identification information for search (at step T2304).

Next, the user terminal device 110 reads out the sorting mark identification information saved in the email file-and-refer table (at step T2306).

Next, the user terminal device 110 determines whether or not the sorting mark identification information matches (at step T2308).

The user terminal device 110, if determining that the sorting mark identification information matches (YES), stores the email identification information for search (at step T2310).

The user terminal device 110, if determining that the sorting mark identification information does not match (NO), or if executing the process at step T2310, determines whether or not the comparison is completed for the all emails (at step T2312).

The user terminal device 110, if determining that the comparison is not completed for the all emails (NO), updates the email identification information for search to the next one (at step T2314) and returns the process to step T2306 described above.

The user terminal device 110, if determining that the comparison is completed for the all emails (YES), displays a list of the matched emails (at step T2316). Examples of the list of the emails include a search result screen 6000 illustrated in FIG. 64 to FIG. 67.

Next, the user terminal device 110 determines whether or not a search ending operation is performed (at step T2318).

Next, the user terminal device 110, if determining that the search ending operation is not performed (NO), determines whether or not an email is selected (at step T2320).

Next, the user terminal device 110, if determining that the email is selected (YES), displays the selected email (at step T2322).

The user terminal device 110, if determining that the email is not selected (NO), or if executing the process at step T2322, returns the process to step T2316.

<<Email Search Screen Display Process>>

FIG. 24 a flowchart showing the email search screen display process. This is called and executed in the process at step T2002 in FIG. 20.

First, the user terminal device 110 initializes an email identification information for confirmation (at step T2402).

Next, the user terminal device 110 reads out the sorting mark identification information saved in the email file-and-refer table (at step T2404).

Next, the user terminal device 110 determines whether or not the non-used sorting mark exists (at step T2406).

The user terminal device 110, if determining that the non-used sorting mark exists (YES), writes the non-used state into the search selection setting table (at step T2408).

The user terminal device 110, if determining that the non-used sorting mark does not exist (NO), or if executing the process at step T2408, determines whether or not the comparison is completed for the all emails (at step T2410).

The user terminal device 110, if determining that the comparison is not completed for the all emails (NO), updates the email identification information for search to the next one (at step T2412) and returns the process to step T2404.

The user terminal device 110, if determining that the comparison is completed for the all emails (YES), displays a list screen for sorting mark search (at step T2414) and ends this subroutine.

<<Process after Elapse of Predetermined Time Period>>

Figure 25:
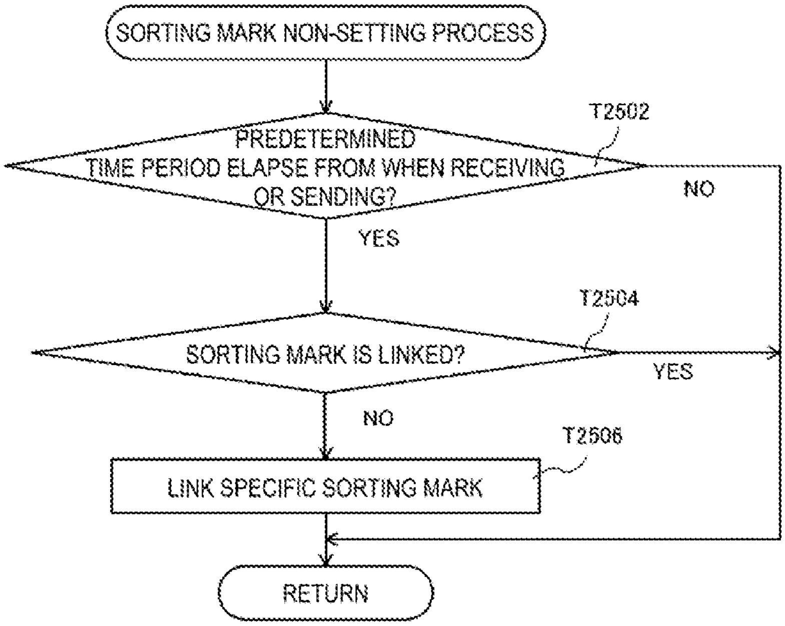
FIG. 25 is a flowchart showing a sorting mark non-setting process.

FIG. 25 illustrates a process which is periodically repeatedly called and executed from when an email is received or sent.

First, the user terminal device 110 determines whether or not a predetermined time period elapses from when an email is received or sent (at step T2502).

In this process at step T2502, determination can be made based on sent date and time of email or received date and time of email. The predetermined time period may be an arbitrary time period. The user may define a desired time period. For example, the predetermined time period may be two days after, one week after, or one month after. The predetermined time period may be set as not only one time period but also plural time periods. The determination can be made plural times.

The process at step T2502 makes the determination for each of the all received and sent emails.

The user terminal device 110, if determining that a predetermined time period does not elapse from when the email is received or sent (NO), immediately ends this subroutine.

The user terminal device 110, if determining that a predetermined time period elapses from when the email is received or sent (YES), reads out the sorting mark identification information from the email file-and-refer table and determines whether or not the email is linked to the sorting mark (at step T2504).

The user terminal device 110, if determining that the email is linked to the sorting mark (YES), immediately ends this subroutine.

The user terminal device 110, if determining that the email is not linked to the sorting mark (YES), stores the sorting mark identification information of a specific sorting mark in the email file-and-refer table (at step T2506), and ends this subroutine.

The specific sorting mark is preferably the sorting mark indicating not selected. The specific sorting mark may be the "normal save", and may be the sorting mark which enables the search based on the sorting mark.

Instead of storing the sorting mark identification information of the specific sorting mark in the email file-and-refer table, a message may be displayed indicating that a predetermined time period elapses. It is possible to make the user recognize that the sorting mark is not selected to prompt the user to select the sorting mark.

Figure 26:
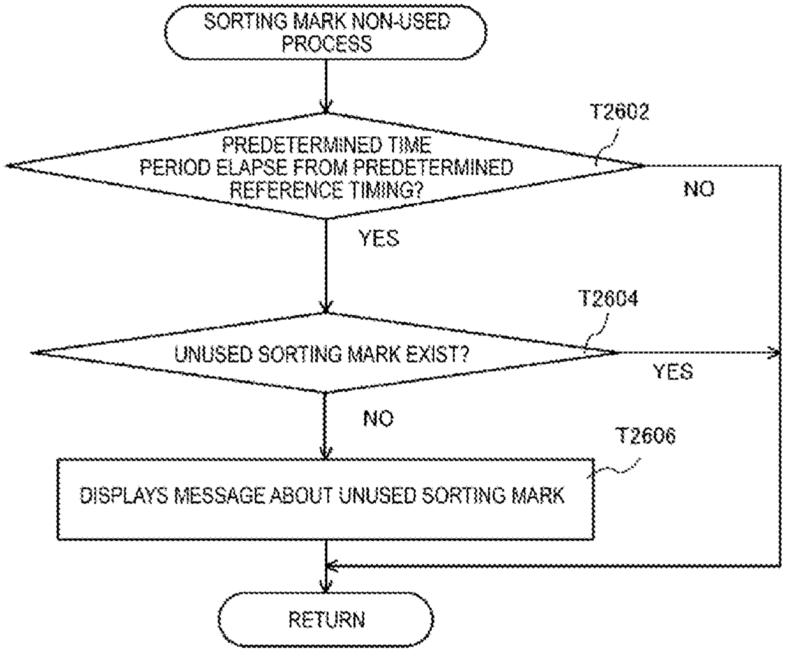
FIG. 26 is a flowchart showing a sorting mark non-used process.

Furthermore, the process illustrated in FIG. 26 is a process periodically repeatedly called and executed from a reference timing. The reference timing for the process illustrated in FIG. 26 may be adequately defined. For example, the reference timing may be a timing when the email file-and-refer program is installed. The reference timing may be defined by the operation of the user.

First, the user terminal device 110 determines whether or not a predetermined time period elapses from a predetermined reference timing (at step T2602).

The predetermined time period may be an arbitrary time period. The user may define a desired time period. For example, the predetermined time period may be two days after, one week after, or one month after. The predetermined time period may be set as not only one time period but also plural time periods. The determination can be made plural times.

The user terminal device 110, if determining that the predetermined time period does not elapse from the predetermined reference timing (NO), immediately ends this subroutine.

The user terminal device 110, if determining that the predetermined time period elapses from the predetermined reference timing (YES), refers to the email file-and-refer table and the sorting mark management table to determine whether or not an unused sorting mark exists (at step T2604).

The user terminal device 110, if determining that the unused sorting mark does not exist (YES), ends this subroutine.

The user terminal device 110, if determining that the unused sorting mark exists (NO), displays a message about the unused sorting mark (at step T2606) and ends this subroutine.

Figure 27:
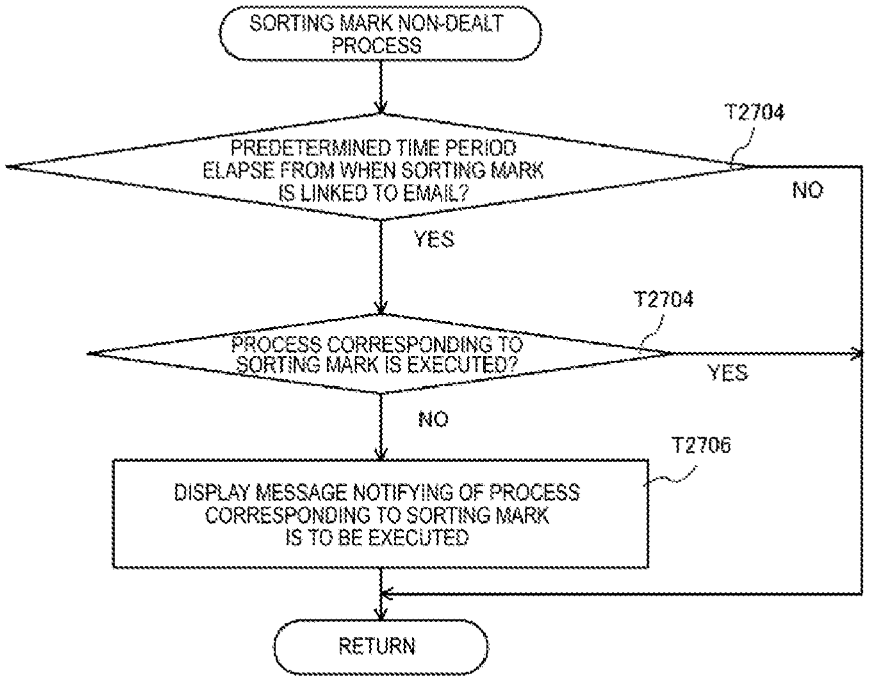
FIG. 27 is a flowchart showing a sorting mark non-dealt process.

The process illustrated in FIG. 27 is periodically repeatedly executed from when the sorting mark is set.

For example, if the sorting mark "reply required" in the "save marks" is linked to the email, in a case where the email is not replied to even after a predetermined time period elapses, a message urging the reply can be displayed to prompt the user to reply to email. This process is a process to remind the user depending on the content of the sorting mark.

First, the user terminal device 110 determines whether or not a predetermined time period elapses from when the sorting mark is linked to the email (at step T2702).

This process at step T2702 can make a determination based on a date and time when the sorting mark is linked to the received email or the sent email. The predetermined time period may be an arbitrary time period. The user may define a desired time period. For example, the predetermined time period may be two days after, one week after, or one month after. The predetermined time period may be set as not only one time period but also plural time periods. The determination can be made plural times.

The process at step T2702 makes the determination for each of the all received and sent emails.

The user terminal device 110, if determining that the predetermined time period does not elapse from when the sorting mark is linked to the email (NO), immediately ends this subroutine.

The user terminal device 110, if determining that the predetermined time period elapses from when the sorting mark is linked to the email (YES), determines whether or not a process corresponding to the sorting mark is executed (at step T2704).

The user terminal device 110, if determining that a process corresponding to the sorting mark is executed (YES), immediately ends this subroutine.

The user terminal device 110, if determining that the process corresponding to the sorting mark is not executed (YES), displays a message notifying of that the process corresponding to the sorting mark is not executed (at step T2706) and ends this subroutine.

For example, the selection setting table shown in FIG. 28 may be configured to be provided with a field (column) of the corresponding process to store content of the corresponding process for the sorting mark requiring the corresponding process. Periodically reading out the corresponding process field in the selection setting table enables to make the determination at step T2702 for the sorting mark requiring the corresponding process.

Monitoring the sorting mark having the content which is somehow to be dealt with enables to remind the user and appropriately deal with the email even if the email is buried in a large amount of emails.

CONCRETE EXAMPLES

Hereinafter, a description is given of concrete examples of a display when receiving an email, concrete examples of a display when sending an email, and concrete examples of a display when searching for an email.

<<Concrete Examples when Receiving Email>>

<Received Email List Screen 1000>

FIG. 34 is a diagram illustrating an example of a received email list screen 1000. As illustrated in FIG. 34, the received email list screen 1000 displays each of plural email summary displays 1100 in one line. The email summary displays 1100 are displayed from the lower portion toward the upper portion in a predetermined order, for example, in a time-series order.

The user selects one email summary display 1100 (at step T502 in FIG. 5) to display an email body of the email, and the user can confirm content of the email body. Examples of a selecting operation include a click operation using a mouse and a tap operation conducted manually.

The email summary display 1100 displays "sender", "title", "email received date and time", and "material attachment mark". The "sender" represents who sent the email, the "title" represents a title of the email, and the "email received date and time" represents a date and time when the email was received.

The "title" created by the email sender is maintained unless the user intentionally changes in sending and receiving thereafter, and repeating the email reply may result in mismatch between the "title" and the content of the email body. For this reason, the user may not recognize what content the email contains only by confirming the "title" in some cases. Even in such a case, by using the sorting mark according to the present embodiment, a desired email can be appropriately searched for and found even if the email is buried.

The received email list screen 1000 displays on the rightmost portion thereof "* material attachment mark," and displays a mark "*" in the "* material attachment mark" if some data is attached to the email. The user can easily recognize an email to which data is attached.

The received email list screen 1000 displays on the upper left portion an "email search" button 1200. The user operates the "email search" button 1200 (at step T508 in FIG. 5) such that the email search designation screen 5000 described later is displayed.

Similar to the received email list screen 1000, a sent email list screen that is a list screen of the already sent emails may be provided with a button the same as "email search" button 1200 to display the email search designation screen 5000. On the sent email list screen also, the user can operate the "email search" button 1200 to search for a sent email.

<Received Email Body Screen 2000>

Figure 35:
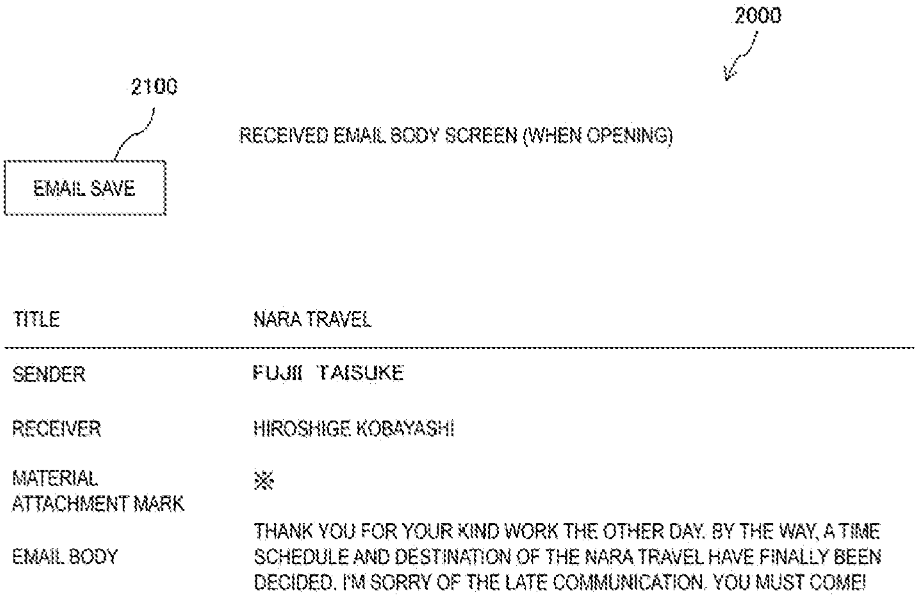
FIG. 35 is a diagram illustrating an example of a received email body screen (when opening an email).
Figure 36:
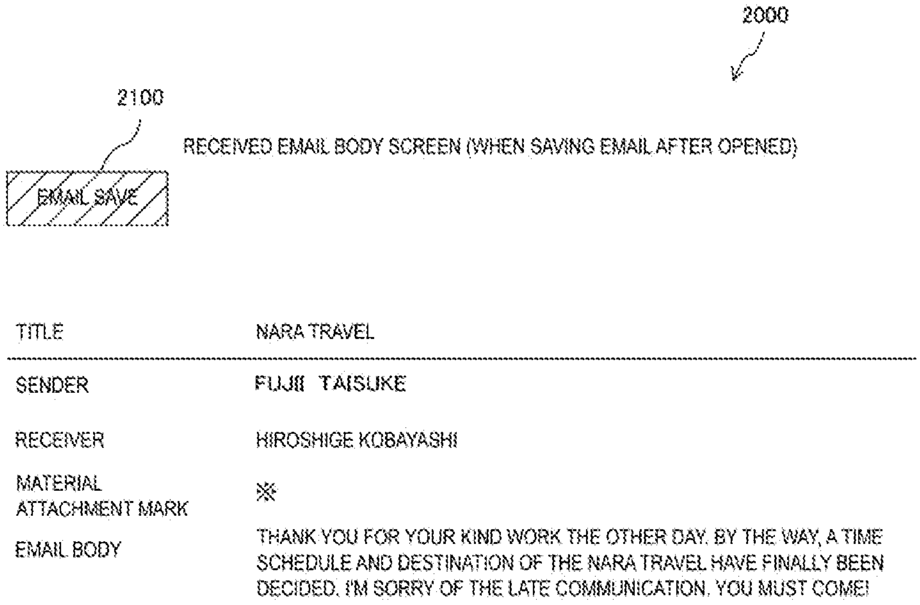
FIG. 36 is a diagram illustrating an example of a received email body screen (when saving an email after opened).

FIG. 35 and FIG. 36 are each a diagram illustrating an example of a received email body screen 2000. FIG. 35 illustrates the received email body screen when opening the email, and FIG. 36 illustrates the received email body screen when saving the email after opened.

The received email body screen 2000 is displayed by selecting one email summary display 1100 when the received email list screen 1000 illustrated in FIG. 34 is displayed. FIG. 35 is an example displayed by selecting the email summary display 1100 which is displayed at the uppermost tier on the received email list screen 1000 illustrated in FIG. 34.

The received email body screen 2000 displays "date and time", "title", "sender", "receiver", "material attachment mark", and "email body". The "receiver" represents who received the email. The email body is displayed on the right side of the "email body".

A "save email" button 2100 is displayed on the upper left portion of the received email body screen 2000. The user operates the "save email" button 2100 (at step T612 in FIG. 6) to display the email save designation screen illustrated in FIG. 37 to FIG. 54.

Operating the "save email" button 2100 by the user changes the indication color of the "save email" button 2100 as illustrated in FIG. 36. In FIG. 36, the change of the indication color is represented by hatched lines. The change of the indication color can clearly indicate to the user that the "save email" button 2100 is operated.

For example, when the "save email" button 2100 is not operated, the "save email" button 2100 is displayed in a white color, and when the "save email" button 2100 is operated, the "save email" button 2100 is displayed in a blue color. If the user operates the "save email" button 2100, the color changes from white to blue, and the email save designation screen 3000 illustrated in FIG. 37 to FIG. 54 is displayed.

Concrete Example 1 of Email Save Designation Screen

FIG. 37 is a diagram illustrating an example of the email save designation screen 3000. The email save designation screen 3000 illustrated in FIG. 37 is displayed by operating the save email button 2100 which is displayed on the upper left portion of the received email body screen 2000 illustrated in FIG. 35 and FIG. 36.

On the upper portion of the email save designation screen 3000, fields of "sender", "date and time", "title", "email body excerpt", and "material attachment mark" are displayed. Information displayed in these fields is information which can be directly acquired from the received email and the sent email.

The email operating menu for operating an email is displayed on the right side in FIG. 37. The email operating menu includes delete, move, and reply. These correspond to the processes at steps T906, T910, and T914 illustrated in FIG. 9.

The major classification (higher hierarchy) is displayed along the up-down direction of the email save designation screen 3000. There are four kinds of the sorting marks in the major classification, that is, save marks, email body contents, attachment contents, and email organizing boxes. The minor classification (lower hierarchy) is displayed along the right-left direction of the email save designation screen 3000. The sorting marks in the minor classification are defined correspondingly to each of the sorting marks in the major classification.

The sorting marks belonging under the save marks include four kinds, that is, important save, confirmation required, reply required, and normal save. The sorting marks belonging under the email body contents include five kinds, that is, schedule, contact information, meeting invitations, accounting, and instructions. The sorting marks belonging under the attachment contents include ten kinds, that is, documents, photos, videos, voice/audio, maps, name lists, manuals, itineraries, records, and balances. Furthermore, the sorting marks belonging under the email organizing boxes include 22 kinds, that is, company general affairs, company accountant, company business, company technologies, factories, branch A, branch B, branch C, branch D, client 1, client 2, client 3, client 4, client 5, private, school, club, community service, shrines, hobbies, and others.

As illustrated in the email save designation screen 3000, the direction in which the sorting marks in the major classification are displayed is differentiated from the direction in which the sorting marks in the minor classification are displayed, such that the sorting marks in the hierarchical relationship can be displayed to be distributed to present a table or the like. It is possible for the user to appropriately view the sorting marks by visualizing the hierarchies for the sorting marks and displaying the plural sorting marks to be distributed, thus the designating operation of the sorting marks is also easily and conveniently performed.

These sorting marks can be designated by the operation of the user (see steps T706 and T714 in FIG. 7, and step T1004 in FIG. 10). The sorting mark can be designated by a click operation using a mouse, a tap operation using a finger, and the like.

As described above, the sorting marks belonging under the save marks include four kinds, that is, important save, confirmation required, reply required, and normal save. Among these, three sorting marks, the important save, the confirmation required, and the normal save are important save→confirmation required→normal save in descending order of a degree of importance. These three sorting marks are the sorting marks set as the mutual link ban. The sorting mark, reply required, which is the sorting mark selected if the user determines that the email requires a reply, is not set as the mutual link ban and can be mutually selected together with other sorting marks such as the important save, the confirmation required, and the normal save. For example, the important save and the reply required can be mutually selected.

The setting as the mutual link ban is stored in the selected state of the selection setting table in FIG. 29. The user can adequately set the mutual link ban in the selected state.

At a time when the user operates the save email button 2100 on the received email body screen 2000 or a sent email body screen 4000 described later to display the email save designation screen 3000, backgrounds of the all sorting marks are indicated in a white color that is a default indication color. Indicating in a white color represents the unselected state. In other words, the user can view that the any sorting mark is in a state capable of being designated and selected.

The background of the sorting mark which is operated by the user to be designated and set to the selected state is indicated in a blue color. As described above, the sorting mark set as the mutual link ban is exclusively selected. Therefore, if one of the sorting marks set as the mutual link ban is designated to be set to the selected state, the background of the sorting mark is indicated in a blue color. Furthermore, the backgrounds of the rest of the sorting marks are indicated in a gray color. Indicating the background of the sorting mark in a gray color allows the user to view the non-selection.

If the user designates the sorting mark which is set as non-selection, the state of the non-selection is maintained (at steps T1008 and T1010 in FIG. 10). If the user designates the sorting mark which is set as non-selection, the sorting mark may be directly set to the selected state (where the background is indicated in a blue color) and other sorting marks may be immediately set to non-selection (where the background is indicated in a gray color). Even in this way, the sorting mark set as the mutual link ban can be maintained to be exclusively selected.

The sorting marks belonging under the email body contents include five kinds, that is, schedule, contact information, meeting invitations, accounting, and instructions. These represent the kinds of the contents of the email bodies. In the present embodiment, these five kinds of sorting marks can be mutually selected, but may be set as the mutual link ban not to be mutually selected.

The sorting marks belonging under the attachment contents include ten kinds, that is, documents, photos, videos, voice/audio, maps, name lists, manuals, itineraries, records, and balances. These are the sorting marks for representing the kinds of electrical data attached to the emails. Plural pieces of attachment data may be attached to one email, where the sorting marks of these can be mutually selected.

The sorting marks belonging under the email organizing boxes include 22 kinds, that is, company general affairs, company accountant, company business, company technologies, factories, branch A, branch B, branch C, branch D, client 1, client 2, client 3, client 4, client 5, private, school, club, community service, shrines, hobbies, and others. In the present embodiment, these 22 kinds of sorting marks can be mutually selected, but may be set as the mutual link ban not to be mutually selected. All these sorting marks may be not set as the mutual link ban, but only some of the sorting marks may be set as the mutual link ban. As described above, the user may adequately set the mutual link ban in the selected state of the selection setting table in FIG. 29.

The comment input region is configured for the use to input texts. A state that the texts can be input is provided by clicking by a mouse or tapping by a finger inside the comment input region. After that, the texts can be input by operating a keyboard or the like, and when the input is completed, clicking with a mouse or finger outside the comment input region completes the text input. After the text input is completed, again clicking with a mouse or finger inside the comment input region allows the text input or edit to be continuously executed.

The sorting mark is used for setting in advance an item usable commonly with plural emails. The contents sent and received in the email are various, and include temporary content, sporadic content, and specific content. Setting the sorting marks for such contents is likely to be complicated. For this reason, the comment can be input to adequately correspond to every email. Particularly, in the comment input region, keywords are input to facilitate search when searching for the saved email. For example, specific keywords such as "travel to Hokkaido" or "business trip with Mr. A" are input and saved to allow easy extraction when searching for the email.

The "execute" button is displayed on the lower portion of the email save designation screen 3000. The "execute" button is an operation button for saving, after the completion of selecting the sorting mark or inputting the comment on the email save designation screen 3000, the selected sorting mark or the comment. The "execute" button can be operated by clicking with a mouse or tapping with a finger on a region on which the "execute" button is displayed. The "execute" button is operated to store the sorting mark identification information, the comment, the presence or absence of attached files, and the presence or absence of links in the email file-and-refer table shown in FIG. 31 in association with the email identification information (see step T1922 in FIG. 19). Storing the sorting mark identification information, the comment, and the like in the email file-and-refer table enables the email to be searched for on the email search designation screen 5000 described later.

The configuration of the email save designation screen 3000 is not limited to this example, and, for example, a "clear" button may be provided which is operated to change all items indicated in a blue or gray color to be indicated in a white color as well as delete the item input in the comment input region.

FIG. 38 is a diagram illustrating a first concrete example of selecting the sorting marks on the email save designation screen 3000 illustrated in FIG. 37.

The examples illustrated in FIG. 37 and FIG. 38 are examples of processing an email having content about a school travel schedule, and data indicating an itinerary for the travel is attached to the email. As illustrated in FIG. 38, the sorting mark "schedule" is selected as the "email body contents", the sorting mark "itineraries" is selected as the "attachment contents", the sorting mark "school" is selected as the "email organizing boxes", and then, the "execute" button is operated.

With this operation, in the email file-and-refer table shown in FIG. 31, "R000001" is stored in the email identification information, "2-1, 3-8, 4-17" is stored in the sorting mark identification information, "1" is stored in the presence or absence of attachments, "0" is stored in the presence or absence of links, and "Nara travel plan on Apr. 1 to Apr. 3, 2016" is stored in the comment.

A head "R" of "R000001" as the email identification information represents a received email. The rest "000001" of the email identification information "R000001" is a number generated as a serial number. The email identification information may be generated based on the date and time when the email was received, instead of the serial number. The email identification information may be information distinguishable from other emails.

The sorting mark identification information "2-1" is the "schedule" in the "email body contents", the sorting mark identification information "3-8" is the "itineraries" in the "attachment contents", and the sorting mark identification information "4-17" is the "school" in the "email organizing boxes". The presence or absence of attachments "1" means that an attached file exists. The presence or absence of links "0" means that the email body does not include link information.

Note that, in the examples illustrated in FIG. 37 and FIG. 38, any of the sorting marks belonging to the "save marks" is not selected.

Concrete Example 2 of Email Save Designation Screen

FIG. 39 and FIG. 40 are each a diagram illustrating a second concrete example of selecting the sorting marks on the email save designation screen 3000.

The examples illustrated in FIG. 39 and FIG. 40 are examples of processing an email about change in contact information of a member belonging to club activities. As illustrated in FIG. 40, the sorting mark "contact information" is selected as the "email body contents", the sorting mark "club" is selected as the "email organizing boxes", and then, the "execute" button is operated.

With this operation, in the email file-and-refer table as illustrated in FIG. 31, "R000002" is stored in the email identification information, "2-2, 4-18" is stored in the sorting mark identification information, "0" is stored in the presence or absence of attachments, "0" is stored in the presence or absence of links, and "Bando, email address change" is stored in the comment.

The sorting mark identification information "2-2" is the "contact information" in the "email body contents", and the sorting mark identification information "4-18" is the "club" in the "email organizing boxes". The presence or absence of attachments "0" means that an attached file does not exist. The presence or absence of links "0" means that the email body does not include link information.

In the examples illustrated in FIG. 39 and FIG. 40, any of the sorting marks belonging to the "save marks" is not selected.

Concrete Example 3 of Email Save Designation Screen

Figure 42:
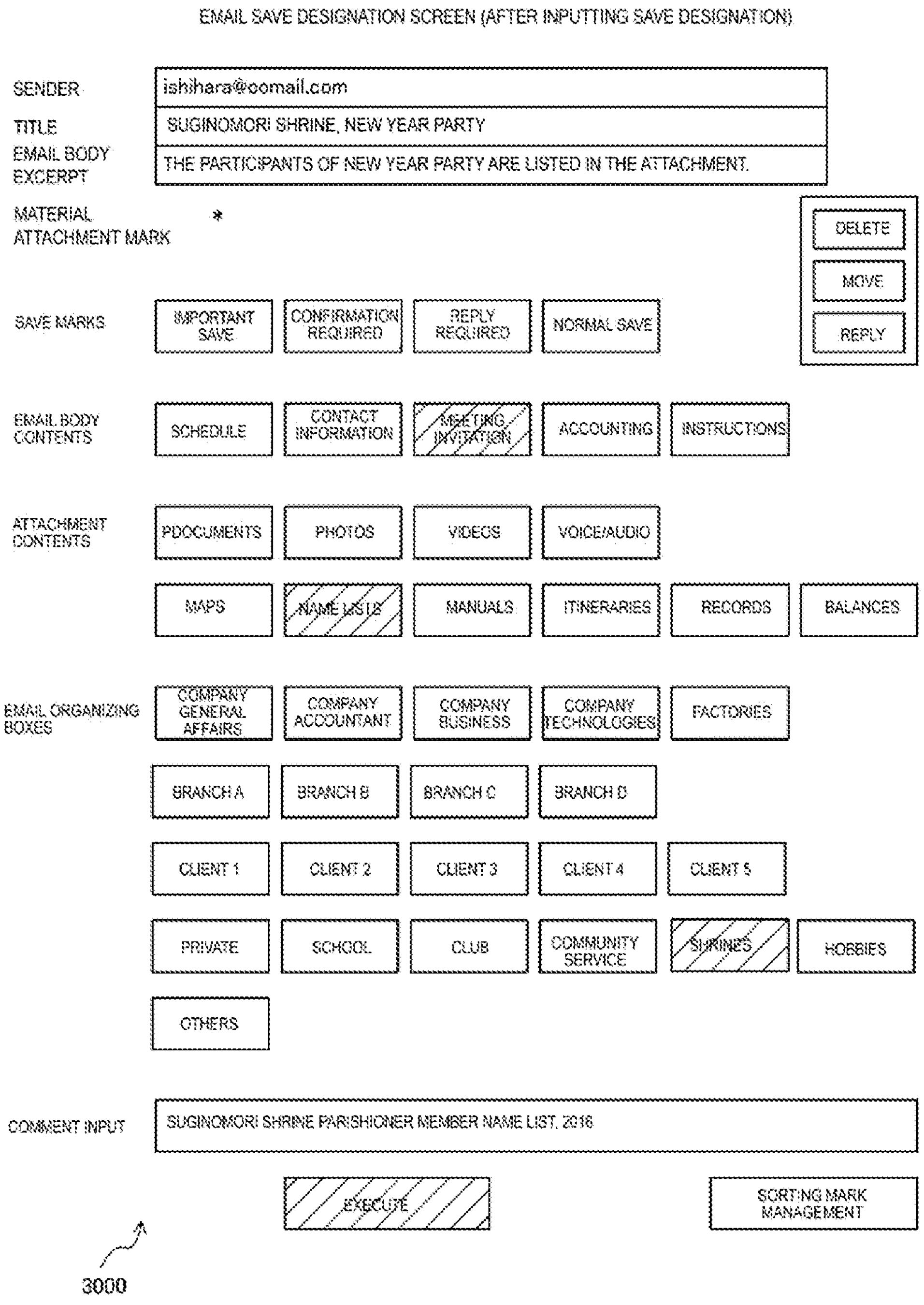
FIG. 42 is a diagram illustrating an example of an email save designation screen (after inputting a save designation).

FIG. 41 and FIG. 42 are each a diagram illustrating a third concrete example of selecting the sorting marks on the email save designation screen 3000.

The examples illustrated in FIG. 41 and FIG. 42 are examples of processing an email having content about a meeting invitation to a shrine, and data of a member name list is attached to the email. As illustrated in FIG. 42, the sorting mark "meeting invitation" is selected as the "email body contents", the sorting mark "name lists" is selected as the "attachment contents", the sorting mark "shrines" is selected as the "email organizing boxes", and then, the "execute" button is operated.

With this operation, in the email file-and-refer table as illustrated in FIG. 31, "R000003" is stored in the email identification information, "1-3, 3-6, 4-20" is stored in the sorting mark identification information, "1" is stored in the presence or absence of attachments, "0" is stored in the presence or absence of links, and "Suginomori shrine parishioner member name list, 2016" is stored in the comment.

The sorting mark identification information "1-3" is the "meeting invitation" in the "email body contents", the sorting mark identification information "3-6" is the "name lists" in the "attachment contents", and the sorting mark identification information "4-20" is the "shrines" in the "email organizing boxes". The presence or absence of attachments "1" means that an attached file exists. The presence or absence of links "0" means that the email body does not include link information.

Note that, in the examples illustrated in FIG. 41 and FIG. 42, any of the sorting marks belonging to the "save marks" is not selected.

Concrete Example 4 of Email Save Designation Screen

Figure 44:
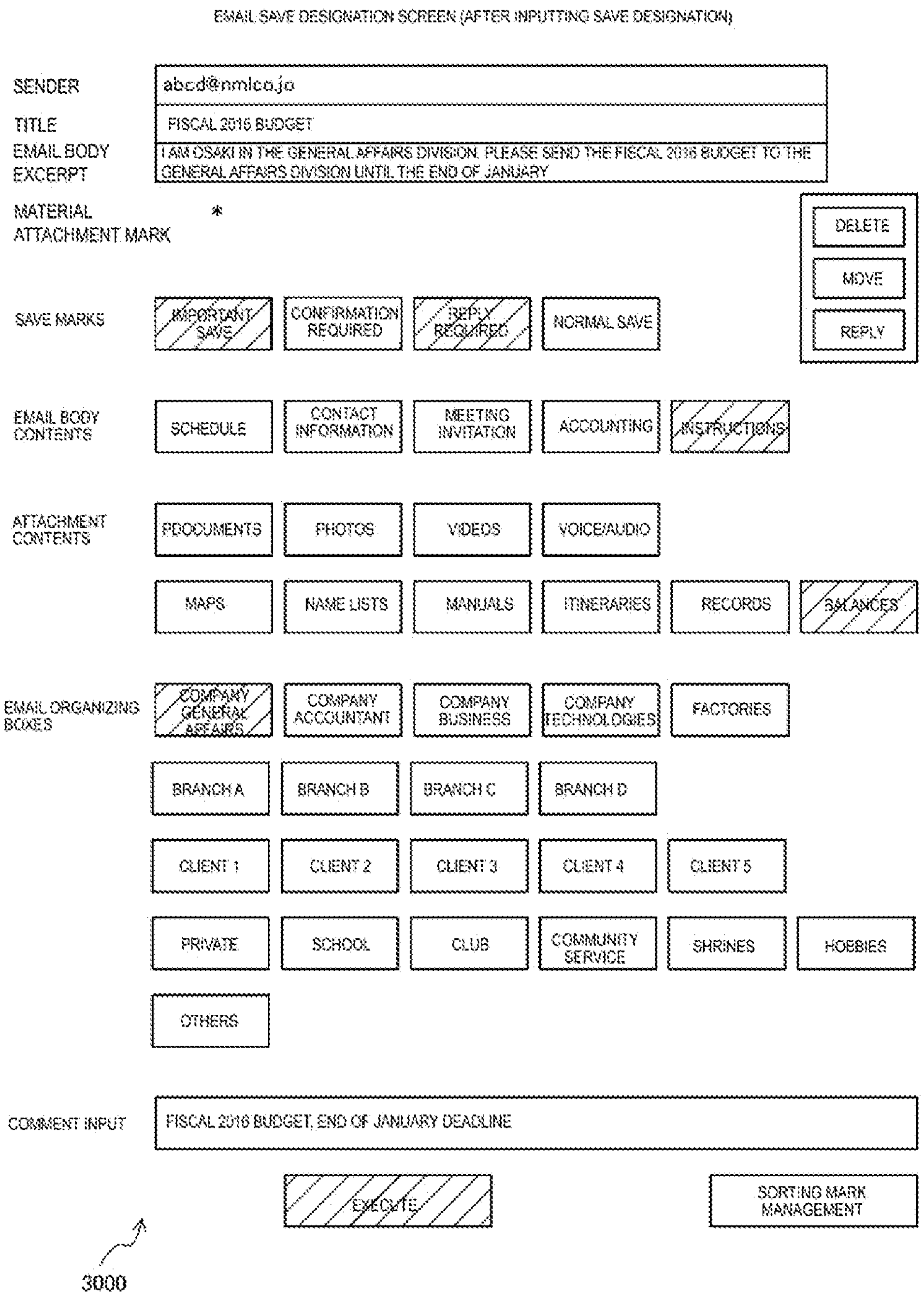
FIG. 44 is a diagram illustrating an example of an email save designation screen (after inputting a save designation).

FIG. 43 and FIG. 44 are each a diagram illustrating a fourth concrete example of selecting the sorting marks on the email save designation screen 3000.

The examples illustrated in FIG. 43 and FIG. 44 are examples of processing an email having content of instructions about a company general affair having a high degree of importance, and the email requires to be replied, and data about a balance is attached to the email. As illustrated in FIG. 44, the sorting marks "important save" and "reply required" are selected as the "save marks", the sorting mark "instructions" is selected as the "email body contents", the sorting mark "balances" is selected as the "attachment contents", and the sorting mark "company general affairs" is selected as the "email organizing boxes", and then, the "execute" button is operated.

With this operation, in the email file-and-refer table as illustrated in FIG. 31, "R000004" is stored in the email identification information, "1-1, 1-3, 2-5, 3-10, 4-1" is stored in the sorting mark identification information, "1" is stored in the presence or absence of attachments, "0" is stored in the presence or absence of links, and "Fiscal 2016 budget, end of January deadline" is stored in the comment.

The sorting mark identification information "1-1" is the "important save" in the "save marks", the sorting mark identification information "1-3" is the "reply required" in the "save marks", the sorting mark identification information "2-5" is the "instructions" in the "email body contents", the sorting mark identification information "3-10" is the "balances" in the "attachment contents", and the sorting mark identification information "4-1" is the "company general affairs" in the "email organizing boxes". The presence or absence of attachments "1" means that an attached file exists. The presence or absence of links "0" means that the email body does not include link information.

In the example illustrated in FIG. 44, two marks, that is, the "important save" and the "reply required" are selected as the sorting marks belonging to the "save marks".

Concrete Example 5 of Email Save Designation Screen

Figure 45:
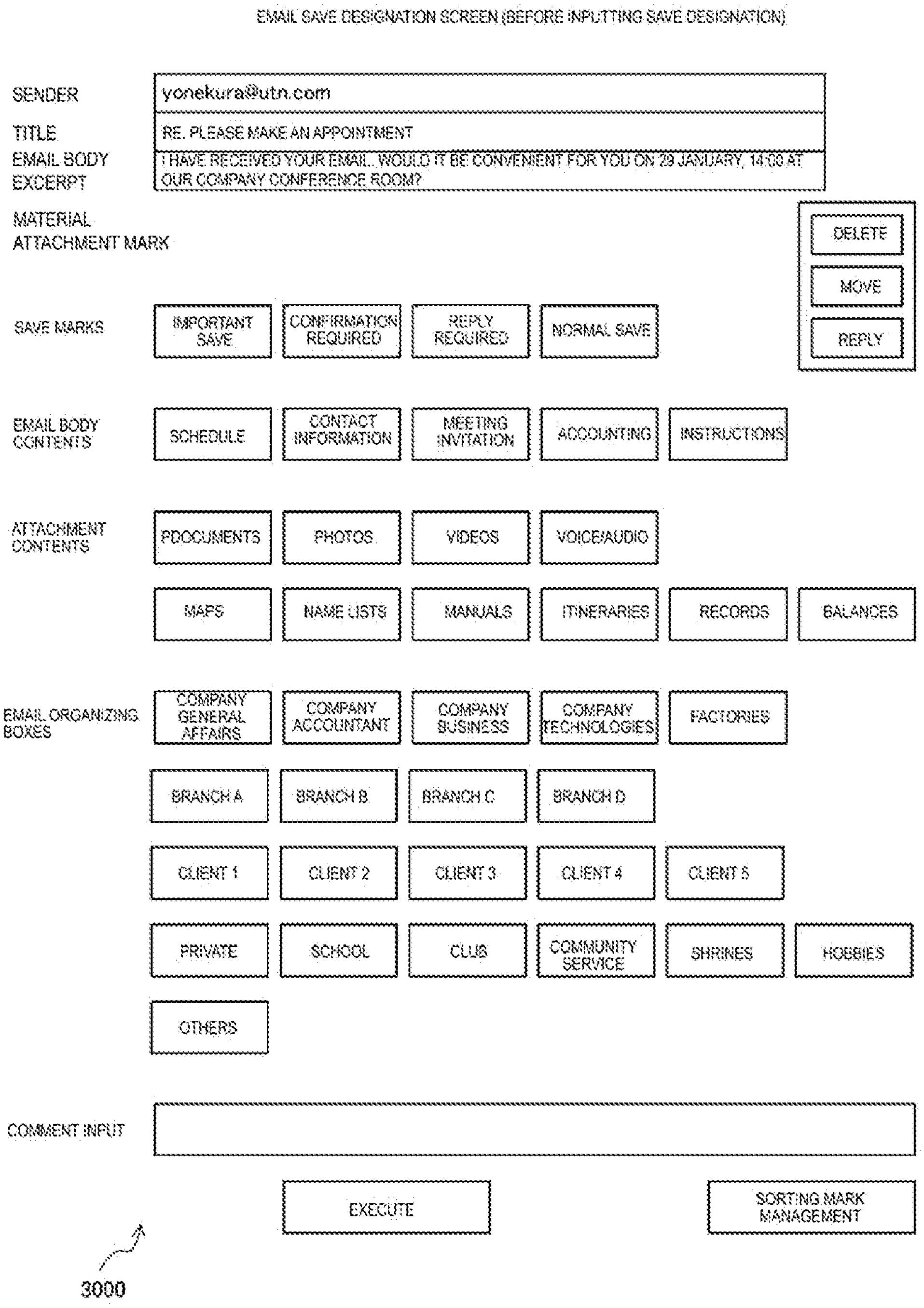
FIG. 45 is a diagram illustrating an example of an email save designation screen (before inputting a save designation).

FIG. 45 and FIG. 46 are each a diagram illustrating a fifth concrete example of selecting the sorting marks on the email save designation screen 3000.

The examples illustrated in FIG. 45 and FIG. 46 are examples of processing an email containing content of instructions about schedule coordination with a client having a high degree of importance, and the like. Contact information of the client is described in the email body. As illustrated in FIG. 46, the sorting mark "important save" is selected as the "save marks", the sorting marks "schedule" and "contact information" are selected as the "email body contents", the sorting mark "client 3" is selected as the "email organizing boxes", and then, the "execute" button is operated.

With this operation, in the email file-and-refer table as illustrated in FIG. 31, "R000005" is stored in the email identification information, "1-1, 2-1, 2-2, 4-13" is stored in the sorting mark identification information, "0" is stored in the presence or absence of attachments, "0" is stored in the presence or absence of links, and "Yonekura industry, appointment on January 29th, at 14:00, president Yonekura's mobile" is stored in the comment.

The sorting mark identification information "1-1" is the "important save" in the "save marks", the sorting mark identification information "2-1" is the "schedule" in the "email body contents", the sorting mark identification information "2-2" is the "contact information" in the "email body contents", and the sorting mark identification information "4-13" is the "client 3" in the "email organizing boxes". The presence or absence of attachments "0" means that an attached file does not exist. The presence or absence of links "0" means that the email body does not include link information.

Note that, in the example illustrated in FIG. 46, the "important save" is selected as the sorting mark belonging to "save marks".

Concrete Example 6 of Email Save Designation Screen

FIG. 47 and FIG. 48 are each a diagram illustrating a sixth concrete example of selecting the sorting marks on the email save designation screen 3000.

The examples illustrated in FIG. 47 and FIG. 48 are examples of processing an email containing content about a community service, and record data is attached to the email. As illustrated in FIG. 48, the sorting mark "records" is selected as the "attachment contents", the sorting mark "community service" is selected as the "email organizing boxes", and then the "execute" button is operated.

With this operation, in the email file-and-refer table as illustrated in FIG. 31, "R000006" is stored in the email identification information, "3-9, 4-19" is stored in the sorting mark identification information, "1" is stored in the presence or absence of attachments, "0" is stored in the presence or absence of links, and "Community association, amount of purchased flower plants in April, 2016" is stored in the comment.

The sorting mark identification information "3-9" is the "records" in the "attachment contents", and the sorting mark identification information "4-19" is the "community service" in the "email organizing boxes". The presence or absence of attachments "1" means that an attached file exists. The presence or absence of links "0" means that the email body does not include link information.

Note that, in the examples illustrated in FIG. 47 and FIG. 48, any of the sorting marks belonging to the "save marks" is not selected.

Concrete Example 7 of Email Save Designation Screen

Figure 50:
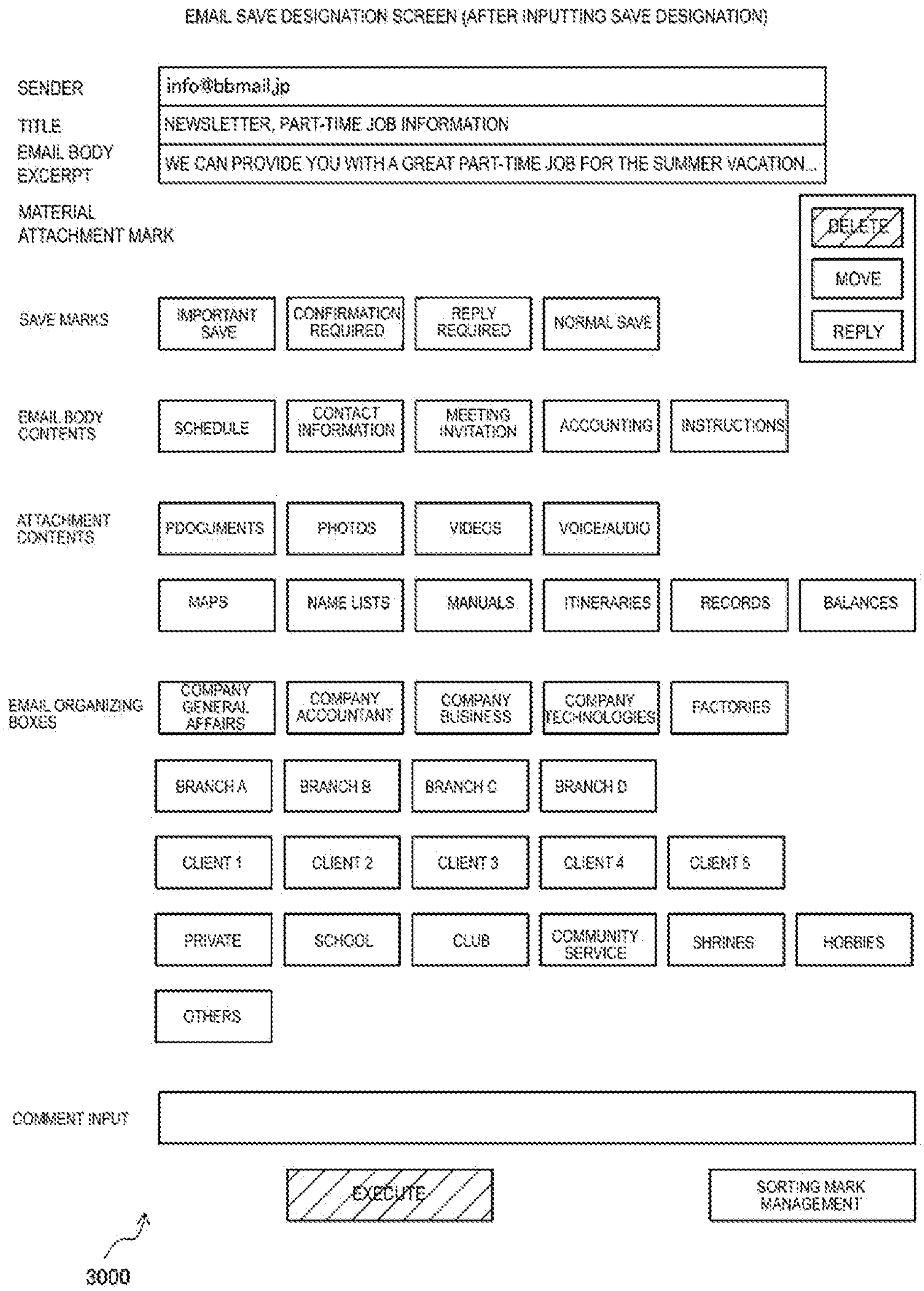
FIG. 50 is a diagram illustrating an example of an email save designation screen (after inputting a save designation).

FIG. 49 and FIG. 50 are each a diagram illustrating a seventh concrete example of selecting the sorting marks on the email save designation screen 3000.

The examples illustrated in FIG. 49 and FIG. 50 are examples of deleting an email having content about part-time job information which is determined as a junk email. The "delete" button described above can be operated to immediately delete the email.

Even in the case of deleting the email in this way, in the email file-and-refer table as illustrated in FIG. 31, only "R000007" is stored in the email identification information. By using the email file-and-refer table, the email being deleted can be remained as a history.

Concrete Example 8 of Email Save Designation Screen

FIG. 51 and FIG. 52 are each a diagram illustrating an eighth concrete example of selecting the sorting marks on the email save designation screen 3000.

The examples illustrated in FIG. 51 and FIG. 52 are examples of processing an email containing content about a private matter, and photo data is attached to the email. As illustrated in FIG. 52, the "photos" is selected as the "attachment contents", the sorting mark "private" is selected as the "email organizing boxes", and then, the "execute" button is operated.

With this operation, in the email file-and-refer table as illustrated in FIG. 31, "R000008" is stored in the email identification information, "3-2, 4-16" is stored in the sorting mark identification information, "1" is stored in the presence or absence of attachments, and "0" is stored in the presence or absence of links. In a case of this example, the comment is not input and the text information is not stored in the email file-and-refer table.

The sorting mark identification information "3-2" is the "photos" in the "attachment contents", and the sorting mark identification information "4-16" is the "private" in the "email organizing boxes". The presence or absence of attachments "1" means that an attached file exists. The presence or absence of links "0" means that the email body does not include link information.

Note that, in the examples illustrated in FIG. 51 and FIG. 52, any of the sorting marks belonging to the "save marks" is not selected.

Concrete Example 9 of Email Save Designation Screen

FIG. 53 and FIG. 54 are each a diagram illustrating a ninth concrete example of selecting the sorting marks on the email save designation screen 3000.

The examples illustrated in FIG. 53 and FIG. 54 are examples of processing an email having content about a hobby, and video data is attached to the email. As illustrated in FIG. 54, the "videos" is selected as the "attachment contents", the "videos" is selected as the "email organizing boxes", and then, the "execute" button is operated.

With this operation, in the email file-and-refer table as illustrated in FIG. 31, "R000009" is stored in the email identification information, "3-3, 4-21" is stored in the sorting mark identification information, "1" is stored in the presence or absence of attachments, "0" is stored in the presence or absence of links, and "Forest volunteer association, demonstration of handling a chain saw [Mr. Kikuchi]" is stored in the comment.

The sorting mark identification information "3-3" is the "videos" in the "attachment contents", and the sorting mark identification information "4-21" is the "hobby" in the "email organizing boxes". The presence or absence of attachments "1" means that an attached file exists. The presence or absence of links "0" means that the email body does not include link information.

Note that, in the examples illustrated in FIG. 53 and FIG. 54, any of the sorting marks belonging to the "save marks" is not selected.

<<Concrete Examples when Sending Email>>

<Sent Email Body Screen>

Figure 55:
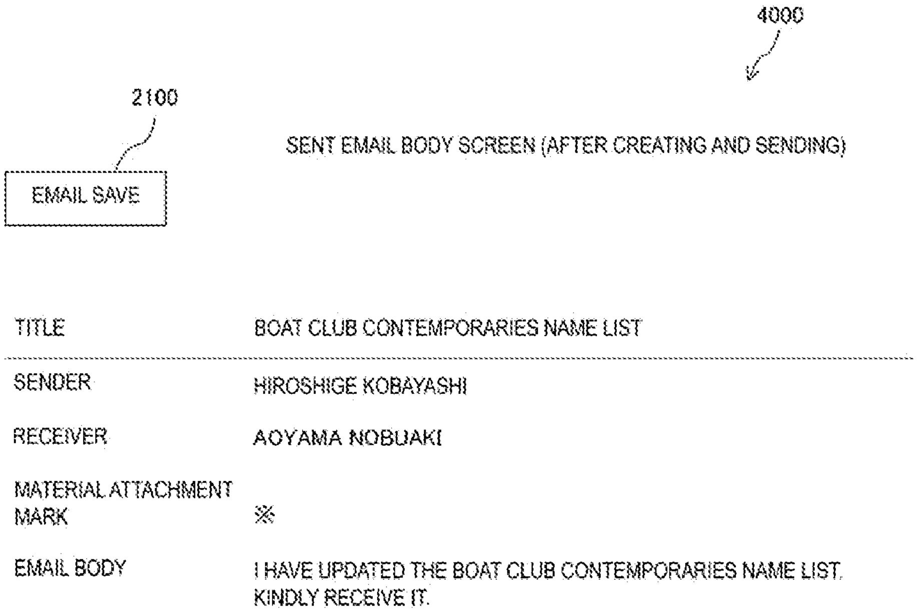
FIG. 55 is a diagram illustrating an example of a sent email body screen (after creating and sending).
Figure 56:
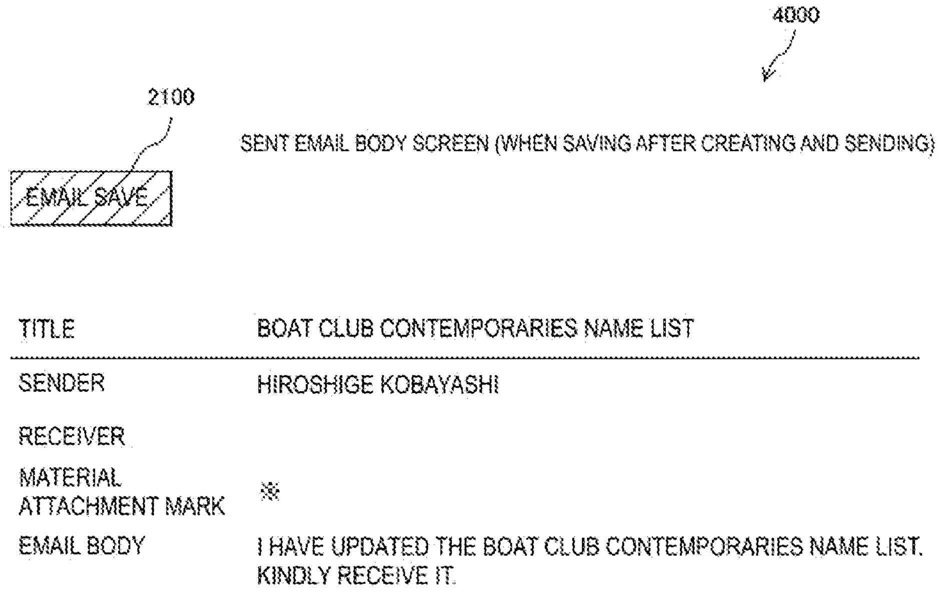
FIG. 56 is a diagram illustrating an example of a sent email body screen (when saving after creating and sending).

FIG. 55 and FIG. 56 are each a diagram illustrating an example of the sent email body screen 4000. FIG. 55 is a diagram illustrating a state of the sent email body screen 4000 after creating and sending. FIG. 56 is a diagram illustrating a state of the sent email body screen 4000 when saving after creating and sending. The sent email body screen 4000 is displayed by selecting one email summary display when the sent email list screen (not illustrated) is displayed, similar to the received email list screen 1000.

As illustrated in FIG. 55, the sent email body screen 4000 displays "title", "sender", "receiver", "material attachment mark", and "email body". The sent email body screen 4000 has the same configuration as the received email body screen 2000.

The "save email" button 2100 is displayed on the upper left portion of the sent email body screen 4000, similar to the received email body screen 2000. Operating the "save email" button 2100 by the user changes the indication color of the "save email" button 2100 as in FIG. 56. In FIG. 56, the change of the indication color is represented by hatched lines. The change of the indication color can clearly indicate to the user that the "save email" button 2100 is operated. After the change of the indication color of the "save email" button 2100, the email save designation screen 3000 illustrated in FIG. 57 described later is displayed.

Concrete Example 10

FIG. 57 and FIG. 58 are each a diagram illustrating a concrete example 10 of selecting the sorting marks on the email save designation screen 3000.

The email save designation screen 3000 illustrated in FIG. 57 is displayed by the user operating the "save email" button 2100 illustrated in FIG. 56. As illustrated in the email save designation screen 3000, the operation on the email save designation screen 3000 enables the sorting mark or the comment to be saved also in a case of sending the email similar to the case of receiving the email.

The examples illustrated in FIG. 57 and FIG. 58 are examples of processing an email containing content about club activities, and data of a member name list is attached to the email. As illustrated in FIG. 58, the sorting mark "name lists" is selected as the "attachment contents", the sorting mark "club" is selected as the "email organizing boxes", and then, the "execute" button is operated.

With this operation, in the email file-and-refer table as illustrated in FIG. 31, "S000001" is stored in the email identification information, "3-6, 4-18" is stored in the sorting mark identification information, "1" is stored in the presence or absence of attachments, "0" is stored in the presence or absence of links, and "Boat club contemporaries name list, 2016" is stored in the comment.

A head "S" of "S000001" as the email identification information represents a sent email. The rest "000001" of the email identification information "S000001" is a number generated as a serial number. The email identification information may be generated based on the date and time when the email was sent, instead of the serial number. The email identification information may be information distinguishable from other emails.

The sorting mark identification information "3-6" is the "name lists" in the "attachment contents", and the sorting mark identification information "4-18" is the "club" in the "email organizing boxes". The presence or absence of attachments "1" means that an attached file exists. The presence or absence of links "0" means that the email body does not include link information.

In the examples illustrated in FIG. 57 and FIG. 58, any of the sorting marks belonging to the "save marks" is not selected.

<<Concrete Examples of Email Search>>

FIG. 62 and FIG. 63 are each a diagram illustrating an example of the email search designation screen 5000. The email search designation screen 5000 illustrate in FIG. 62 and FIG. 63 is displayed by operating the "email search" button 1200 which is displayed on upper left portion of the received email list screen 1000 illustrated in FIG. 34.

The email search designation screen 5000 has a configuration similar to the email save designation screen 3000. Note that, differently from the email save designation screen 3000, the "sender", the "date and time", the "title", the "email body excerpt" and the "material attachment mark" are not displayed. In the present embodiment, these pieces of information are not the targets to be searched, but the sorting mark is the target to be searched. The email operating menu for deleting, moving, and replying to the email is not displayed also. In this way, the email search designation screen 5000 is a screen for searching for the email by using the sorting marks.

The major classification (higher hierarchy) is displayed along the up-down direction of the email search designation screen 5000. There are four kinds of the sorting marks in the major classification, that is, save marks, email body contents, attachment contents, and email organizing boxes. The minor classification (lower hierarchy) is displayed along the right-left direction of the email search designation screen 5000. The sorting marks in the minor classification are defined correspondingly to each of the sorting marks in the major classification.

The sorting marks belonging under the save marks includes four kinds, that is, important save, confirmation required, reply required, and normal save. The sorting marks belonging under the email body contents include five kinds, that is, schedule, contact information, meeting invitations, accounting, and instructions. The sorting marks belonging under the attachment contents include ten kinds, that is, documents, photos, videos, voice/audio, maps, name lists, manuals, itineraries, records, and balances. Furthermore, the sorting marks belonging under the email organizing boxes include 22 kinds, that is, company general affairs, company accountant, company business, company technologies, factories, branch A, branch B, branch C, branch D, client 1, client 2, client 3, client 4, client 5, private, school, club, community service, shrines, hobbies, and others.

As illustrated in the email search designation screen 5000, the direction in which the sorting marks in the major classification are displayed is differentiated from the direction in which the sorting marks in the minor classification are displayed, such that the sorting marks in the hierarchical relationship can be displayed to be distributed to present a table or the like. It is possible for the user to appropriately view the sorting marks by visualizing the hierarchies for the sorting marks and displaying the plural sorting marks to be distributed, thus the designating operation of the sorting marks is also easily and conveniently performed.

These sorting marks can be designated by the operation of the user (see step T2006 in FIG. 20 and step T2104 in FIG. 21). The sorting mark can be designated by a click operation using a mouse, a tap operation using a finger, and the like.

The sorting marks belonging under the save marks include four kinds, that is, important save, confirmation required, reply required, and normal save in the email search designation screen 5000 also similar to the email save designation screen 3000. Among these, three sorting marks, the important save, the confirmation required, and the normal save are important save→confirmation required→normal save in descending order of a degree of importance. These three sorting marks are the sorting marks set as the mutual link ban. The sorting mark, reply required, which is the sorting mark selected if the user determines that the email requires a reply, is not set as the mutual link ban and can be mutually selected together with other sorting marks such as the important save, the confirmation required, and the normal save. For example, the important save and the reply required can be mutually selected.

The setting as the mutual link ban is stored in the selected state of the selection setting table in FIG. 29. The user can adequately set the mutual link ban in the selected state.

At a time when the "email search" button 1200 displayed on the upper left portion of the received email list screen 1000 illustrated in FIG. 34 is operated to display the email search designation screen 5000, backgrounds of the all sorting marks are indicated in a white color that is a default indication color. Indicating in a white color represents the unselected state. In other words, the user can view that the any sorting mark is in a state capable of being designated and selected.

The background of the sorting mark which is operated by the user to be designated and set to the selected state is indicated in a blue color. As described above, the sorting mark set as the mutual link ban is exclusively selected. Therefore, if one of the sorting marks set as the mutual link ban is designated to be set to the selected state, the background of the sorting mark is indicated in a blue color. Furthermore, the backgrounds of the rest of the sorting marks are indicated in a gray color. Indicating the background of the sorting mark in a gray color allows the user to view the non-selection.

If the user designates the sorting mark which is set to non-selection, the state of the non-selection is maintained (at steps T2110 and T2112 in FIG. 21). If the user designates the sorting mark which is set to non-selection, the sorting mark may be directly set to the selected state (where the background is indicated in a blue color) and other sorting marks may be immediately set to the non-selection (where the background is indicated in a gray color). Even in this way, the sorting mark set as the mutual link ban can be maintained to be exclusively selected.

As described above, the selection information in the search selection setting table includes four kinds, that is, the selected state, the unselected state, non-selection, and non-use. Non-use is a state of a sorting mark having not been used for selection before. In the email search designation screen 5000, even if only one non-used sorting mark exists, the non-used sorting mark is displayed in a color different from a color of the selectable sorting mark in the email search designation screen 5000 in order to indicate that the non-used sorting mark is not the target to be searched. For example, the background of the non-used sorting mark can be indicated in a gray color similar to the sorting mark set the non-selection. Furthermore, in the case where the non-used sorting mark exists, the non-used sorting mark itself may not be displayed on the email search designation screen 5000. Note that the sorting mark which is used for only one email is not the non-use one, and is surely displayed on the email search designation screen 5000 in a normal aspect.

Any of the sorting marks belonging under the save marks, email body contents, attachment contents, and email organizing boxes on the email search designation screen 5000 can be also selected by the user similarly to the email save designation screen 3000.

An "execute" button is displayed on the lower portion of the email search designation screen 5000. The "execute" button is an operation button to start searching (at step T2016 in FIG. 20) after the completion of selecting the sorting mark on the email search designation screen 5000 (at step T2012 in FIG. 20). The "execute" button can be operated by clicking with a mouse or tapping with a finger a region on which the "execute" button is displayed.

By starting the searching, the all emails stored in the email file-and-refer table illustrated in FIG. 31 are searched. Therefore, not only the received emails but also the sent emails can be searched.

The configuration of the email search designation screen 5000 is not limited to this example and, for example, a "clear" button may be provided which is operated to initialize all selected search conditions. A search target button may be provided which is used to set all emails, or either the received email or the sent email as search comparison.

FIG. 63 is a diagram illustrating a concrete example of selecting the sorting mark on the email search designation screen 5000 to decide the search condition. The email search designation screen 5000 in FIG. 63 illustrates an example in which the sorting mark "important save" in the "save marks" is selected and the "execute" button is operated.

The user selects a desired sorting mark on the email search designation screen 5000 and operates the "execute" button to display the search result screen 6000 illustrating a search result. As illustrated in FIG. 63, if the sorting mark "important save" is selected on the email search designation screen 5000 and the "execute" button is operated, the search result screen 6000 as illustrated in FIG. 64 is displayed.

Concrete Example 1 of Search Result Screen 6000

FIG. 64 is an example of the search result screen 6000 displayed in the case where the sorting mark "important save" is selected on the email search designation screen 5000 and the "execute" button is operated, as described above.

The search result screen 6000 in FIG. 64 displays the emails which are hit in the search under the search condition in FIG. 63. The search result screen 6000 displays "attachment contents", "sender", "comment field", "title", "email body excerpt" and "*material attachment mark". The search result screen 6000 displays the items similar to the items in the received email list screen 1000 in FIG. 34.

The sorting mark "important save" that is the search condition is displayed on the upper left portion of the search result screen 6000, which allows the user to immediately view the search condition. By executing searching, the emails linked to the sorting mark "important save" are displayed on the search result screen 6000.

The search process extracts the all emails linked to the sorting mark "important save". In other words, every email for which the sorting mark identification information 1-1 is stored in the email file-and-refer table shown in FIG. 31 is extracted. Any email linked to the sorting mark "important save" is extracted even if it is mutually linked to other sorting marks. As is displayed on the search result screen 6000 in FIG. 64, extracted by searching are two emails R000004 (in the example illustrated in FIG. 43 and FIG. 44) and R000005 (in the example illustrated in FIG. 45 and FIG. 46) of the email identification information in the email file-and-refer table in FIG. 31.

Note that the search may be made so that the email linked to only the selected sorting mark "important save" is extracted. For example, the search condition may be configured to include exact match or partial match for the sorting mark.

Furthermore, if plural sorting marks are selected, various operators such as AND or OR may be inserted between plural sorting marks to configure the search condition.

For example, in a case where two sorting marks, the sorting mark "important save" in the save marks and the sorting mark "schedule" in the email body contents, are selected, if the search is made under the search condition of the sorting mark "important save" AND the sorting mark "schedule", the email only including both the sorting marks is extracted, that is, only the email R000005 of the email identification information in the email file-and-refer table in FIG. 31 (in the example illustrated in FIG. 45 and FIG. 46) is extracted. Moreover, if the search is made under the search condition of the sorting mark "important save" OR the sorting mark "schedule", either of the sorting marks may be included, and three emails are extracted, that is, R000001 (in the example illustrated in FIG. 37 and FIG. 38), R000004 (in the example illustrated in FIG. 43 and FIG. 44), and R000005 (in the example illustrated in FIG. 45 and FIG. 46) of the email identification information in the email file-and-refer table in FIG. 31.

Concrete Example 2 of Search Result Screen 6000

FIG. 65 is an example of the search result screen 6000 displayed in a case where the sorting mark "contact information" in the "email body contents" is selected on the email search designation screen 5000 and the "execute" button is operated.

The search result screen 6000 displays the emails lined to the sorting mark "contact information" in the "email body contents". The sorting mark "contact information" is displayed on the upper left portion of the search result screen 6000.

Two emails are extracted as the email linked to the sorting mark "contact information" in the "email body contents", that is, R000002 (in the example illustrated in FIG. 39 and FIG. 40) and R000005 (in the example illustrated in FIG. 45 and FIG. 46) of the email identification information in the email file-and-refer table in FIG. 31.

Concrete Example 3 of Search Result Screen 6000

FIG. 66 is an example of the search result screen 6000 displayed in a case where the sorting mark "name lists" in the "attachment contents" is selected on the email search designation screen 5000 and the "execute" button is operated.

The search result screen 6000 displays the emails linked to the sorting mark "name lists" in the "attachment contents". The sorting mark "name lists" is displayed on the upper left portion of the search result screen 6000.

Two emails are extracted as the email linked to the sorting mark "name lists" in the "attachment contents", that is, R000003 (in the example illustrated in FIG. 41 and FIG. 42) and S000001 (in the example illustrated in FIG. 57 and FIG. 58) of the email identification information in the email file-and-refer table in FIG. 31.

All the emails stored in the email file-and-refer table are searched to extract not only the received email but also the sent email (the email identification information S000001).

Concrete Example 4 of Search Result Screen 6000

Figure 67:
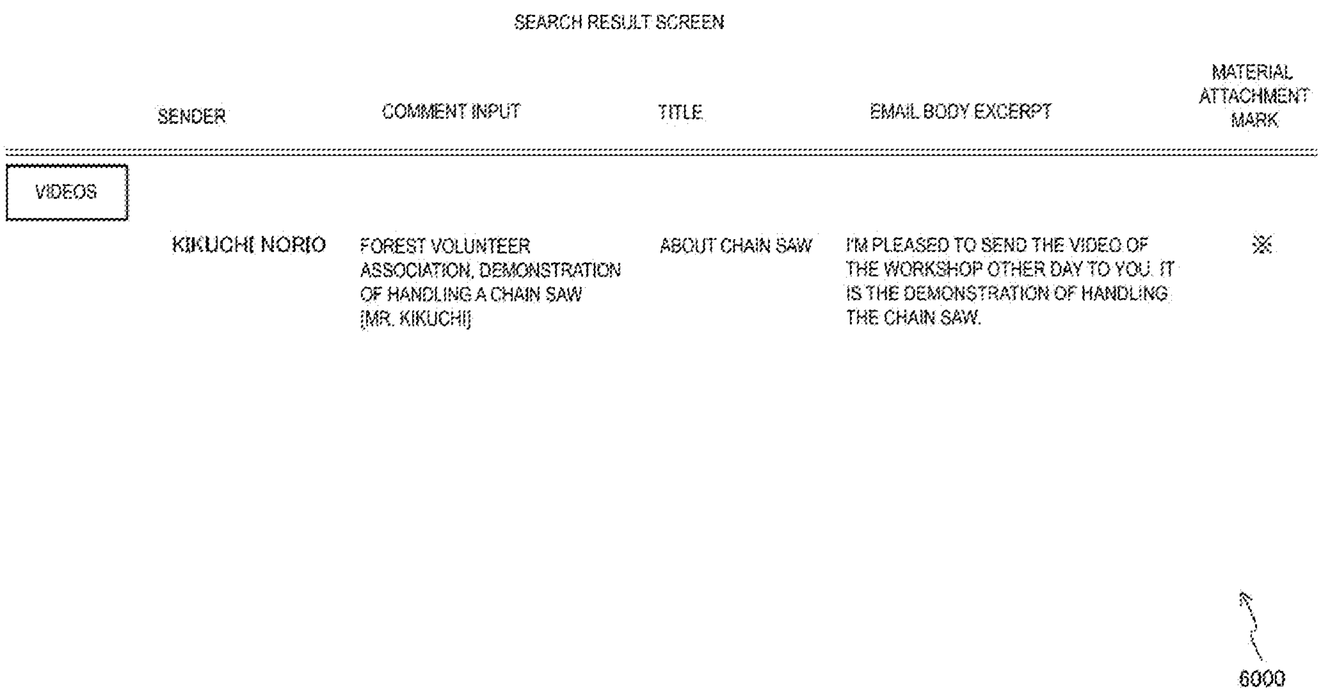
FIG. 67 is a diagram illustrating an example of the search result screen.

FIG. 67 is an example of the search result screen 6000 displayed in a case where the sorting mark "videos" in the "attachment contents" is selected on the email search designation screen 5000 and the "execute" button is operated.

The search result screen 6000 displays the emails linked to the sorting mark "videos" in the "attachment contents". The sorting mark "videos" is displayed on the upper left portion of the search result screen 6000.

An email is extracted as the email linked to the sorting mark "videos" in the "attachment contents", that is, R000009 (in the example illustrated in FIG. 53 and FIG. 54) of the email identification information in the email file-and-refer table in FIG. 31.

MODIFICATION EXAMPLES

Modification Example 1

In the present embodiment, the sorting marks can be configured to belong to two or more respective hierarchies, as described above. In the case of saving the sorting marks or the like, or in the case of searching using the sorting mark, not only the sorting marks belonging to two respective hierarchies such as the major classification and the minor classification but also the sorting marks belonging to three or more respective hierarchies may be selected to save or search the sorting mark. For example, a sorting mark belonging to the major classification, a sorting mark belonging to the minor classification, and a sorting mark belonging to the minimum classification can be selected to save or search the sorting mark. The content of the hierarchy can be adequately decided by the user to be arbitrarily classified and defined without being limited to a broader concept or a narrower concept.

Modification Example 2

In a case where the "execute" button is operated on the email save designation screen 3000 to save the sorting mark or the like, the corresponding email may not be cleared from the sent email list screen (not illustrated) even if the email is operated to be cleared.

Modification Example 3

In the case where the "execute" button is operated on the email save designation screen 3000 to save the sorting mark or the like, the corresponding email may not be cleared from the received email list screen 1000 even if the email is operated to be cleared.

Modification Example 4

The number of the comment input regions is not limited to only one, and a plurality of regions may be provided. For example, a comment add button may be provided on the email save designation screen 3000 to add a new comment input region.

Modification Example 5

Furthermore, the search process may search using not only the sorting mark but also the comment. For example, the text information such as the keywords the user can remember can be input to search for the comment. The search can be made using both the sorting mark and the comment to more appropriately extract a desired email from buried emails.

Modification Example 6

The date and time when the sorting mark was saved may be configured to be stored. The email can be searched for depending on the date and time when the work was done as a remembrance for the user.

Modification Example 7

The sorting mark, the comment, the presence or absence of attached files, and the presence or absence of links (that is, the email file-and-refer information) may not be saved in the user terminal device 110, and may be configured to be saved in a server (cloud) such as the email file-and-refer program provision server 300 via a network without limitation. In the case of such a configuration, if the "search execute" button is operated on the email search designation screen 5000, the search condition is sent to the email file-and-refer program provision server 300, and the email file-and-refer program provision server 300 sends the email identification information satisfying the search condition to the user terminal device 110.

Modification Example 8

An example is described in which the sorting mark, the comment, the presence or absence of attached files, and the presence or absence of links (the is the email file-and-refer information) are saved separately from the email, but these pieces of the email file-and-refer information may be saved together with the email. The email file-and-refer information can be managed together with the email to back up the emails as well as back up the email file-and-refer information.

REFERENCE SIGNS LIST

100 Network
110 User terminal device
200 Email server
300 Email file-and-refer program provision server

The invention claimed is:

1. A terminal device that executes an email file-and-refer program, wherein the terminal device comprises a sending and receiving means to send or receive emails each of which includes communication information, a storage means to store the communication information in the emails, a display means to display the communication information in the emails, an operation means through which a user input operations, and a control means to execute the following processes:

(1-1) a selection process to select either a link process or an email search process based on an operation of the operation unit;

(1-2) when the link process is selected by the process (1-1), (1-2-1) a display process to display first sorting marks, which are aligned along a first direction, and one or more second sorting marks, which are aligned along a second direction that is different from the first direction in order to sort the received or sent emails, wherein all the first sorting marks belong to a first hierarchy, and each of which is labeled with one item for ma Or classification, making at least one line in the first direction, and all the second sorting marks belong to a second hierarchy, and each of which is labeled with one item for minor classification, relating to one of the first sorting marks, which is defined as a parent first sorting mark, such that one or more the second sorting marks, which are related to the parent first sorting mark, are aligned from the parent first sorting mark extending along the second direction, making at least one line in the second direction, and the first sorting marks along the first direction and the second sorting marks along the second direction are displayed on the display unit in a matrix format, and (1-2-2) a link process to link one or more the second sorting marks, which are selected by an operation of the operation means operated b the user, to one of the emails, which is defined as a linked email, the selected second sorting marks linked to the linked email being stored in the storage means, and (1-3) when the email search process is selected by the process (1-1), (1-3-1) a display process to display the first and second sorting marks in the matrix format, (1-3-2) a sorting mark designating process to designate one or more the second sorting marks displayed by the process (1-3-1) based on an operation of the operation means operated by the user, these second sorting marks being defined as designated second sorting marks, and (1-3-3) an extracting process to extract one or more the emails linked to the designated second sorting marks (1-3-2), these extracted emails being displayed on the display means.

2. The terminal device according to claim 1 further comprising:

(2-1) a sample sorting mark display process to display predetermined sample sorting marks to display dividing into the first and second hierarchies, wherein the sorting mark display process displays the sample sorting marks belonging to the first hierarchy along the first direction and the sample sorting marks belonging to the second hierarchy along the second direction so as to display the sample sorting marks belonging to the first hierarchy and the sample sorting marks belonging to the second hierarchy on the display unit in a matrix format, and (2-2) a sorting mark edit process to edit the sample sorting marks based on an operation of the operation unit so that an intention of the user may be reflected by changing or deleting of the sample sorting marks, or adding a new sorting mark.

3. The terminal device according to claim 1, wherein one of the first selecting marks is related to input a text by the user, being defined as a text sorting mark, and the second selecting mark, which is related to the text sorting mark, has a blank area within which the user inputs text information through an operation of the operation means, and the process (1-2) further comprises:

(1-2-3) a text information input process to input the text information based on the operation of the operation unit, and (1-2-4) a link process to link the text information input by the process (1-2-3) to the linked email.

4. The terminal device according to claim 1, wherein the process (1-2-2) comprises;

(1-2-2-1) a process to mutually link between the second sorting marks belonging to one of the second hierarchies, and (1-2-2-2) a process to ban a mutual link between the second sorting marks belonging to the other second hierarchies than the one of the second hierarchies, and the process (1-3-2) comprises;

(1-3-2-1) a process to mutually link between the second sorting marks belonging to the one of the second hierarchies, and (1-3-2-2) a process to ban a mutual link between the second sorting marks belonging to the other second hierarchies than the one of the second hierarchies.

5. The terminal device according to claim 4, wherein the process (1-2-2) comprises;

(3-1) a process to distinguish if the mark designated by a user from the sorting marks belonging to the second hierarchies is in a selected state indicating that it has been selected by the user, (3-2) a process to distinguish if the mark designated by the user is included in the mutual link banned sorting marks when it is distinguished that the mark is not in the selected state by the process (3-1), (3-3) a process to set a non-selection to the other mutual link banned sorting marks than the mark designated by the user from the marks set as mutual link ban when it is distinguished that the mark is included in the mutual link banned sorting marks by the process (3-2), and (3-4) a process to display mutual link ban to the other mutual link banned sorting marks set the non-selection by the process (3-3).

6. The terminal device according to claim 1, wherein the first direction is vertical with respect to the display means, and the second direction is horizontal with respect to the display means.

7. The terminal device according to claim 1, wherein other second sorting marks are related to one or more the first sorting marks such that other parent first sorting marks are present, each of the other parent first sorting marks has one or more the other second sorting marks that are aligned along the second direction.

8. The terminal device according to claim 1, wherein the parent first sorting marks are three or more, and each of the parent first sorting marks has three or more the second sorting marks such that the matrix format is 3×3 or larger.

9. The terminal device according to claim 1, wherein the first sorting marks, which are displayed in the display process of the email search process (1-3-1), are aligned in the same order as in the display process of the link process (1-2-1).

10. The terminal device according to claim 1, wherein the second sorting marks, which are related to the parent first sorting mark and displayed in the display process of the email search process (1-3-1), are aligned in the same order as in the display process of the link process (1-2-1).

11. The terminal device according to claim 9, wherein the second sorting marks, which are related to the parent first sorting mark and displayed in the display process of the email search process (1-3-1), are aligned in the same order as in the display process of the link process (1-2-1).

12. The terminal device according to claim 7, wherein at the display process (1-2-1), one or more the second sorting marks are displayed in a selectable state such that the user is allowed to link these second sorting marks to the linked email by clicking their marks, which is executed with the operation means, these second sorting marks being defined as selectable marks, the remaining second sorting marks are displayed in non-used state such that the user is not allowed to link these remaining second sorting marks to any of the emails, the remaining second sorting marks being defined as non-used marks, and the selectable marks are displayed in a different fashion from the non-used marks.

* * * * *

UNITED STATES PATENT AND TRADEMARK OFFICE

CERTIFICATE OF CORRECTION

PATENT NO. : 10,726,392 B2
APPLICATION NO. : 16/099594
DATED : July 28, 2020
INVENTOR(S) : Hiroshige Kobayashi It is certified that error appears in the above-identified patent and that said Letters Patent is hereby corrected as shown below:

In the Claims

In Column 55, Line 38, in Claim 1, change "ma Or" to --major--.

In Column 55, Line 55, in Claim 1, change "b" to --by--.

Signed and Sealed this
Seventeenth Day of November, 2020

Andrei Iancu
*Director of the United States Patent and Trademark Office*